(12) United States Patent
Shinohara

(10) Patent No.: US 8,184,383 B2
(45) Date of Patent: May 22, 2012

(54) IMAGING LENS AND IMAGE PICKUP DEVICE

(75) Inventor: Yoshikazu Shinohara, Saitama (JP)

(73) Assignee: Fujifilm Corporation, Tokyo (JP)

( * ) Notice: Subject to any disclaimer, the term of this patent is extended or adjusted under 35 U.S.C. 154(b) by 280 days.

(21) Appl. No.: 12/371,297

(22) Filed: Feb. 13, 2009

(65) Prior Publication Data
US 2009/0207507 A1 Aug. 20, 2009

(30) Foreign Application Priority Data
Feb. 14, 2008 (JP) ................................ P2008-033397

(51) Int. Cl.
*G02B 13/18* (2006.01)
*G02B 9/34* (2006.01)

(52) U.S. Cl. ........................................ 359/715; 359/773

(58) Field of Classification Search .......... 359/754–757, 359/763–764, 766, 771–773, 713–715, 708
See application file for complete search history.

(56) References Cited

U.S. PATENT DOCUMENTS

| | | | |
|---|---|---|---|
| 7,206,143 B2* | 4/2007 | Kamo et al. | 359/771 |
| 7,466,497 B2* | 12/2008 | Park et al. | 359/715 |
| 7,474,478 B2* | 1/2009 | Fukuta et al. | 359/773 |
| 2002/0181121 A1 | 12/2002 | Kawakami | |
| 2004/0125468 A1* | 7/2004 | Do | 359/771 |
| 2004/0228009 A1 | 11/2004 | Kamo et al. | |

FOREIGN PATENT DOCUMENTS

| | | |
|---|---|---|
| JP | 2004-341013 A | 12/2004 |
| JP | 2005-4027 A | 1/2005 |
| JP | 2005-4028 A | 1/2005 |
| JP | 2005-24581 A | 1/2005 |
| JP | 2005-24889 A | 1/2005 |
| JP | 2005-208236 A | 8/2005 |

* cited by examiner

*Primary Examiner* — Ricky Mack
*Assistant Examiner* — Zachary Wilkes
(74) *Attorney, Agent, or Firm* — Birch, Stewart, Kolasch & Birch, LLP

(57) ABSTRACT

An imaging lens includes in order from an object side, a stop and a first lens to a fourth lens. Both the surfaces of a third lens have surfaces including at least one inflection point, and an inclination of each surface at the terminal end part of a periphery within an effective diameter collapses toward the image side. And $0.1<D3/D4<2.0$, $vd1-vd2>25$, $0.4<f1/f3<1.6$ and $0.3<f/f3<1.5$ are satisfied, where D3 is an air space on an optical axis between the first lens and the second lens, D4 is a central thickness of the second lens, vd1 and vd2 are Abbe numbers of the first lens and the second lens, f1 and f3 are focal lengths of the first lens and the third lens and f is a focal length of an entire system.

17 Claims, 87 Drawing Sheets

EXAMPLE 1

EXAMPLE 1

EXAMPLE 1

EXAMPLE 2

EXAMPLE 2

EXAMPLE 2

EXAMPLE 3

EXAMPLE 3

EXAMPLE 3

EXAMPLE 4

EXAMPLE 4

EXAMPLE 4

EXAMPLE 5

EXAMPLE 5

EXAMPLE 5

EXAMPLE 6

EXAMPLE 6

EXAMPLE 6

EXAMPLE 7

EXAMPLE 7

EXAMPLE 7

EXAMPLE 8

EXAMPLE 8

EXAMPLE 8

EXAMPLE 9

EXAMPLE 9

EXAMPLE 9

FIG.10A

EXAMPLE 1: BASIC LENS DATA

| Si SURFACE NUMBER | Ri CURVATURE RADIUS | Di SURFACE SPACING | Ndj REFRACTIVE INDEX | vdj ABBE NUMBER |
|---|---|---|---|---|
| 0 (VARIABLE AD) | — | D0 (VARIABLE) | | |
| 1 (FIXED AD) | — | 0.00 | | |
| 2 | 4.4564 | 0.87 | 1.692947 | 53.2 |
| 3 | -13.2166 | 0.20 | | |
| 4 | 4.4459 | 0.50 | 1.638203 | 23.2 |
| 5 | 2.4398 | 0.76 | | |
| 6 | -12.7513 | 1.20 | 1.511717 | 56.5 |
| 7 | -2.2382 | 0.10 | | |
| 8 | 1.3722 | 0.54 | 1.511711 | 56.5 |
| 9 | 0.9121 | 0.80 | | |
| 10 | ∞ | 0.30 | 1.51825 | 64.1 |
| 11 | ∞ | 0.92 | | |

* AD : APERTURE DIAPHRAGM

Groups: G1 (surfaces 2–3), G2 (4–5), G3 (6–7), G4 (8–9), GF (10–11)

FIG.10B

EXAMPLE 1: AD DATA

| F NUMBER | VARIABLE AD (St2, St3) | | FIXED AD | |
| --- | --- | --- | --- | --- |
| | AD DIAMETER | POSITION (D0) | AD DIAMETER | POSITION |
| F2.4 | — | — | 0.940 | 0.00 |
| F3.2 | 0.720 | 0.56 | 0.940 | 0.00 |
| F4.8 | 0.490 | 0.65 | 0.940 | 0.00 |

* AD : APERTURE DIAPHRAGM

FIG.11

| EXAMPLE 1 : ASPHERIC DATA | | | | | |
|---|---|---|---|---|---|
| S No. | K | B3 | B4 | B5 | B6 |
| 2 | 8.61E-01 | -5.60E-03 | 6.07E-02 | -2.92E-01 | 3.52E-01 |
| 3 | -4.70E-01 | 1.63E-02 | -1.67E-01 | 1.73E-01 | -3.02E-02 |
| 4 | 6.25E+00 | 5.25E-02 | -3.11E-01 | 2.61E-01 | 8.82E-02 |
| 5 | -6.21E+00 | 3.95E-02 | -1.17E-01 | 2.45E-01 | -2.81E-01 |
| 6 | -1.00E+01 | -1.44E-02 | 1.80E-01 | -2.11E-01 | 7.61E-02 |
| 7 | -9.12E+00 | 8.19E-03 | -1.40E-01 | 1.36E-01 | -5.20E-02 |
| 8 | -3.44E+00 | 1.96E-02 | -8.98E-02 | -3.14E-02 | 2.25E-02 |
| 9 | -1.59E+00 | 6.56E-02 | -2.25E-01 | 1.03E-01 | 4.38E-03 |
|   | B7 | B8 | B9 | B10 | B11 |
| 2 | 5.70E-02 | -2.57E-01 | -3.23E-01 | 3.66E-01 | 2.76E-01 |
| 3 | -2.71E-01 | 2.94E-01 | 6.38E-02 | -1.83E-01 | -2.04E-02 |
| 4 | -4.56E-01 | 3.61E-01 | -7.78E-03 | -1.27E-01 | 1.43E-01 |
| 5 | 1.29E-01 | 4.45E-02 | -7.30E-02 | 5.36E-02 | -5.37E-03 |
| 6 | 2.76E-02 | -2.56E-02 | 6.32E-03 | -4.48E-03 | 2.78E-03 |
| 7 | 1.02E-03 | 3.48E-03 | -1.12E-03 | 1.33E-03 | -4.39E-04 |
| 8 | 6.94E-03 | -3.82E-03 | -9.47E-05 | 2.93E-04 | -5.36E-05 |
| 9 | -1.38E-02 | 1.01E-03 | 1.12E-03 | -1.05E-04 | -8.12E-05 |
|   | B12 | B13 | B14 | B15 | B16 |
| 2 | -5.59E-02 | -3.62E-01 | 6.23E-02 | 1.26E-01 | -3.24E-02 |
| 3 | 7.77E-02 | 2.59E-02 | -6.29E-02 | 2.56E-02 | -2.09E-03 |
| 4 | -8.38E-03 | -1.12E-01 | -1.56E-02 | 6.60E-02 | 1.25E-02 |
| 5 | -5.24E-02 | 3.78E-02 | 8.69E-04 | -4.34E-03 | 1.64E-03 |
| 6 | 3.28E-04 | -5.42E-04 | 1.72E-04 | -1.09E-04 | -8.19E-05 |
| 7 | 3.18E-04 | -1.12E-04 | 3.34E-05 | -3.35E-05 | -5.86E-06 |
| 8 | 1.51E-05 | -5.40E-06 | -2.26E-06 | 4.32E-07 | 3.90E-07 |
| 9 | 7.73E-06 | 1.15E-05 | -4.06E-06 | -1.68E-07 | 3.10E-07 |
|   | B17 | B18 | B19 | B20 | |
| 2 | -5.81E-02 | 4.64E-02 | 4.93E-02 | -4.10E-02 | |
| 3 | 1.21E-03 | 3.75E-04 | -1.58E-03 | 5.05E-04 | |
| 4 | 6.12E-03 | -4.37E-02 | 2.37E-02 | -3.53E-03 | |
| 5 | -1.50E-03 | -3.65E-03 | 4.31E-03 | -1.17E-03 | |
| 6 | 1.12E-04 | -2.07E-05 | -8.97E-06 | 2.57E-06 | |
| 7 | 6.85E-06 | -3.20E-06 | 2.35E-06 | -5.22E-07 | |
| 8 | -1.36E-07 | 3.11E-08 | -5.12E-09 | 1.07E-10 | |
| 9 | -4.54E-08 | -8.32E-09 | 4.24E-09 | -4.51E-10 | |

* S No. : SURFACE NUMBER

FIG.12A

| EXAMPLE 1 : SURFACE FORM OF THIRD LENS G3 ON OBJECT SIDE | | |
|---|---|---|
| HEIGHT h | Sag | Dsag |
| 0.000 | 0.000 | 0.000 |
| 0.100 | 0.000 | -0.008 |
| 0.200 | -0.001 | -0.013 |
| 0.300 | -0.003 | -0.015 |
| 0.400 | -0.004 | -0.014 |
| 0.500 | -0.006 | -0.010 |
| 0.600 | -0.006 | -0.004 |
| 0.700 | -0.006 | 0.004 |
| 0.800 | -0.005 | 0.012 |
| 0.900 | -0.004 | 0.021 |
| 1.000 | -0.001 | 0.033 |
| 1.100 | 0.003 | 0.046 |
| 1.200 | 0.008 | 0.064 |
| 1.300 | 0.016 | 0.087 |
| 1.400 | 0.026 | 0.117 |
| 1.500 | 0.039 | 0.152 |
| 1.600 | 0.057 | 0.193 |
| 1.700 | 0.078 | 0.235 |
| 1.800 | 0.103 | 0.267 |
| 1.900 | 0.131 | 0.274 |
| 2.000 | 0.156 | 0.230 |

FIG.13A

| EXAMPLE 1 : SURFACE FORM OF THIRD LENS G3 ON IMAGE SIDE | | |
|---|---|---|
| HEIGHT h | Sag | Dsag |
| 0.000 | 0.000 | 0.000 |
| 0.100 | −0.002 | −0.045 |
| 0.200 | −0.009 | −0.089 |
| 0.300 | −0.020 | −0.132 |
| 0.400 | −0.035 | −0.175 |
| 0.500 | −0.055 | −0.216 |
| 0.600 | −0.078 | −0.255 |
| 0.700 | −0.106 | −0.293 |
| 0.800 | −0.137 | −0.329 |
| 0.900 | −0.172 | −0.364 |
| 1.000 | −0.210 | −0.396 |
| 1.100 | −0.251 | −0.425 |
| 1.200 | −0.294 | −0.447 |
| 1.300 | −0.340 | −0.457 |
| 1.400 | −0.385 | −0.450 |
| 1.500 | −0.429 | −0.415 |
| 1.600 | −0.467 | −0.345 |
| 1.700 | −0.496 | −0.237 |
| 1.800 | −0.513 | −0.097 |
| 1.900 | −0.516 | 0.054 |
| 2.000 | −0.503 | 0.182 |
| 2.100 | −0.481 | 0.251 |
| 2.200 | −0.456 | 0.243 |
| 2.300 | −0.435 | 0.169 |

FIG.14A

EXAMPLE 2: BASIC LENS DATA

| Si SURFACE NUMBER | Ri CURVATURE RADIUS | Di SURFACE SPACING | Ndj REFRACTIVE INDEX | νdj ABBE NUMBER |
|---|---|---|---|---|
| 0 (VARIABLE AD) | — | D0 (VARIABLE) | | |
| 1 (FIXED AD) | — | 0.00 | | |
| 2 | 3.6839 | 0.88 | 1.692947 | 53.2 |
| 3 | -44.9392 | 0.31 | | |
| 4 | 7.8282 | 0.50 | 1.638203 | 22.7 |
| 5 | 3.2686 | 0.63 | | |
| 6 | -12.1576 | 1.22 | 1.511717 | 56.5 |
| 7 | -2.0779 | 0.10 | | |
| 8 | 1.4271 | 0.55 | 1.511717 | 56.5 |
| 9 | 0.9108 | 0.80 | | |
| 10 | ∞ | 0.30 | 1.51825 | 64.1 |
| 11 | ∞ | 0.91 | | |

{ G1 (rows 2-3), G2 (rows 4-5), G3 (rows 6-7), G4 (rows 8-9), GF (rows 10-11) }

*AD: APERTURE DIAPHRAGM

FIG.14B

EXAMPLE 2: AD DATA

| F NUMBER | VARIABLE AD (St2, St3) | | FIXED AD | |
|---|---|---|---|---|
| | AD DIAMETER | POSITION (D0) | AD DIAMETER | POSITION |
| F2.4 | — | — | 0.940 | 0.00 |
| F3.2 | 0.720 | 0.56 | 0.940 | 0.00 |
| F4.8 | 0.490 | 0.65 | 0.940 | 0.00 |

* AD : APERTURE DIAPHRAGM

FIG.15

| EXAMPLE 2 : ASPHERIC DATA | | | | | |
|---|---|---|---|---|---|
| S No. | K | B3 | B4 | B5 | B6 |
| 2 | 1.89E+00 | -5.68E-03 | 5.41E-02 | -2.72E-01 | 3.50E-01 |
| 3 | 7.43E+00 | 2.25E-02 | -1.46E-01 | 1.61E-01 | -2.81E-02 |
| 4 | 4.45E+00 | 5.18E-02 | -2.74E-01 | 2.51E-01 | 7.26E-02 |
| 5 | -8.50E+00 | 3.51E-02 | -1.23E-01 | 2.38E-01 | -2.77E-01 |
| 6 | -3.87E+00 | -4.62E-03 | 1.74E-01 | -2.12E-01 | 7.65E-02 |
| 7 | -1.00E+01 | -3.67E-03 | -1.36E-01 | 1.35E-01 | -5.22E-02 |
| 8 | -4.00E+00 | 3.20E-02 | -9.84E-02 | -3.03E-02 | 2.29E-02 |
| 9 | -2.11E+00 | 1.12E-01 | -2.47E-01 | 1.03E-01 | 6.40E-03 |
|  | B7 | B8 | B9 | B10 | B11 |
| 2 | 5.28E-02 | -2.65E-01 | -3.16E-01 | 3.65E-01 | 2.75E-01 |
| 3 | -2.78E-01 | 2.96E-01 | 6.14E-02 | -1.88E-01 | -1.65E-02 |
| 4 | -4.54E-01 | 3.59E-01 | -1.42E-02 | -1.22E-01 | 1.46E-01 |
| 5 | 1.33E-01 | 4.15E-02 | -7.31E-02 | 5.27E-02 | -6.14E-03 |
| 6 | 2.76E-02 | -2.53E-02 | 6.36E-03 | -4.51E-03 | 2.76E-03 |
| 7 | 1.06E-03 | 3.46E-03 | -1.07E-03 | 1.34E-03 | -4.29E-04 |
| 8 | 6.92E-03 | -3.80E-03 | -1.02E-04 | 2.90E-04 | -5.33E-05 |
| 9 | -1.38E-02 | 8.86E-04 | 1.11E-03 | -1.10E-04 | -7.97E-05 |
|  | B12 | B13 | B14 | B15 | B16 |
| 2 | -6.17E-02 | -3.60E-01 | 7.39E-02 | 1.28E-01 | -3.65E-02 |
| 3 | 8.03E-02 | 2.61E-02 | -6.25E-02 | 2.61E-02 | -2.86E-03 |
| 4 | -8.53E-03 | -1.10E-01 | -1.62E-02 | 6.49E-02 | 1.26E-02 |
| 5 | -5.14E-02 | 3.81E-02 | 9.23E-04 | -4.12E-03 | 1.57E-03 |
| 6 | 3.17E-04 | -5.42E-04 | 1.72E-04 | -1.08E-04 | -8.16E-05 |
| 7 | 3.20E-04 | -1.12E-04 | 3.32E-05 | -3.39E-05 | -6.07E-06 |
| 8 | 1.45E-05 | -5.33E-06 | -2.19E-06 | 4.17E-07 | 3.97E-07 |
| 9 | 8.24E-06 | 1.15E-05 | -4.01E-06 | -1.55E-07 | 3.05E-07 |
|  | B17 | B18 | B19 | B20 |  |
| 2 | -6.58E-02 | 4.93E-02 | 4.86E-02 | -3.98E-02 |  |
| 3 | 1.29E-04 | 7.30E-04 | -1.25E-03 | 4.03E-04 |  |
| 4 | 6.05E-03 | -4.38E-02 | 2.39E-02 | -3.54E-03 |  |
| 5 | -1.58E-03 | -3.68E-03 | 4.23E-03 | -1.12E-03 |  |
| 6 | 1.13E-04 | -2.08E-05 | -8.92E-06 | 2.52E-06 |  |
| 7 | 6.76E-06 | -3.23E-06 | 2.35E-06 | -5.10E-07 |  |
| 8 | -1.38E-07 | 3.08E-08 | -4.84E-09 | 3.44E-11 |  |
| 9 | -4.62E-08 | -8.49E-09 | 4.14E-09 | -4.28E-10 |  |

\* S No. : SURFACE NUMBER

FIG.16A

| EXAMPLE 2 : SURFACE FORM OF THIRD LENS G3 ON OBJECT SIDE | | |
|---|---|---|
| HEIGHT h | Sag | Dsag |
| 0.000 | 0.000 | 0.000 |
| 0.100 | 0.000 | -0.008 |
| 0.200 | -0.001 | -0.013 |
| 0.300 | -0.003 | -0.014 |
| 0.400 | -0.004 | -0.012 |
| 0.500 | -0.005 | -0.008 |
| 0.600 | -0.006 | -0.001 |
| 0.700 | -0.005 | 0.006 |
| 0.800 | -0.004 | 0.014 |
| 0.900 | -0.003 | 0.022 |
| 1.000 | 0.000 | 0.032 |
| 1.100 | 0.004 | 0.044 |
| 1.200 | 0.009 | 0.060 |
| 1.300 | 0.016 | 0.081 |
| 1.400 | 0.025 | 0.107 |
| 1.500 | 0.038 | 0.139 |
| 1.600 | 0.053 | 0.176 |
| 1.700 | 0.073 | 0.212 |
| 1.800 | 0.095 | 0.234 |
| 1.900 | 0.118 | 0.214 |

FIG.17A

| EXAMPLE 2 : SURFACE FORM OF THIRD LENS G3 ON IMAGE SIDE | | |
|---|---|---|
| HEIGHT h | Sag | Dsag |
| 0.000 | 0.000 | 0.000 |
| 0.100 | -0.002 | -0.048 |
| 0.200 | -0.010 | -0.096 |
| 0.300 | -0.022 | -0.142 |
| 0.400 | -0.038 | -0.187 |
| 0.500 | -0.059 | -0.230 |
| 0.600 | -0.084 | -0.271 |
| 0.700 | -0.113 | -0.310 |
| 0.800 | -0.146 | -0.348 |
| 0.900 | -0.183 | -0.385 |
| 1.000 | -0.223 | -0.421 |
| 1.100 | -0.267 | -0.453 |
| 1.200 | -0.313 | -0.478 |
| 1.300 | -0.362 | -0.492 |
| 1.400 | -0.411 | -0.486 |
| 1.500 | -0.458 | -0.451 |
| 1.600 | -0.500 | -0.378 |
| 1.700 | -0.532 | -0.263 |
| 1.800 | -0.551 | -0.115 |
| 1.900 | -0.555 | 0.043 |
| 2.000 | -0.544 | 0.170 |
| 2.100 | -0.523 | 0.223 |

FIG.18A

| | EXAMPLE 3: | BASIC LENS DATA | | |
|---|---|---|---|---|
| Si SURFACE NUMBER | Ri CURVATURE RADIUS | Di SURFACE SPACING | Ndj REFRACTIVE INDEX | νdj ABBE NUMBER |
| 0 (VARIABLE AD) | — | D0 (VARIABLE) | | |
| 1 (FIXED AD) | — | 0.00 | | |
| 2 | 3.6434 | 0.87 | 1.692947 | 53.2 |
| 3 | -128.84 | 0.26 | | |
| 4 | 6.4918 | 0.50 | 1.619643 | 25.5 |
| 5 | 3.0149 | 0.61 | | |
| 6 | -16.6705 | 1.18 | 1.511717 | 56.5 |
| 7 | -2.4427 | 0.19 | | |
| 8 | 1.6077 | 0.65 | 1.511717 | 56.5 |
| 9 | 1.0616 | 0.80 | | |
| 10 | ∞ | 0.30 | 1.51825 | 64.1 |
| 11 | ∞ | 0.82 | | |

G1: surfaces 2–3
G2: surfaces 4–5
G3: surfaces 6–7
G4: surfaces 8–9
GF: surfaces 10–11

*AD: APERTURE DIAPHRAGM

FIG.18B

EXAMPLE 3: AD DATA

| F NUMBER | VARIABLE AD (St2, St3) | | FIXED AD | |
|---|---|---|---|---|
| | AD DIAMETER | POSITION (D0) | AD DIAMETER | POSITION |
| F2.4 | — | — | 0.940 | 0.00 |
| F3.2 | 0.720 | 0.56 | 0.940 | 0.00 |
| F4.8 | 0.490 | 0.65 | 0.940 | 0.00 |

* AD : APERTURE DIAPHRAGM

FIG.19

| EXAMPLE 3 : ASPHERIC DATA | | | | | |
|---|---|---|---|---|---|
| S No. | K | B3 | B4 | B5 | B6 |
| 2 | 2.45E+00 | 0.00E+00 | -2.18E-02 | 0.00E+00 | 3.37E-03 |
| 3 | 3.60E+00 | 0.00E+00 | -7.10E-02 | 0.00E+00 | 5.73E-03 |
| 4 | 6.00E-01 | 7.81E-02 | -5.14E-01 | 1.14E+00 | -1.94E+00 |
| 5 | -1.00E+01 | 8.23E-02 | -4.56E-01 | 1.48E+00 | -2.90E+00 |
| 6 | -1.00E+01 | 1.21E-02 | -1.97E-03 | 3.27E-01 | -8.10E-01 |
| 7 | -8.14E+00 | -1.03E-02 | -1.20E-01 | 1.18E-01 | -4.87E-02 |
| 8 | -3.27E+00 | -4.36E-03 | -1.13E-01 | -1.86E-02 | 2.59E-02 |
| 9 | -2.39E+00 | 1.26E-01 | -2.87E-01 | 1.41E-01 | -7.87E-03 |
|   | B7 | B8 | B9 | B10 | B11 |
| 2 | 0.00E+00 | -1.66E-02 | 0.00E+00 | 6.62E-03 | 0.00E+00 |
| 3 | 0.00E+00 | 1.92E-03 | 0.00E+00 | 8.87E-07 | 0.00E+00 |
| 4 | 2.02E+00 | -1.23E+00 | 4.39E-01 | -7.40E-02 | 0.00E+00 |
| 5 | 3.36E+00 | -2.27E+00 | 8.37E-01 | -1.31E-01 | 0.00E+00 |
| 6 | 8.81E-01 | -5.08E-01 | 1.54E-01 | -1.95E-02 | 0.00E+00 |
| 7 | 1.47E-03 | 4.31E-03 | -7.82E-04 | 1.30E-03 | -4.27E-04 |
| 8 | 7.05E-03 | -4.12E-03 | -2.22E-04 | 2.74E-04 | -6.80E-05 |
| 9 | -1.27E-02 | 1.25E-03 | 1.34E-03 | -1.75E-04 | -9.89E-05 |
|   | B12 | B13 | B14 | B15 | B16 |
| 2 | 0.00E+00 | 0.00E+00 | 0.00E+00 | 0.00E+00 | 0.00E+00 |
| 3 | 0.00E+00 | 0.00E+00 | 0.00E+00 | 0.00E+00 | 0.00E+00 |
| 4 | 0.00E+00 | 0.00E+00 | 0.00E+00 | 0.00E+00 | 0.00E+00 |
| 5 | 0.00E+00 | 0.00E+00 | 0.00E+00 | 0.00E+00 | 0.00E+00 |
| 6 | 0.00E+00 | 0.00E+00 | 0.00E+00 | 0.00E+00 | 0.00E+00 |
| 7 | 2.86E-04 | -1.15E-04 | 2.62E-05 | -3.32E-05 | -6.62E-06 |
| 8 | 1.56E-05 | -3.26E-06 | -2.29E-06 | 6.48E-07 | 3.65E-07 |
| 9 | 7.25E-06 | 1.27E-05 | -3.50E-06 | -2.71E-07 | 3.18E-07 |
|   | B17 | B18 | B19 | B20 |   |
| 2 | 0.00E+00 | 0.00E+00 | 0.00E+00 | 0.00E+00 |   |
| 3 | 0.00E+00 | 0.00E+00 | 0.00E+00 | 0.00E+00 |   |
| 4 | 0.00E+00 | 0.00E+00 | 0.00E+00 | 0.00E+00 |   |
| 5 | 0.00E+00 | 0.00E+00 | 0.00E+00 | 0.00E+00 |   |
| 6 | 0.00E+00 | 0.00E+00 | 0.00E+00 | 0.00E+00 |   |
| 7 | 7.14E-06 | -3.23E-06 | 2.39E-06 | -5.01E-07 |   |
| 8 | -1.25E-07 | 3.76E-08 | -9.55E-09 | 9.11E-11 |   |
| 9 | -3.66E-08 | -1.30E-08 | 3.47E-09 | -2.03E-10 |   |

* S No. : SURFACE NUMBER

FIG.20A

| EXAMPLE 3 : SURFACE FORM OF THIRD LENS G3 ON OBJECT SIDE |||
|---|---|---|
| HEIGHT h | Sag | Dsag |
| 0.000 | 0.000 | 0.000 |
| 0.100 | 0.000 | -0.006 |
| 0.200 | -0.001 | -0.009 |
| 0.300 | -0.002 | -0.010 |
| 0.400 | -0.003 | -0.007 |
| 0.500 | -0.003 | -0.002 |
| 0.600 | -0.003 | 0.005 |
| 0.700 | -0.002 | 0.012 |
| 0.800 | -0.001 | 0.020 |
| 0.900 | 0.002 | 0.028 |
| 1.000 | 0.005 | 0.039 |
| 1.100 | 0.009 | 0.054 |
| 1.200 | 0.016 | 0.074 |
| 1.300 | 0.024 | 0.101 |
| 1.400 | 0.036 | 0.136 |
| 1.500 | 0.052 | 0.179 |
| 1.600 | 0.072 | 0.226 |
| 1.700 | 0.097 | 0.268 |
| 1.800 | 0.125 | 0.280 |
| 1.900 | 0.150 | 0.211 |

FIG.21A

| EXAMPLE 3: SURFACE FORM OF THIRD LENS G3 ON IMAGE SIDE | | |
|---|---|---|
| HEIGHT h | Sag | Dsag |
| 0.000 | 0.000 | 0.000 |
| 0.100 | -0.002 | -0.041 |
| 0.200 | -0.008 | -0.084 |
| 0.300 | -0.019 | -0.128 |
| 0.400 | -0.034 | -0.172 |
| 0.500 | -0.053 | -0.216 |
| 0.600 | -0.077 | -0.261 |
| 0.700 | -0.105 | -0.305 |
| 0.800 | -0.138 | -0.348 |
| 0.900 | -0.175 | -0.390 |
| 1.000 | -0.216 | -0.430 |
| 1.100 | -0.261 | -0.464 |
| 1.200 | -0.308 | -0.488 |
| 1.300 | -0.358 | -0.494 |
| 1.400 | -0.406 | -0.473 |
| 1.500 | -0.451 | -0.413 |
| 1.600 | -0.488 | -0.309 |
| 1.700 | -0.511 | -0.163 |
| 1.800 | -0.519 | 0.006 |
| 1.900 | -0.511 | 0.159 |
| 2.000 | -0.490 | 0.246 |
| 2.100 | -0.464 | 0.249 |

FIG.22A

EXAMPLE 4: BASIC LENS DATA

| Si SURFACE NUMBER | Ri CURVATURE RADIUS | Di SURFACE SPACING | Ndj REFRACTIVE INDEX | νdj ABBE NUMBER |
|---|---|---|---|---|
| 0 (VARIABLE AD) | — | D0 (VARIABLE) | — | — |
| 1 (FIXED AD) | — | 0.00 | — | — |
| 2 | 3.9001 | 0.91 | 1.692947 | 53.2 |
| 3 | -49.5792 | 0.28 | | |
| 4 | 5.604 | 0.50 | 1.619643 | 25.5 |
| 5 | 2.8077 | 0.61 | | |
| 6 | -62.7081 | 1.44 | 1.511717 | 56.5 |
| 7 | -1.9151 | 0.10 | | |
| 8 | 2.0055 | 0.61 | 1.511717 | 56.5 |
| 9 | 1.0249 | 0.80 | | |
| 10 | ∞ | 0.30 | 1.51825 | 64.1 |
| 11 | ∞ | 0.85 | | |

G1: surfaces 2–3
G2: surfaces 4–5
G3: surfaces 6–7
G4: surfaces 8–9
GF: surfaces 10–11

*AD: APERTURE DIAPHRAGM

FIG.22B

EXAMPLE 4: AD DATA

| F NUMBER | VARIABLE AD (St2, St3) | | FIXED AD | |
|---|---|---|---|---|
| | AD DIAMETER | POSITION (D0) | AD DIAMETER | POSITION |
| F2.4 | — | — | 0.940 | 0.00 |
| F3.2 | 0.720 | 0.56 | 0.940 | 0.00 |
| F4.8 | 0.490 | 0.65 | 0.940 | 0.00 |

* AD : APERTURE DIAPHRAGM

FIG.23

| EXAMPLE 4 : ASPHERIC DATA | | | | | |
|---|---|---|---|---|---|
| S No. | K | B3 | B4 | B5 | B6 |
| 2 | 8.03E+00 | 0.00E+00 | -3.27E-02 | 0.00E+00 | -7.06E-04 |
| 3 | -9.87E+00 | 0.00E+00 | -6.72E-02 | 0.00E+00 | 8.77E-03 |
| 4 | 6.25E+00 | 8.46E-02 | -5.48E-01 | 1.18E+00 | -1.95E+00 |
| 5 | -3.06E+00 | 1.02E-01 | -5.57E-01 | 1.59E+00 | -2.97E+00 |
| 6 | 1.00E+01 | 1.90E-02 | -4.29E-02 | 3.65E-01 | -8.15E-01 |
| 7 | -8.34E+00 | -1.04E-02 | -1.28E-01 | 1.15E-01 | -3.70E-02 |
| 8 | -9.23E-01 | 1.93E-02 | -1.92E-01 | -8.36E-03 | 4.98E-02 |
| 9 | -2.23E+00 | 1.27E-01 | -3.19E-01 | 1.68E-01 | -7.90E-03 |
|   | B7 | B8 | B9 | B10 | B11 |
| 2 | 0.00E+00 | -1.32E-02 | 0.00E+00 | 2.41E-03 | 0.00E+00 |
| 3 | 0.00E+00 | -6.38E-04 | 0.00E+00 | 3.44E-04 | 0.00E+00 |
| 4 | 2.01E+00 | -1.24E+00 | 4.48E-01 | -7.50E-02 | 0.00E+00 |
| 5 | 3.38E+00 | -2.27E+00 | 8.31E-01 | -1.28E-01 | 0.00E+00 |
| 6 | 8.75E-01 | -5.06E-01 | 1.53E-01 | -1.92E-02 | 0.00E+00 |
| 7 | -3.19E-03 | 5.00E-03 | -6.27E-04 | 1.16E-03 | -4.41E-04 |
| 8 | 1.34E-03 | -3.68E-03 | -1.73E-03 | 3.95E-04 | 1.03E-04 |
| 9 | -1.90E-02 | 2.23E-03 | 2.15E-03 | -4.30E-04 | -1.07E-04 |
|   | B12 | B13 | B14 | B15 | B16 |
| 2 | 0.00E+00 | 0.00E+00 | 0.00E+00 | 0.00E+00 | 0.00E+00 |
| 3 | 0.00E+00 | 0.00E+00 | 0.00E+00 | 0.00E+00 | 0.00E+00 |
| 4 | 0.00E+00 | 0.00E+00 | 0.00E+00 | 0.00E+00 | 0.00E+00 |
| 5 | 0.00E+00 | 0.00E+00 | 0.00E+00 | 0.00E+00 | 0.00E+00 |
| 6 | 0.00E+00 | 0.00E+00 | 0.00E+00 | 0.00E+00 | 0.00E+00 |
| 7 | 2.39E-04 | -1.01E-04 | 1.93E-05 | -2.81E-05 | -7.43E-06 |
| 8 | 3.92E-06 | 4.94E-06 | 3.10E-07 | -1.89E-06 | 2.65E-08 |
| 9 | 1.32E-05 | 1.53E-05 | -4.79E-06 | -2.65E-07 | 3.81E-07 |
|   | B17 | B18 | B19 | B20 | |
| 2 | 0.00E+00 | 0.00E+00 | 0.00E+00 | 0.00E+00 | |
| 3 | 0.00E+00 | 0.00E+00 | 0.00E+00 | 0.00E+00 | |
| 4 | 0.00E+00 | 0.00E+00 | 0.00E+00 | 0.00E+00 | |
| 5 | 0.00E+00 | 0.00E+00 | 0.00E+00 | 0.00E+00 | |
| 6 | 0.00E+00 | 0.00E+00 | 0.00E+00 | 0.00E+00 | |
| 7 | 8.41E-06 | -3.47E-06 | 2.58E-06 | -6.15E-07 | |
| 8 | -1.56E-07 | 2.01E-08 | 3.20E-08 | -5.07E-09 | |
| 9 | -1.97E-08 | -1.95E-08 | 3.87E-09 | -2.99E-10 | |

* S No. : SURFACE NUMBER

FIG.24A

| EXAMPLE 4 : SURFACE FORM OF THIRD LENS G3 ON OBJECT SIDE | | |
|---|---|---|
| HEIGHT h | Sag | Dsag |
| 0.000 | 0.000 | 0.000 |
| 0.100 | 0.000 | -0.001 |
| 0.200 | 0.000 | -0.001 |
| 0.300 | 0.000 | 0.002 |
| 0.400 | 0.000 | 0.008 |
| 0.500 | 0.002 | 0.015 |
| 0.600 | 0.003 | 0.024 |
| 0.700 | 0.006 | 0.034 |
| 0.800 | 0.010 | 0.044 |
| 0.900 | 0.015 | 0.057 |
| 1.000 | 0.022 | 0.072 |
| 1.100 | 0.030 | 0.091 |
| 1.200 | 0.040 | 0.114 |
| 1.300 | 0.053 | 0.142 |
| 1.400 | 0.069 | 0.174 |
| 1.500 | 0.088 | 0.210 |
| 1.600 | 0.111 | 0.246 |
| 1.700 | 0.137 | 0.274 |
| 1.800 | 0.165 | 0.277 |
| 1.900 | 0.190 | 0.213 |

FIG.25A

| EXAMPLE 4 : SURFACE FORM OF THIRD LENS G3 ON IMAGE SIDE | | |
|---|---|---|
| HEIGHT h | Sag | Dsag |
| 0.000 | 0.000 | 0.000 |
| 0.100 | −0.003 | −0.052 |
| 0.200 | −0.010 | −0.104 |
| 0.300 | −0.023 | −0.155 |
| 0.400 | −0.041 | −0.204 |
| 0.500 | −0.064 | −0.251 |
| 0.600 | −0.092 | −0.297 |
| 0.700 | −0.124 | −0.341 |
| 0.800 | −0.160 | −0.384 |
| 0.900 | −0.200 | −0.424 |
| 1.000 | −0.245 | −0.460 |
| 1.100 | −0.292 | −0.490 |
| 1.200 | −0.342 | −0.507 |
| 1.300 | −0.393 | −0.506 |
| 1.400 | −0.442 | −0.479 |
| 1.500 | −0.488 | −0.416 |
| 1.600 | −0.524 | −0.314 |
| 1.700 | −0.549 | −0.176 |
| 1.800 | −0.559 | −0.017 |
| 1.900 | −0.553 | 0.133 |
| 2.000 | −0.534 | 0.237 |
| 2.100 | −0.508 | 0.272 |

FIG.26A

EXAMPLE 5: BASIC LENS DATA

| Si SURFACE NUMBER | Ri CURVATURE RADIUS | Di SURFACE SPACING | Ndj REFRACTIVE INDEX | νdj ABBE NUMBER | |
|---|---|---|---|---|---|
| 0 (VARIABLE AD) | — | D0 (VARIABLE) | | | |
| 1 (FIXED AD) | — | 0.00 | | | |
| 2 | 3.4147 | 0.90 | 1.533421 | 55.4 | } G1 |
| 3 | -13.8149 | 0.25 | | | |
| 4 | 5.1999 | 0.50 | 1.619643 | 25.5 | } G2 |
| 5 | 2.6605 | 0.63 | | | |
| 6 | -17.0604 | 1.41 | 1.511717 | 56.5 | } G3 |
| 7 | -1.6997 | 0.10 | | | |
| 8 | 1.9455 | 0.63 | 1.511717 | 56.5 | } G4 |
| 9 | 0.9499 | 0.80 | | | |
| 10 | ∞ | 0.30 | 1.51825 | 64.1 | } GF |
| 11 | ∞ | 0.88 | | | |

*AD: APERTURE DIAPHRAGM

FIG.26B

EXAMPLE 5: AD DATA

| F NUMBER | VARIABLE AD (St2, St3) | | FIXED AD | |
|---|---|---|---|---|
| | AD DIAMETER | POSITION (D0) | AD DIAMETER | POSITION |
| F2.4 | — | — | 0.940 | 0.00 |
| F3.2 | 0.720 | 0.56 | 0.940 | 0.00 |
| F4.8 | 0.490 | 0.65 | 0.940 | 0.00 |

* AD : APERTURE DIAPHRAGM

FIG.27

| EXAMPLE 5 : ASPHERIC DATA | | | | | |
|---|---|---|---|---|---|
| S No. | K | B3 | B4 | B5 | B6 |
| 2 | 6.11E+00 | 0.00E+00 | -3.50E-02 | 0.00E+00 | -1.30E-03 |
| 3 | 1.00E+01 | 0.00E+00 | -8.01E-02 | 0.00E+00 | 1.47E-02 |
| 4 | 7.16E+00 | 8.29E-02 | -5.47E-01 | 1.18E+00 | -1.95E+00 |
| 5 | -2.16E+00 | 1.01E-01 | -5.57E-01 | 1.59E+00 | -2.97E+00 |
| 6 | -6.78E+00 | 2.30E-02 | -3.97E-02 | 3.65E-01 | -8.16E-01 |
| 7 | -6.38E+00 | -7.48E-03 | -1.29E-01 | 1.14E-01 | -3.71E-02 |
| 8 | -6.62E-01 | 1.65E-02 | -1.92E-01 | -8.71E-03 | 4.96E-02 |
| 9 | -2.17E+00 | 1.30E-01 | -3.18E-01 | 1.68E-01 | -8.07E-03 |
| | B7 | B8 | B9 | B10 | B11 |
| 2 | 0.00E+00 | -1.77E-02 | 0.00E+00 | 3.82E-03 | 0.00E+00 |
| 3 | 0.00E+00 | -1.75E-03 | 0.00E+00 | 1.82E-04 | 0.00E+00 |
| 4 | 2.01E+00 | -1.24E+00 | 4.48E-01 | -7.49E-02 | 0.00E+00 |
| 5 | 3.38E+00 | -2.27E+00 | 8.31E-01 | -1.28E-01 | 0.00E+00 |
| 6 | 8.75E-01 | -5.06E-01 | 1.53E-01 | -1.92E-02 | 0.00E+00 |
| 7 | -3.19E-03 | 5.02E-03 | -6.17E-04 | 1.17E-03 | -4.38E-04 |
| 8 | 1.24E-03 | -3.70E-03 | -1.73E-03 | 3.95E-04 | 1.04E-04 |
| 9 | -1.90E-02 | 2.23E-03 | 2.15E-03 | -4.28E-04 | -1.06E-04 |
| | B12 | B13 | B14 | B15 | B16 |
| 2 | 0.00E+00 | 0.00E+00 | 0.00E+00 | 0.00E+00 | 0.00E+00 |
| 3 | 0.00E+00 | 0.00E+00 | 0.00E+00 | 0.00E+00 | 0.00E+00 |
| 4 | 0.00E+00 | 0.00E+00 | 0.00E+00 | 0.00E+00 | 0.00E+00 |
| 5 | 0.00E+00 | 0.00E+00 | 0.00E+00 | 0.00E+00 | 0.00E+00 |
| 6 | 0.00E+00 | 0.00E+00 | 0.00E+00 | 0.00E+00 | 0.00E+00 |
| 7 | 2.40E-04 | -1.01E-04 | 1.93E-05 | -2.81E-05 | -7.43E-06 |
| 8 | 4.19E-06 | 5.05E-06 | 3.40E-07 | -1.89E-06 | 2.66E-08 |
| 9 | 1.32E-05 | 1.53E-05 | -4.80E-06 | -2.69E-07 | 3.79E-07 |
| | B17 | B18 | B19 | B20 | |
| 2 | 0.00E+00 | 0.00E+00 | 0.00E+00 | 0.00E+00 | |
| 3 | 0.00E+00 | 0.00E+00 | 0.00E+00 | 0.00E+00 | |
| 4 | 0.00E+00 | 0.00E+00 | 0.00E+00 | 0.00E+00 | |
| 5 | 0.00E+00 | 0.00E+00 | 0.00E+00 | 0.00E+00 | |
| 6 | 0.00E+00 | 0.00E+00 | 0.00E+00 | 0.00E+00 | |
| 7 | 8.41E-06 | -3.47E-06 | 2.58E-06 | -6.17E-07 | |
| 8 | -1.57E-07 | 1.98E-08 | 3.19E-08 | -5.05E-09 | |
| 9 | -1.99E-08 | -1.95E-08 | 3.90E-09 | -2.81E-10 | |

* S No. : SURFACE NUMBER

FIG.28A

| EXAMPLE 5 : SURFACE FORM OF THIRD LENS G3 ON OBJECT SIDE |||
|---|---|---|
| HEIGHT h | Sag | Dsag |
| 0.000 | 0.000 | 0.000 |
| 0.100 | 0.000 | -0.005 |
| 0.200 | -0.001 | -0.009 |
| 0.300 | -0.002 | -0.009 |
| 0.400 | -0.003 | -0.007 |
| 0.500 | -0.003 | -0.002 |
| 0.600 | -0.003 | 0.005 |
| 0.700 | -0.002 | 0.013 |
| 0.800 | 0.000 | 0.023 |
| 0.900 | 0.003 | 0.034 |
| 1.000 | 0.007 | 0.049 |
| 1.100 | 0.012 | 0.068 |
| 1.200 | 0.020 | 0.091 |
| 1.300 | 0.031 | 0.119 |
| 1.400 | 0.044 | 0.151 |
| 1.500 | 0.061 | 0.188 |
| 1.600 | 0.082 | 0.225 |
| 1.700 | 0.106 | 0.255 |
| 1.800 | 0.132 | 0.261 |
| 1.900 | 0.156 | 0.205 |

FIG.29A

| EXAMPLE 5 : SURFACE FORM OF THIRD LENS G3 ON IMAGE SIDE | | |
|---|---|---|
| HEIGHT h | Sag | Dsag |
| 0.000 | 0.000 | 0.000 |
| 0.100 | -0.003 | -0.059 |
| 0.200 | -0.012 | -0.117 |
| 0.300 | -0.026 | -0.173 |
| 0.400 | -0.046 | -0.227 |
| 0.500 | -0.072 | -0.278 |
| 0.600 | -0.102 | -0.327 |
| 0.700 | -0.137 | -0.374 |
| 0.800 | -0.177 | -0.419 |
| 0.900 | -0.221 | -0.462 |
| 1.000 | -0.269 | -0.502 |
| 1.100 | -0.321 | -0.534 |
| 1.200 | -0.375 | -0.555 |
| 1.300 | -0.431 | -0.558 |
| 1.400 | -0.486 | -0.534 |
| 1.500 | -0.537 | -0.476 |
| 1.600 | -0.580 | -0.376 |
| 1.700 | -0.611 | -0.239 |
| 1.800 | -0.627 | -0.078 |
| 1.900 | -0.627 | 0.079 |
| 2.000 | -0.612 | 0.194 |
| 2.100 | -0.590 | 0.237 |

FIG.30A

EXAMPLE 6: BASIC LENS DATA

| Si SURFACE NUMBER | Ri CURVATURE RADIUS | Di SURFACE SPACING | Ndj REFRACTIVE INDEX | νdj ABBE NUMBER |
|---|---|---|---|---|
| 0 (VARIABLE AD) | — | D0 (VARIABLE) | | |
| 1 (FIXED AD) | — | 0.00 | | |
| 2 | 3.2595 | 1.02 | 1.533421 | 55.4 |
| 3 | -13.8361 | 0.15 | | |
| 4 | 5.881 | 0.50 | 1.619643 | 25.5 |
| 5 | 2.8689 | 0.67 | | |
| 6 | -9.3639 | 1.36 | 1.511717 | 56.5 |
| 7 | -1.6753 | 0.10 | | |
| 8 | 1.9151 | 0.64 | 1.511717 | 56.5 |
| 9 | 0.9549 | 0.80 | | |
| 10 | ∞ | 0.30 | 1.51825 | 64.1 |
| 11 | ∞ | 0.91 | | |

G1: surfaces 2–3
G2: surfaces 4–5
G3: surfaces 6–7
G4: surfaces 8–9
GF: surfaces 10–11

*AD : APERTURE DIAPHRAGM

FIG.30B

EXAMPLE 6: AD DATA

| F NUMBER | VARIABLE AD (St2, St3) | | FIXED AD | |
|---|---|---|---|---|
| | AD DIAMETER | POSITION (D0) | AD DIAMETER | POSITION |
| F2.4 | — | — | 0.940 | 0.00 |
| F3.2 | 0.720 | 0.56 | 0.940 | 0.00 |
| F4.8 | 0.490 | 0.65 | 0.940 | 0.00 |

* AD : APERTURE DIAPHRAGM

FIG.31

| EXAMPLE 6 : ASPHERIC DATA | | | | | |
|---|---|---|---|---|---|
| S No. | K | B3 | B4 | B5 | B6 |
| 2 | 5.14E+00 | 0.00E+00 | -2.71E-02 | 0.00E+00 | -1.63E-03 |
| 3 | 9.67E+00 | 0.00E+00 | -8.94E-02 | 0.00E+00 | 2.22E-02 |
| 4 | 7.08E+00 | 8.26E-02 | -5.48E-01 | 1.18E+00 | -1.95E+00 |
| 5 | -9.12E-01 | 1.06E-01 | -5.56E-01 | 1.59E+00 | -2.97E+00 |
| 6 | -9.77E+00 | 2.43E-02 | -3.82E-02 | 3.65E-01 | -8.16E-01 |
| 7 | -6.42E+00 | -9.96E-03 | -1.30E-01 | 1.14E-01 | -3.71E-02 |
| 8 | -4.98E-01 | 2.75E-02 | -1.94E-01 | -1.03E-02 | 4.93E-02 |
| 9 | -2.04E+00 | 1.28E-01 | -3.18E-01 | 1.68E-01 | -8.10E-03 |
| | B7 | B8 | B9 | B10 | B11 |
| 2 | 0.00E+00 | -1.35E-02 | 0.00E+00 | 3.02E-03 | 0.00E+00 |
| 3 | 0.00E+00 | 1.31E-04 | 0.00E+00 | -5.39E-04 | 0.00E+00 |
| 4 | 2.01E+00 | -1.24E+00 | 4.48E-01 | -7.49E-02 | 0.00E+00 |
| 5 | 3.38E+00 | -2.27E+00 | 8.31E-01 | -1.28E-01 | 0.00E+00 |
| 6 | 8.75E-01 | -5.06E-01 | 1.53E-01 | -1.92E-02 | 0.00E+00 |
| 7 | -3.15E-03 | 5.04E-03 | -6.04E-04 | 1.17E-03 | -4.36E-04 |
| 8 | 1.25E-03 | -3.69E-03 | -1.73E-03 | 3.97E-04 | 1.05E-04 |
| 9 | -1.90E-02 | 2.23E-03 | 2.15E-03 | -4.28E-04 | -1.06E-04 |
| | B12 | B13 | B14 | B15 | B16 |
| 2 | 0.00E+00 | 0.00E+00 | 0.00E+00 | 0.00E+00 | 0.00E+00 |
| 3 | 0.00E+00 | 0.00E+00 | 0.00E+00 | 0.00E+00 | 0.00E+00 |
| 4 | 0.00E+00 | 0.00E+00 | 0.00E+00 | 0.00E+00 | 0.00E+00 |
| 5 | 0.00E+00 | 0.00E+00 | 0.00E+00 | 0.00E+00 | 0.00E+00 |
| 6 | 0.00E+00 | 0.00E+00 | 0.00E+00 | 0.00E+00 | 0.00E+00 |
| 7 | 2.41E-04 | -1.01E-04 | 1.94E-05 | -2.81E-05 | -7.43E-06 |
| 8 | 4.36E-06 | 5.11E-06 | 3.63E-07 | -1.88E-06 | 2.95E-08 |
| 9 | 1.33E-05 | 1.53E-05 | -4.80E-06 | -2.70E-07 | 3.79E-07 |
| | B17 | B18 | B19 | B20 | |
| 2 | 0.00E+00 | 0.00E+00 | 0.00E+00 | 0.00E+00 | |
| 3 | 0.00E+00 | 0.00E+00 | 0.00E+00 | 0.00E+00 | |
| 4 | 0.00E+00 | 0.00E+00 | 0.00E+00 | 0.00E+00 | |
| 5 | 0.00E+00 | 0.00E+00 | 0.00E+00 | 0.00E+00 | |
| 6 | 0.00E+00 | 0.00E+00 | 0.00E+00 | 0.00E+00 | |
| 7 | 8.40E-06 | -3.48E-06 | 2.57E-06 | -6.19E-07 | |
| 8 | -1.56E-07 | 2.00E-08 | 3.19E-08 | -5.13E-09 | |
| 9 | -1.99E-08 | -1.95E-08 | 3.90E-09 | -2.82E-10 | |

* S No. : SURFACE NUMBER

FIG.32A

| EXAMPLE 6 : SURFACE FORM OF THIRD LENS G3 ON OBJECT SIDE | | |
|---|---|---|
| HEIGHT h | Sag | Dsag |
| 0.000 | 0.000 | 0.000 |
| 0.100 | -0.001 | -0.010 |
| 0.200 | -0.002 | -0.018 |
| 0.300 | -0.004 | -0.023 |
| 0.400 | -0.006 | -0.025 |
| 0.500 | -0.009 | -0.023 |
| 0.600 | -0.011 | -0.020 |
| 0.700 | -0.013 | -0.014 |
| 0.800 | -0.014 | -0.007 |
| 0.900 | -0.014 | 0.003 |
| 1.000 | -0.013 | 0.017 |
| 1.100 | -0.010 | 0.036 |
| 1.200 | -0.006 | 0.060 |
| 1.300 | 0.002 | 0.090 |
| 1.400 | 0.013 | 0.125 |
| 1.500 | 0.027 | 0.165 |
| 1.600 | 0.046 | 0.206 |
| 1.700 | 0.068 | 0.242 |
| 1.800 | 0.093 | 0.255 |
| 1.900 | 0.117 | 0.207 |

FIG.33A

| EXAMPLE 6 : SURFACE FORM OF THIRD LENS G3 ON IMAGE SIDE | | |
|---|---|---|
| HEIGHT h | Sag | Dsag |
| 0.000 | 0.000 | 0.000 |
| 0.100 | -0.003 | -0.060 |
| 0.200 | -0.012 | -0.119 |
| 0.300 | -0.027 | -0.176 |
| 0.400 | -0.047 | -0.230 |
| 0.500 | -0.073 | -0.282 |
| 0.600 | -0.103 | -0.332 |
| 0.700 | -0.139 | -0.380 |
| 0.800 | -0.179 | -0.427 |
| 0.900 | -0.224 | -0.471 |
| 1.000 | -0.273 | -0.511 |
| 1.100 | -0.326 | -0.545 |
| 1.200 | -0.382 | -0.567 |
| 1.300 | -0.439 | -0.571 |
| 1.400 | -0.495 | -0.546 |
| 1.500 | -0.547 | -0.484 |
| 1.600 | -0.591 | -0.379 |
| 1.700 | -0.621 | -0.230 |
| 1.800 | -0.636 | -0.052 |
| 1.900 | -0.632 | 0.128 |
| 2.000 | -0.611 | 0.267 |
| 2.100 | -0.581 | 0.319 |

FIG.34A

EXAMPLE 7: BASIC LENS DATA

| Si SURFACE NUMBER | Ri CURVATURE RADIUS | Di SURFACE SPACING | Ndj REFRACTIVE INDEX | νdj ABBE NUMBER | |
|---|---|---|---|---|---|
| 0 (VARIABLE AD) | — | D0 (VARIABLE) | | | |
| 1 (FIXED AD) | — | 0.00 | | | |
| 2 | 3.9188 | 0.92 | 1.69293 | 53.2 | ⎫ G1 |
| 3 | −38.3238 | 0.28 | | | ⎭ |
| 4 | 6.0837 | 0.50 | 1.619673 | 25.5 | ⎫ G2 |
| 5 | 2.8596 | 0.61 | | | ⎭ |
| 6 | ∞ | 1.46 | 1.511711 | 56.5 | ⎫ G3 |
| 7 | −1.9046 | 0.10 | | | ⎭ |
| 8 | 1.963 | 0.59 | 1.511711 | 56.5 | ⎫ G4 |
| 9 | 0.9972 | 0.80 | | | ⎭ |
| 10 | ∞ | 0.30 | 1.518249 | 64.1 | ⎫ GF |
| 11 | ∞ | 0.84 | | | ⎭ |

*AD: APERTURE DIAPHRAGM

FIG.34B

| | EXAMPLE 7: AD DATA | | | |
|---|---|---|---|---|
| | VARIABLE AD (St2, St3) | | FIXED AD | |
| F NUMBER | AD DIAMETER | POSITION (D0) | AD DIAMETER | POSITION |
| F2.4 | — | — | 0.940 | 0.00 |
| F3.2 | 0.720 | 0.56 | 0.940 | 0.00 |
| F4.8 | 0.490 | 0.65 | 0.940 | 0.00 |

*AD: APERTURE DIAPHRAGM

FIG.35

| EXAMPLE 7 : ASPHERIC DATA | | | | | |
|---|---|---|---|---|---|
| S No. | K | B3 | B4 | B5 | B6 |
| 2 | 8.07E+00 | 0.00E+00 | -3.28E-02 | 0.00E+00 | -2.93E-04 |
| 3 | -1.00E+01 | 0.00E+00 | -6.84E-02 | 0.00E+00 | 1.01E-02 |
| 4 | 1.00E+01 | 8.63E-02 | -5.56E-01 | 1.18E+00 | -1.94E+00 |
| 5 | -3.42E+00 | 1.02E-01 | -5.63E-01 | 1.59E+00 | -2.97E+00 |
| 6 | 0.00E+00 | 1.64E-02 | -3.95E-02 | 3.62E-01 | -8.15E-01 |
| 7 | -8.57E+00 | -3.67E-03 | -1.31E-01 | 1.14E-01 | -3.71E-02 |
| 8 | -1.61E+00 | 2.92E-02 | -1.90E-01 | -1.45E-02 | 5.09E-02 |
| 9 | -2.14E+00 | 1.32E-01 | -3.33E-01 | 1.76E-01 | -8.50E-03 |
|   | B7 | B8 | B9 | B10 | B11 |
| 2 | 0.00E+00 | -1.37E-02 | 0.00E+00 | 2.70E-03 | 0.00E+00 |
| 3 | 0.00E+00 | -1.11E-03 | 0.00E+00 | 3.97E-04 | 0.00E+00 |
| 4 | 2.01E+00 | -1.24E+00 | 4.47E-01 | -7.41E-02 | 0.00E+00 |
| 5 | 3.39E+00 | -2.27E+00 | 8.30E-01 | -1.28E-01 | 0.00E+00 |
| 6 | 8.76E-01 | -5.05E-01 | 1.53E-01 | -1.92E-02 | 0.00E+00 |
| 7 | -3.14E-03 | 5.01E-03 | -6.25E-04 | 1.16E-03 | -4.40E-04 |
| 8 | 2.06E-03 | -3.61E-03 | -1.77E-03 | 3.81E-04 | 1.01E-04 |
| 9 | -1.95E-02 | 2.37E-03 | 2.15E-03 | -4.41E-04 | -1.05E-04 |
|   | B12 | B13 | B14 | B15 | B16 |
| 2 | 0.00E+00 | 0.00E+00 | 0.00E+00 | 0.00E+00 | 0.00E+00 |
| 3 | 0.00E+00 | 0.00E+00 | 0.00E+00 | 0.00E+00 | 0.00E+00 |
| 4 | 0.00E+00 | 0.00E+00 | 0.00E+00 | 0.00E+00 | 0.00E+00 |
| 5 | 0.00E+00 | 0.00E+00 | 0.00E+00 | 0.00E+00 | 0.00E+00 |
| 6 | 0.00E+00 | 0.00E+00 | 0.00E+00 | 0.00E+00 | 0.00E+00 |
| 7 | 2.39E-04 | -1.01E-04 | 1.93E-05 | -2.81E-05 | -7.38E-06 |
| 8 | 1.44E-06 | 4.67E-06 | 2.44E-07 | -1.86E-06 | 7.01E-08 |
| 9 | 1.39E-05 | 1.56E-05 | -4.96E-06 | -2.76E-07 | 3.82E-07 |
|   | B17 | B18 | B19 | B20 | |
| 2 | 0.00E+00 | 0.00E+00 | 0.00E+00 | 0.00E+00 | |
| 3 | 0.00E+00 | 0.00E+00 | 0.00E+00 | 0.00E+00 | |
| 4 | 0.00E+00 | 0.00E+00 | 0.00E+00 | 0.00E+00 | |
| 5 | 0.00E+00 | 0.00E+00 | 0.00E+00 | 0.00E+00 | |
| 6 | 0.00E+00 | 0.00E+00 | 0.00E+00 | 0.00E+00 | |
| 7 | 8.41E-06 | -3.47E-06 | 2.58E-06 | -6.16E-07 | |
| 8 | -1.37E-07 | 2.59E-08 | 3.22E-08 | -6.49E-09 | |
| 9 | -1.88E-08 | -1.98E-08 | 4.07E-09 | -3.17E-10 | |

\* S No. : SURFACE NUMBER

FIG.36A

| EXAMPLE 7 : SURFACE FORM OF THIRD LENS G3 ON OBJECT SIDE | | |
|---|---|---|
| HEIGHT h | Sag | Dsag |
| 0.000 | 0.000 | 0.000 |
| 0.100 | 0.000 | 0.000 |
| 0.200 | 0.000 | 0.002 |
| 0.300 | 0.001 | 0.007 |
| 0.400 | 0.002 | 0.013 |
| 0.500 | 0.003 | 0.022 |
| 0.600 | 0.006 | 0.032 |
| 0.700 | 0.010 | 0.042 |
| 0.800 | 0.014 | 0.053 |
| 0.900 | 0.020 | 0.065 |
| 1.000 | 0.027 | 0.080 |
| 1.100 | 0.036 | 0.097 |
| 1.200 | 0.047 | 0.119 |
| 1.300 | 0.060 | 0.145 |
| 1.400 | 0.076 | 0.175 |
| 1.500 | 0.095 | 0.208 |
| 1.600 | 0.118 | 0.241 |
| 1.700 | 0.143 | 0.264 |
| 1.800 | 0.170 | 0.259 |
| 1.900 | 0.193 | 0.183 |

FIG.37A

| EXAMPLE 7 : SURFACE FORM OF THIRD LENS G3 ON IMAGE SIDE |||
|---|---|---|
| HEIGHT h | Sag | Dsag |
| 0.000 | 0.000 | 0.000 |
| 0.100 | -0.003 | -0.052 |
| 0.200 | -0.010 | -0.104 |
| 0.300 | -0.023 | -0.154 |
| 0.400 | -0.041 | -0.202 |
| 0.500 | -0.064 | -0.248 |
| 0.600 | -0.091 | -0.292 |
| 0.700 | -0.122 | -0.335 |
| 0.800 | -0.158 | -0.377 |
| 0.900 | -0.197 | -0.416 |
| 1.000 | -0.241 | -0.452 |
| 1.100 | -0.288 | -0.482 |
| 1.200 | -0.337 | -0.500 |
| 1.300 | -0.387 | -0.501 |
| 1.400 | -0.436 | -0.475 |
| 1.500 | -0.481 | -0.415 |
| 1.600 | -0.518 | -0.316 |
| 1.700 | -0.543 | -0.180 |
| 1.800 | -0.553 | -0.024 |
| 1.900 | -0.548 | 0.125 |
| 2.000 | -0.529 | 0.232 |
| 2.100 | -0.504 | 0.273 |

FIG.38A

EXAMPLE 8: BASIC LENS DATA

| Si SURFACE NUMBER | Ri CURVATURE RADIUS | Di SURFACE SPACING | Ndj REFRACTIVE INDEX | νdj ABBE NUMBER | |
|---|---|---|---|---|---|
| 0 (VARIABLE AD) | — | D0 (VARIABLE) | | | |
| 1 (FIXED AD) | — | 0.00 | | | |
| 2 | 3.7242 | 0.87 | 1.69293 | 53.2 | } G1 |
| 3 | −105.5872 | 0.27 | | | |
| 4 | 5.4872 | 0.50 | 1.619673 | 25.5 | } G2 |
| 5 | 2.7535 | 0.58 | | | |
| 6 | 10000 | 1.18 | 1.511711 | 56.5 | } G3 |
| 7 | −4.9353 | 0.31 | | | |
| 8 | 1.2902 | 0.67 | 1.511711 | 56.5 | } G4 |
| 9 | 1.0596 | 0.80 | | | |
| 10 | ∞ | 0.30 | 1.518249 | 64.1 | } GF |
| 11 | ∞ | 0.72 | | | |

*AD: APERTURE DIAPHRAGM

FIG.38B

EXAMPLE 8: AD DATA

| F NUMBER | VARIABLE AD (St2, St3) | | FIXED AD | |
|---|---|---|---|---|
| | AD DIAMETER | POSITION (D0) | AD DIAMETER | POSITION |
| F2.4 | — | — | 0.940 | 0.00 |
| F3.2 | 0.720 | 0.56 | 0.940 | 0.00 |
| F4.8 | 0.490 | 0.65 | 0.940 | 0.00 |

* AD : APERTURE DIAPHRAGM

FIG.39

| EXAMPLE 8 : ASPHERIC DATA | | | | | |
|---|---|---|---|---|---|
| S No. | K | B3 | B4 | B5 | B6 |
| 2 | 2.40E+00 | 0.00E+00 | -2.36E-02 | 0.00E+00 | 7.20E-03 |
| 3 | -9.96E+00 | 0.00E+00 | -7.25E-02 | 0.00E+00 | 6.92E-03 |
| 4 | 1.00E+01 | 7.54E-02 | -5.28E-01 | 1.16E+00 | -1.95E+00 |
| 5 | -8.20E+00 | 8.60E-02 | -4.84E-01 | 1.52E+00 | -2.93E+00 |
| 6 | 1.00E+00 | -5.10E-04 | -3.13E-02 | 3.60E-01 | -8.15E-01 |
| 7 | -9.41E+00 | -8.33E-02 | -8.16E-02 | 1.21E-01 | -4.94E-02 |
| 8 | -8.20E-01 | -7.41E-02 | -1.58E-01 | 9.77E-03 | 3.20E-02 |
| 9 | -1.41E+00 | 8.96E-02 | -3.07E-01 | 1.65E-01 | -1.20E-02 |
| | B7 | B8 | B9 | B10 | B11 |
| 2 | 0.00E+00 | -2.09E-02 | 0.00E+00 | 8.30E-03 | 0.00E+00 |
| 3 | 0.00E+00 | 1.68E-03 | 0.00E+00 | 8.64E-05 | 0.00E+00 |
| 4 | 2.02E+00 | -1.23E+00 | 4.42E-01 | -7.59E-02 | 0.00E+00 |
| 5 | 3.36E+00 | -2.27E+00 | 8.40E-01 | -1.32E-01 | 0.00E+00 |
| 6 | 8.76E-01 | -5.06E-01 | 1.54E-01 | -1.96E-02 | 0.00E+00 |
| 7 | -9.73E-04 | 4.57E-03 | -6.28E-04 | 1.38E-03 | -4.28E-04 |
| 8 | 4.51E-03 | -4.76E-03 | -4.61E-04 | 2.63E-03 | -3.00E-05 |
| 9 | -1.31E-02 | 3.31E-04 | 1.69E-03 | -1.46E-04 | -9.67E-05 |
| | B12 | B13 | B14 | B15 | B16 |
| 2 | 0.00E+00 | 0.00E+00 | 0.00E+00 | 0.00E+00 | 0.00E+00 |
| 3 | 0.00E+00 | 0.00E+00 | 0.00E+00 | 0.00E+00 | 0.00E+00 |
| 4 | 0.00E+00 | 0.00E+00 | 0.00E+00 | 0.00E+00 | 0.00E+00 |
| 5 | 0.00E+00 | 0.00E+00 | 0.00E+00 | 0.00E+00 | 0.00E+00 |
| 6 | 0.00E+00 | 0.00E+00 | 0.00E+00 | 0.00E+00 | 0.00E+00 |
| 7 | 2.78E-04 | -1.15E-04 | 2.25E-05 | -3.31E-05 | -6.95E-06 |
| 8 | 3.01E-05 | 4.09E-07 | -1.43E-06 | 8.54E-08 | 2.03E-07 |
| 9 | 1.57E-06 | 1.20E-05 | -3.48E-06 | -3.08E-07 | 3.48E-07 |
| | B17 | B18 | B19 | B20 | |
| 2 | 0.00E+00 | 0.00E+00 | 0.00E+00 | 0.00E+00 | |
| 3 | 0.00E+00 | 0.00E+00 | 0.00E+00 | 0.00E+00 | |
| 4 | 0.00E+00 | 0.00E+00 | 0.00E+00 | 0.00E+00 | |
| 5 | 0.00E+00 | 0.00E+00 | 0.00E+00 | 0.00E+00 | |
| 6 | 0.00E+00 | 0.00E+00 | 0.00E+00 | 0.00E+00 | |
| 7 | 7.39E-06 | -3.20E-06 | 2.44E-06 | -5.20E-07 | |
| 8 | -2.40E-07 | 6.80E-09 | -2.54E-09 | 5.50E-09 | |
| 9 | -3.00E-08 | -1.22E-08 | 3.64E-09 | -4.88E-10 | |

\* S No. : SURFACE NUMBER

FIG.40A

| EXAMPLE 8 : SURFACE FORM OF THIRD LENS G3 ON OBJECT SIDE | | |
|---|---|---|
| HEIGHT h | Sag | Dsag |
| 0.000 | 0.000 | 0.000 |
| 0.100 | 0.000 | 0.000 |
| 0.200 | 0.000 | 0.001 |
| 0.300 | 0.000 | 0.003 |
| 0.400 | 0.001 | 0.007 |
| 0.500 | 0.002 | 0.013 |
| 0.600 | 0.003 | 0.020 |
| 0.700 | 0.006 | 0.027 |
| 0.800 | 0.009 | 0.035 |
| 0.900 | 0.013 | 0.045 |
| 1.000 | 0.018 | 0.057 |
| 1.100 | 0.024 | 0.075 |
| 1.200 | 0.033 | 0.098 |
| 1.300 | 0.044 | 0.129 |
| 1.400 | 0.059 | 0.168 |
| 1.500 | 0.078 | 0.214 |
| 1.600 | 0.102 | 0.264 |
| 1.700 | 0.131 | 0.309 |
| 1.800 | 0.163 | 0.323 |
| 1.900 | 0.193 | 0.258 |

FIG.41A

| EXAMPLE 8 : SURFACE FORM OF THIRD LENS G3 ON IMAGE SIDE | | |
|---|---|---|
| HEIGHT h | Sag | Dsag |
| 0.000 | 0.000 | 0.000 |
| 0.100 | -0.001 | -0.023 |
| 0.200 | -0.005 | -0.052 |
| 0.300 | -0.012 | -0.087 |
| 0.400 | -0.022 | -0.127 |
| 0.500 | -0.037 | -0.171 |
| 0.600 | -0.057 | -0.218 |
| 0.700 | -0.081 | -0.267 |
| 0.800 | -0.110 | -0.315 |
| 0.900 | -0.144 | -0.362 |
| 1.000 | -0.182 | -0.406 |
| 1.100 | -0.225 | -0.442 |
| 1.200 | -0.270 | -0.466 |
| 1.300 | -0.317 | -0.470 |
| 1.400 | -0.364 | -0.446 |
| 1.500 | -0.405 | -0.382 |
| 1.600 | -0.439 | -0.274 |
| 1.700 | -0.459 | -0.125 |
| 1.800 | -0.463 | 0.041 |
| 1.900 | -0.451 | 0.183 |
| 2.000 | -0.429 | 0.247 |
| 2.100 | -0.405 | 0.219 |

FIG.42A

EXAMPLE 9 : BASIC LENS DATA

| Si SURFACE NUMBER | Ri CURVATURE RADIUS | Di SURFACE SPACING | Ndj REFRACTIVE INDEX | νdj ABBE NUMBER | |
|---|---|---|---|---|---|
| 0 (VARIABLE AD) | — | D0 (VARIABLE) | — | — | |
| 1 (FIXED AD) | — | 0.00 | — | — | |
| 2 | 3.6515 | 0.87 | 1.69293 | 53.2 | } G1 |
| 3 | -224.7249 | 0.27 | | | |
| 4 | 5.6916 | 0.50 | 1.619673 | 25.5 | } G2 |
| 5 | 2.8094 | 0.59 | | | |
| 6 | 637.6079 | 1.16 | 1.511711 | 56.5 | } G3 |
| 7 | -4.9614 | 0.33 | | | |
| 8 | 1.2906 | 0.67 | 1.511711 | 56.5 | } G4 |
| 9 | 1.0532 | 0.80 | | | |
| 10 | ∞ | 0.30 | 1.518249 | 64.1 | } GF |
| 11 | ∞ | 0.72 | | | |

*AD : APERTURE DIAPHRAGM

FIG.42B

EXAMPLE 9: AD DATA

| F NUMBER | VARIABLE AD (St2, St3) | | FIXED AD | |
|---|---|---|---|---|
| | AD DIAMETER | POSITION (D0) | AD DIAMETER | POSITION |
| F2.4 | — | — | 0.940 | 0.00 |
| F3.2 | 0.720 | 0.56 | 0.940 | 0.00 |
| F4.8 | 0.490 | 0.65 | 0.940 | 0.00 |

* AD: APERTURE DIAPHRAGM

FIG.43

| EXAMPLE 9 : ASPHERIC DATA ||||||
|---|---|---|---|---|---|
| S No. | K | B3 | B4 | B5 | B6 |
| 2 | 2.37E+00 | 0.00E+00 | -2.29E-02 | 0.00E+00 | 6.61E-03 |
| 3 | -1.00E+01 | 0.00E+00 | -7.19E-02 | 0.00E+00 | 6.96E-03 |
| 4 | 1.00E+01 | 7.67E-02 | -5.29E-01 | 1.16E+00 | -1.95E+00 |
| 5 | -8.89E+00 | 8.72E-02 | -4.84E-01 | 1.52E+00 | -2.93E+00 |
| 6 | 1.00E+00 | -1.55E-03 | -3.08E-02 | 3.59E-01 | -8.15E-01 |
| 7 | -7.69E+00 | -7.80E-02 | -8.31E-02 | 1.20E-01 | -4.94E-02 |
| 8 | -9.57E-01 | -6.77E-02 | -1.58E-01 | 8.54E-03 | 3.20E-02 |
| 9 | -1.46E+00 | 8.93E-02 | -3.05E-01 | 1.65E-01 | -1.21E-02 |
|  | B7 | B8 | B9 | B10 | B11 |
| 2 | 0.00E+00 | -1.98E-02 | 0.00E+00 | 7.69E-03 | 0.00E+00 |
| 3 | 0.00E+00 | 1.22E-03 | 0.00E+00 | 2.06E-04 | 0.00E+00 |
| 4 | 2.02E+00 | -1.23E+00 | 4.42E-01 | -7.55E-02 | 0.00E+00 |
| 5 | 3.36E+00 | -2.27E+00 | 8.40E-01 | -1.32E-01 | 0.00E+00 |
| 6 | 8.76E-01 | -5.06E-01 | 1.54E-01 | -1.96E-02 | 0.00E+00 |
| 7 | -8.57E-04 | 4.57E-03 | -6.37E-04 | 1.38E-03 | -4.28E-04 |
| 8 | 4.71E-03 | -4.73E-03 | -4.44E-04 | 2.57E-04 | -3.41E-05 |
| 9 | -1.29E-02 | 3.06E-04 | 1.69E-03 | -1.51E-04 | -9.44E-05 |
|  | B12 | B13 | B14 | B15 | B16 |
| 2 | 0.00E+00 | 0.00E+00 | 0.00E+00 | 0.00E+00 | 0.00E+00 |
| 3 | 0.00E+00 | 0.00E+00 | 0.00E+00 | 0.00E+00 | 0.00E+00 |
| 4 | 0.00E+00 | 0.00E+00 | 0.00E+00 | 0.00E+00 | 0.00E+00 |
| 5 | 0.00E+00 | 0.00E+00 | 0.00E+00 | 0.00E+00 | 0.00E+00 |
| 6 | 0.00E+00 | 0.00E+00 | 0.00E+00 | 0.00E+00 | 0.00E+00 |
| 7 | 2.78E-04 | -1.15E-04 | 2.26E-05 | -3.31E-05 | -6.94E-06 |
| 8 | 2.91E-05 | 1.97E-08 | -1.32E-06 | 1.19E-07 | 2.21E-07 |
| 9 | 1.50E-06 | 1.19E-05 | -3.46E-06 | -3.11E-07 | 3.47E-07 |
|  | B17 | B18 | B19 | B20 |  |
| 2 | 0.00E+00 | 0.00E+00 | 0.00E+00 | 0.00E+00 |  |
| 3 | 0.00E+00 | 0.00E+00 | 0.00E+00 | 0.00E+00 |  |
| 4 | 0.00E+00 | 0.00E+00 | 0.00E+00 | 0.00E+00 |  |
| 5 | 0.00E+00 | 0.00E+00 | 0.00E+00 | 0.00E+00 |  |
| 6 | 0.00E+00 | 0.00E+00 | 0.00E+00 | 0.00E+00 |  |
| 7 | 7.38E-06 | -3.21E-06 | 2.44E-06 | -5.19E-07 |  |
| 8 | -2.26E-07 | 9.09E-09 | -3.04E-09 | 4.78E-09 |  |
| 9 | -3.03E-08 | -1.22E-08 | 3.64E-09 | -4.78E-10 |  |

\* S No. : SURFACE NUMBER

FIG.44A

| EXAMPLE 9 : SURFACE FORM OF THIRD LENS G3 ON OBJECT SIDE | | |
|---|---|---|
| HEIGHT h | Sag | Dsag |
| 0.000 | 0.000 | 0.000 |
| 0.100 | 0.000 | 0.000 |
| 0.200 | 0.000 | 0.001 |
| 0.300 | 0.000 | 0.003 |
| 0.400 | 0.001 | 0.007 |
| 0.500 | 0.002 | 0.013 |
| 0.600 | 0.003 | 0.019 |
| 0.700 | 0.006 | 0.026 |
| 0.800 | 0.008 | 0.033 |
| 0.900 | 0.012 | 0.042 |
| 1.000 | 0.017 | 0.054 |
| 1.100 | 0.023 | 0.070 |
| 1.200 | 0.031 | 0.093 |
| 1.300 | 0.042 | 0.123 |
| 1.400 | 0.056 | 0.161 |
| 1.500 | 0.074 | 0.207 |
| 1.600 | 0.097 | 0.257 |
| 1.700 | 0.126 | 0.301 |
| 1.800 | 0.157 | 0.315 |
| 1.900 | 0.186 | 0.248 |

FIG.45A

| EXAMPLE 9 : SURFACE FORM OF THIRD LENS G3 ON IMAGE SIDE |||
|---|---|---|
| HEIGHT h | Sag | Dsag |
| 0.000 | 0.000 | 0.000 |
| 0.100 | -0.001 | -0.023 |
| 0.200 | -0.005 | -0.051 |
| 0.300 | -0.012 | -0.086 |
| 0.400 | -0.022 | -0.125 |
| 0.500 | -0.037 | -0.169 |
| 0.600 | -0.056 | -0.215 |
| 0.700 | -0.080 | -0.263 |
| 0.800 | -0.108 | -0.311 |
| 0.900 | -0.142 | -0.358 |
| 1.000 | -0.180 | -0.401 |
| 1.100 | -0.222 | -0.438 |
| 1.200 | -0.267 | -0.462 |
| 1.300 | -0.314 | -0.467 |
| 1.400 | -0.359 | -0.443 |
| 1.500 | -0.401 | -0.381 |
| 1.600 | -0.434 | -0.274 |
| 1.700 | -0.455 | -0.127 |
| 1.800 | -0.459 | 0.038 |
| 1.900 | -0.448 | 0.179 |
| 2.000 | -0.426 | 0.242 |
| 2.100 | -0.402 | 0.214 |

FIG.46

VALUES OF CONDITIONAL EXPRESSIONS

| | E No. | EX.1 | EX.2 | EX.3 | EX.4 | EX.5 | EX.6 | EX.7 | EX.8 | EX.9 |
|---|---|---|---|---|---|---|---|---|---|---|
| D3 | | 0.20 | 0.31 | 0.26 | 0.28 | 0.25 | 0.15 | 0.28 | 0.27 | 0.27 |
| D4 | | 0.50 | 0.50 | 0.50 | 0.50 | 0.50 | 0.50 | 0.50 | 0.50 | 0.50 |
| D3/D4 | (1) | 0.40 | 0.62 | 0.53 | 0.57 | 0.51 | 0.30 | 0.57 | 0.54 | 0.54 |
| $\nu d1$ | | 53.2 | 53.2 | 53.2 | 53.2 | 55.4 | 55.4 | 53.2 | 53.2 | 53.2 |
| $\nu d2$ | | 23.2 | 23.2 | 23.2 | 25.5 | 25.5 | 25.5 | 25.5 | 25.5 | 25.5 |
| $\nu d1 - \nu d2$ | (2) | 30 | 30 | 30 | 27.7 | 29.9 | 29.9 | 27.7 | 27.7 | 27.7 |
| f | | 4.59 | 4.59 | 4.59 | 4.67 | 4.68 | 4.71 | 4.68 | 4.61 | 4.63 |
| f1 | | 4.91 | 4.95 | 5.13 | 5.25 | 5.23 | 5.05 | 5.17 | 5.21 | 5.19 |
| f2 | | -9.38 | -9.19 | -9.61 | -9.75 | -9.51 | -9.65 | -9.26 | -9.59 | -9.59 |
| f3 | | 5.10 | 4.71 | 5.44 | 3.83 | 3.57 | 3.76 | 3.72 | 9.64 | 9.63 |
| f4 | | -8.78 | -7.72 | -10.26 | -5.19 | -4.62 | -4.82 | -4.99 | -814.90 | -221.50 |
| f/f3 | (4) | 0.90 | 0.97 | 0.84 | 1.22 | 1.31 | 1.25 | 1.26 | 0.48 | 0.48 |
| f1/f3 | (3) | 0.96 | 1.05 | 0.94 | 1.37 | 1.46 | 1.34 | 1.39 | 0.54 | 0.54 |

E No.: EXPRESSION NUMBER
EX.: EXAMPLE

FIG.47A
EXAMPLE 1(F 2.4)
FIG.47B
EXAMPLE 1(F 2.4)
FIG.47C
EXAMPLE 1(F 2.4)
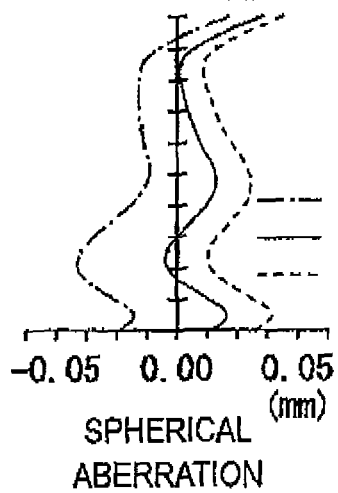
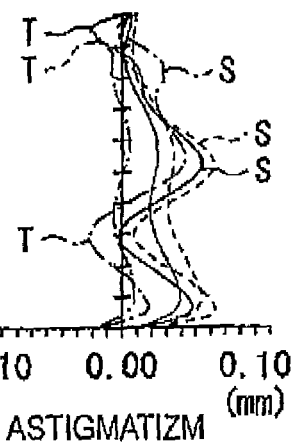
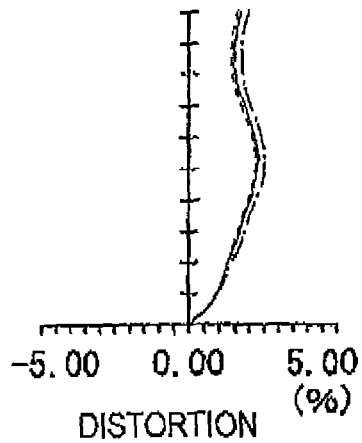
FIG.48A
EXAMPLE 1(F 3.2)
FIG.48B
EXAMPLE 1(F 3.2)
FIG.48C
EXAMPLE 1(F 3.2)
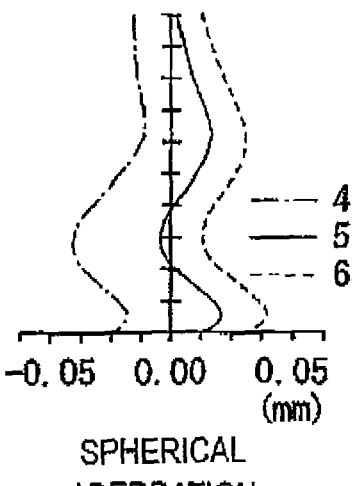
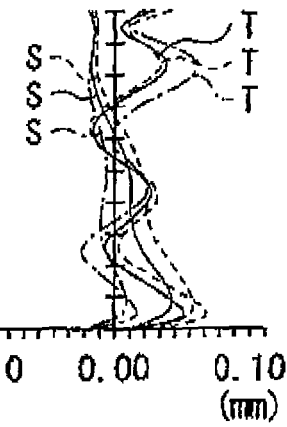
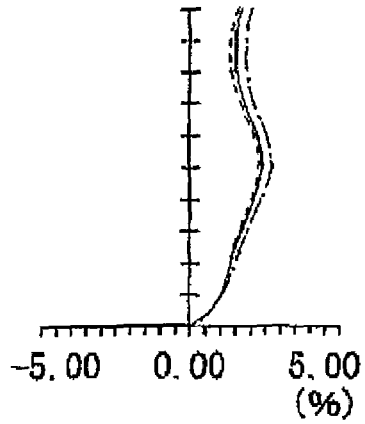

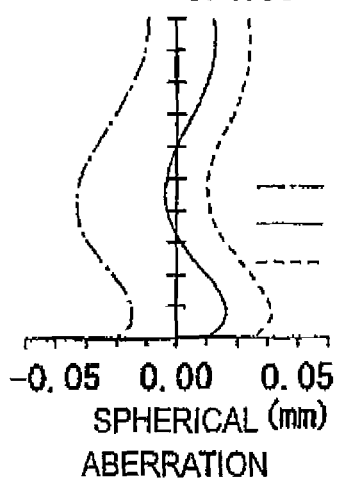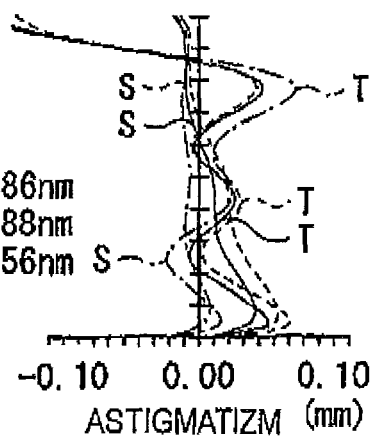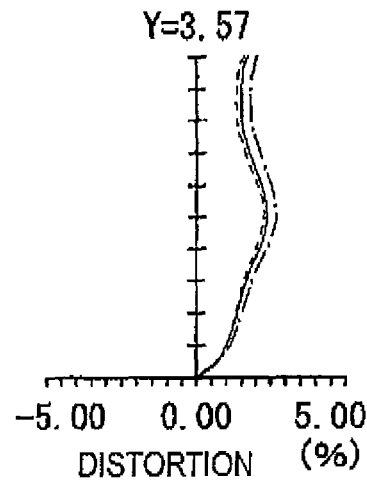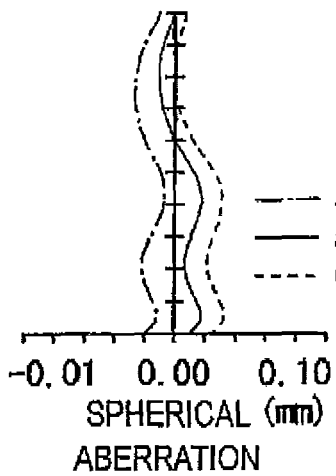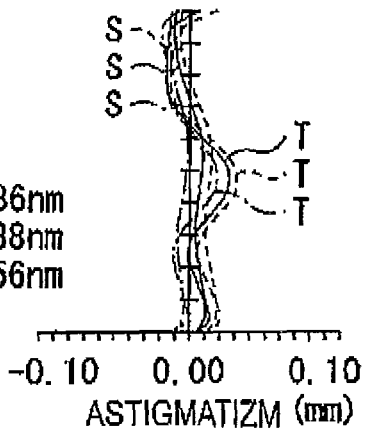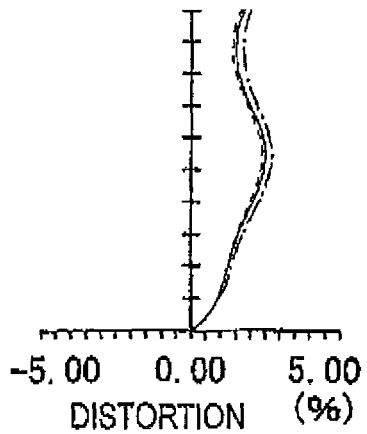

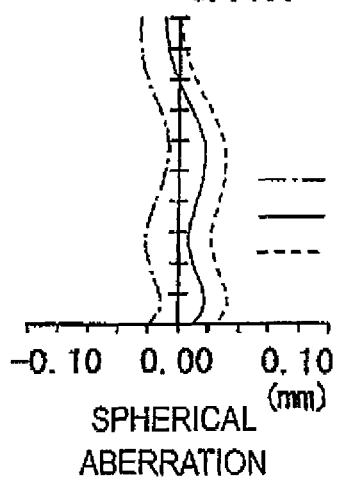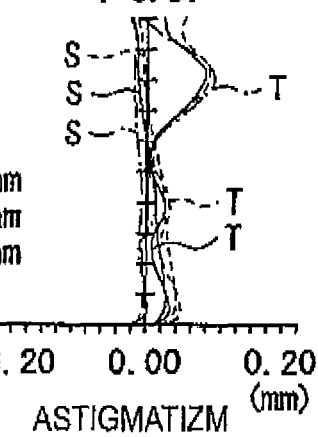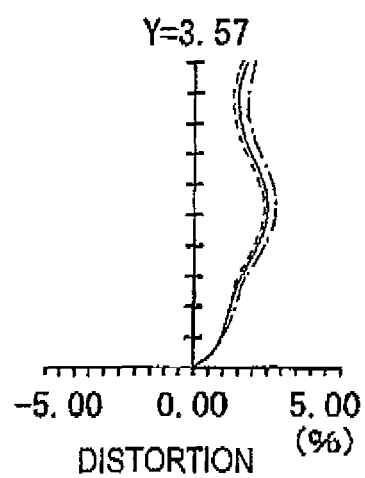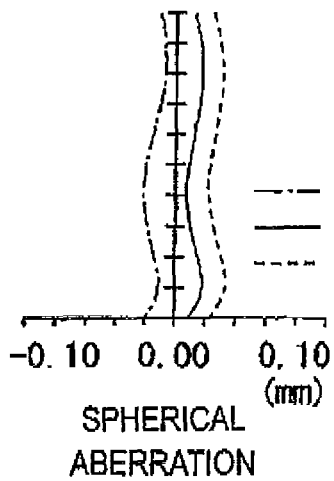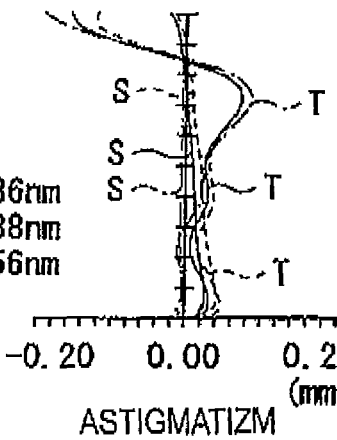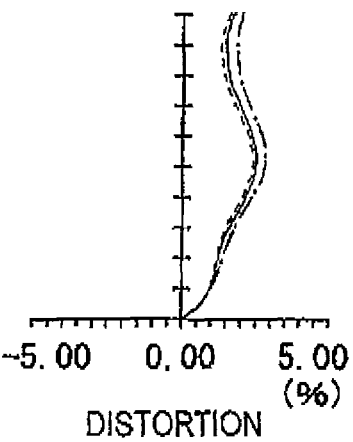

EXAMPLE 3(F 2.4)

EXAMPLE 3(F 2.4)

EXAMPLE 3(F 2.4)

EXAMPLE 3(F 3.2)

EXAMPLE 3(F 3.2)

EXAMPLE 3(F 3.2)

EXAMPLE 3(F 4.8)

SPHERICAL ABERRATION

EXAMPLE 3(F 4.8)

ASTIGMATIZM

EXAMPLE 3(F 4.8)

DISTORTION

EXAMPLE 4(F 2.4)

SPHERICAL ABERRATION

EXAMPLE 4(F 2.4)

ASTIGMATIZM

EXAMPLE 4(F 2.4)

DISTORTION

EXAMPLE 4(F 3.2)
SPHERICAL ABERRATION

EXAMPLE 4(F 3.2)
ASTIGMATIZM

EXAMPLE 4(F 3.2)
DISTORTION

EXAMPLE 4(F 4.8)
SPHERICAL ABERRATION

EXAMPLE 4(F 4.8)
ASTIGMATIZM

EXAMPLE 4(F 4.8)
DISTORTION

EXAMPLE 5(F 2.4)
SPHERICAL ABERRATION

EXAMPLE 5(F 2.4)
ASTIGMATIZM

EXAMPLE 5(F 2.4)
DISTORTION

EXAMPLE 5(F 3.2)
SPHERICAL ABERRATION

EXAMPLE 5(F 3.2)
ASTIGMATIZM

EXAMPLE 5(F 3.2)
DISTORTION

FIG.61A
EXAMPLE 5(F 4.8)
FIG.61B
EXAMPLE 5(F 4.8)
FIG.61C
EXAMPLE 5(F 4.8)
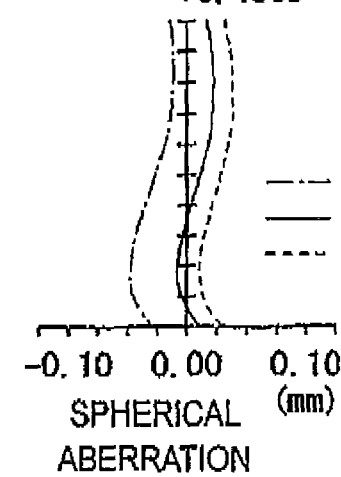
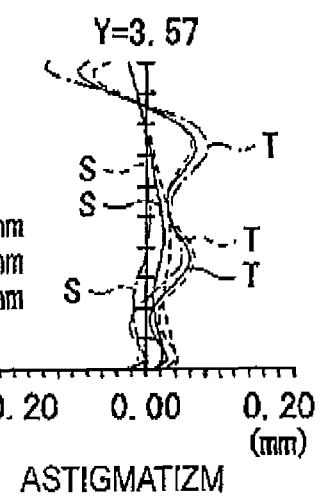
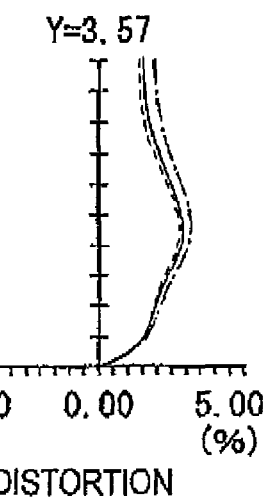
FIG.62A
EXAMPLE 6(F 2.4)
FIG.62B
EXAMPLE 6(F 2.4)
FIG.62C
EXAMPLE 6(F 2.4)
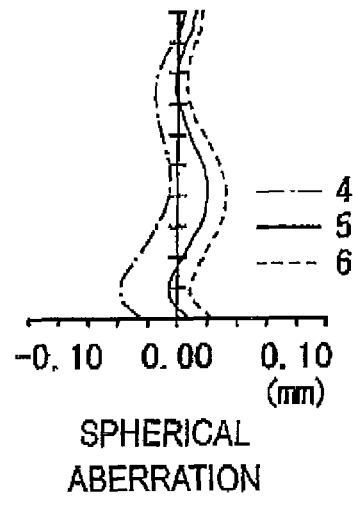
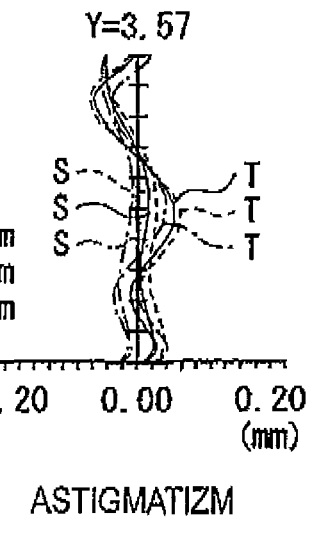
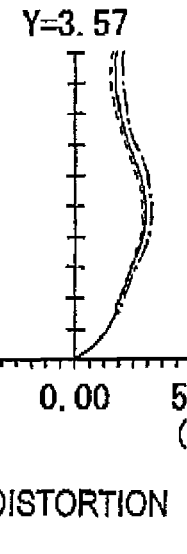

EXAMPLE 6(F 3.2)

EXAMPLE 6(F 3.2)

EXAMPLE 6(F 3.2)

EXAMPLE 6(F 4.8)

EXAMPLE 6(F 4.8)

EXAMPLE 6(F 4.8)

EXAMPLE 7(F 2.4)
SPHERICAL ABERRATION

EXAMPLE 7(F 2.4)
ASTIGMATIZM

EXAMPLE 7(F 2.4)
DISTORTION

EXAMPLE 7(F 3.2)
SPHERICAL ABERRATION

EXAMPLE 7(F 3.2)
ASTIGMATIZM

EXAMPLE 7(F 3.2)
DISTORTION

FIG.67A
EXAMPLE 7(F 4.8)
FIG.67B
EXAMPLE 7(F 4.8)
FIG.67C
EXAMPLE 7(F 4.8)
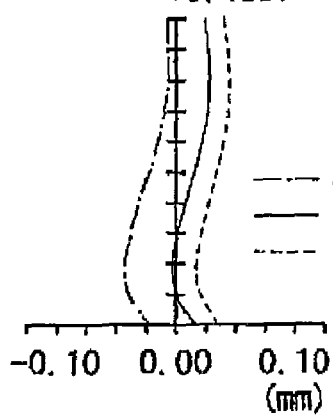
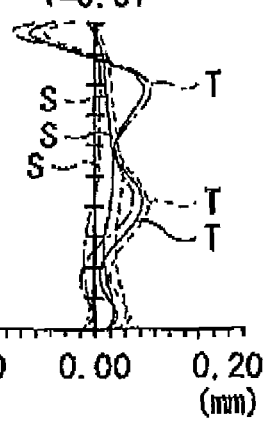
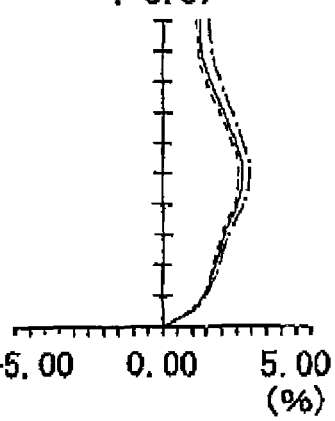
SPHERICAL ABERRATION
ASTIGMATIZM
DISTORTION
FIG.68A
EXAMPLE 8(F 2.4)
FIG.68B
EXAMPLE 8(F 2.4)
FIG.68C
EXAMPLE 8(F 2.4)
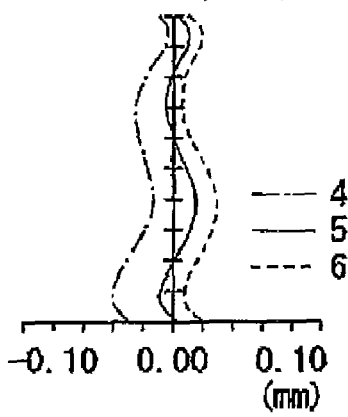
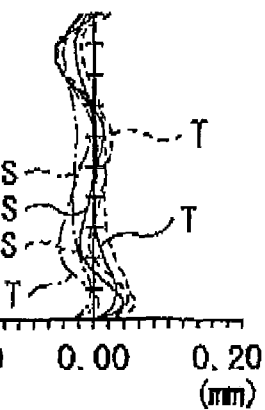
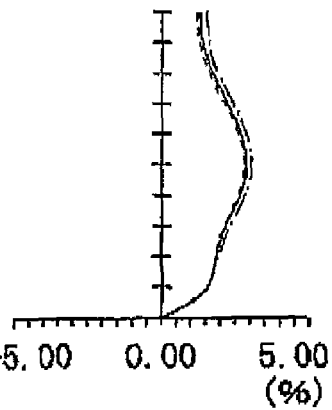
SPHERICAL ABERRATION
ASTIGMATIZM
DISTORTION

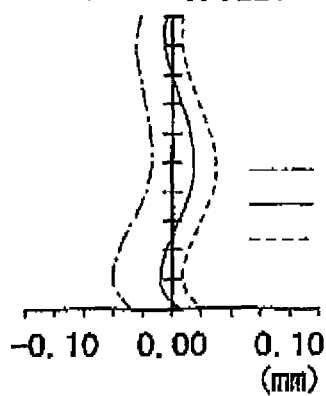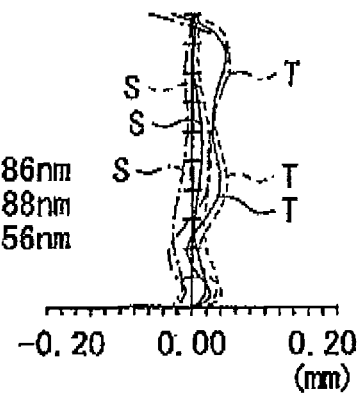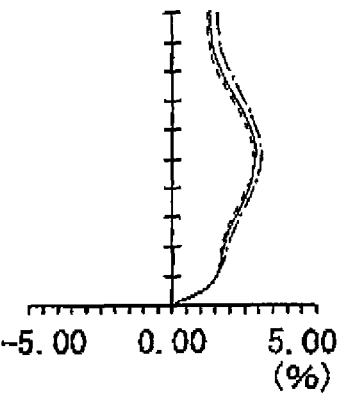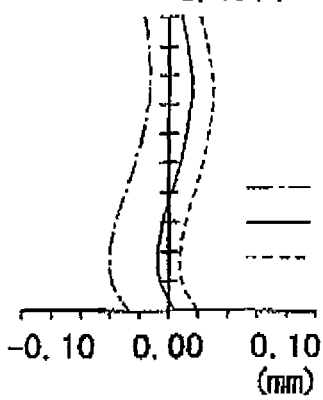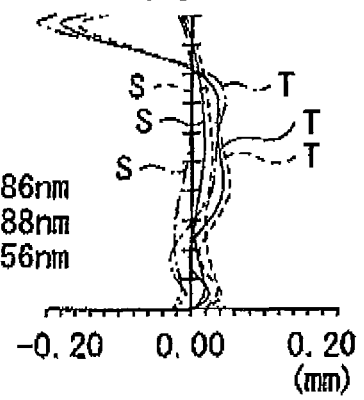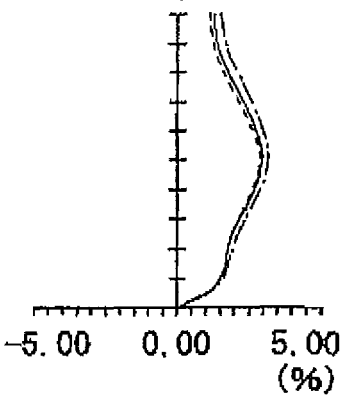

FIG.71A
EXAMPLE 9(F 2.4)
FIG.71B
EXAMPLE 9(F 2.4)
FIG.71C
EXAMPLE 9(F 2.4)
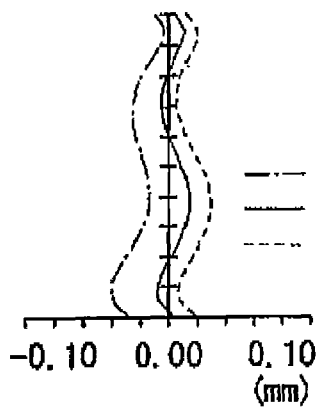
SPHERICAL ABERRATION
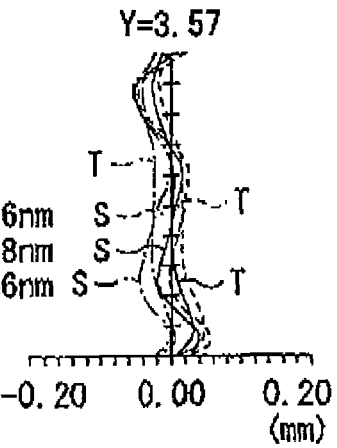
ASTIGMATIZM
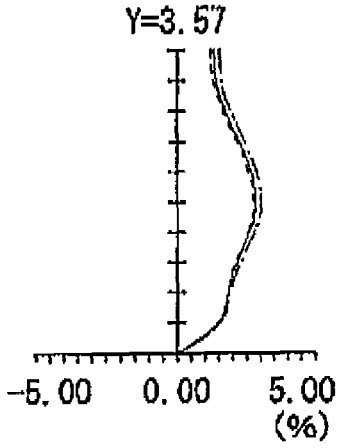
DISTORTION
FIG.72A
EXAMPLE 9(F 3.2)
FIG.72B
EXAMPLE 9(F 3.2)
FIG.72C
EXAMPLE 9(F 3.2)
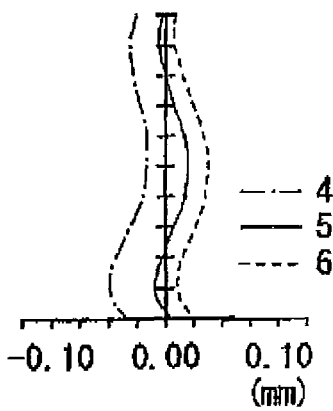
SPHERICAL ABERRATION
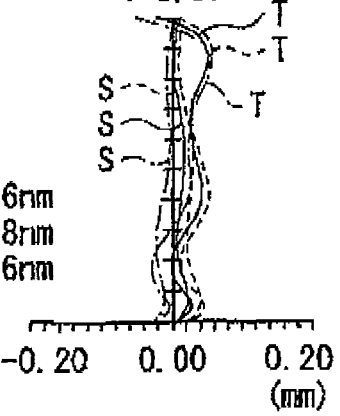
ASTIGMATIZM
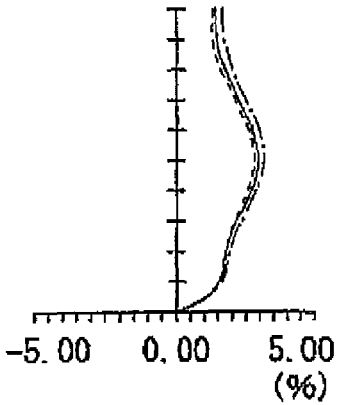
DISTORTION

EXAMPLE 9(F 4.8)

PUPIL RADIUS :0.4841

-·- 486nm
— 588nm
--- 656nm

SPHERICAL ABERRATION

EXAMPLE 9(F 4.8)

Y=3.57

ASTIGMATIZM

EXAMPLE 9(F 4.8)

Y=3.57

DISTORTION

IMAGING LENS AND IMAGE PICKUP DEVICE

CROSS-REFERENCE TO RELATED APPLICATIONS

This application is based on and claims priority under 35 USC 119 from Japanese Patent Application No. 2008-033397 filed Feb. 14, 2008; the entire contents of which are incorporated herein by reference.

BACKGROUND

1. Technical Field

The present invention relates to an imaging lens that forms an optical image of an object to be shot on an image pickup element such as a CCD (Charge Coupled Device) or a CMOS (Complementary Metal Oxide Semiconductor) and an image pickup device such as a digital still camera, a portable cellular phone having a camera and an information portable terminal (PDA: Personal Digital Assistance on which the imaging lens is mounted to shoot the object to be shot.

2. Related Art

In recent years, with the spread of personal computers in ordinary homes, digital still cameras are rapidly popularized to which image information such as the images of shot landscapes or persons can be inputted. Further, camera modules for inputting images are frequently mounted on portable cellular phones. In device having such an image pickup function, the image pickup elements such as the CCD or the CMOS are used. In these years, a miniaturization of the image pickup elements progresses, so that the miniaturization of the entire part of an image pickup devices and the imaging lenses mounted thereon is required. Further, at the same time, pixels of the image pick-up elements are progressively increased and the high resolution and high performance of the imaging lenses are required. For instance, a performance satisfying high pixels such as 2 mega pixels or higher or more preferably, 5 mega pixels or higher is requested.

To satisfy above-described requests, the imaging lens of a structure using four lenses as a whole has been developed (see patent document 1 (JP-A-2005-4028 corresponding to US-A-2004-228009) and patent document 2 (JP-A-2005-208236)).

However, in an imaging lens described in the above-described patent documents, since a second lens has a concave shape directed to an object side, an entire length is increased so that a miniaturization is difficult. Further, since many field curvatures are generated, a problem arises that a high image quality is hardly obtained. Further, in the imaging lens including four lenses having an F number of 2.8 or so, the power of a first lens is usually apt to be relatively strong in a lens system to decrease the entire length. Therefore, the performances of the field curvatures are liable to be deteriorated. While the imaging lens is requested to have a faster (the F number of about 2.4) lens system, the imaging lens is occasionally requested to shoot an object under a state that a fastness is restricted depending on a shooting environment. However, in a compact image pickup device, an aperture diaphragm is frequently a fixed diaphragm in view of a mechanical problem and a problem of cost. In this case, to obtain a state that the fastness is restricted, for instance, a method is considered in which the fast lens system of the F number of about 2.4 is ordinarily used and a small aperture diaphragm having a small diameter is detachably arranged at the nearest position to the object side of the lens system as required to change the F number. Thus, a dynamic range can be enlarged during a shooting operation and a necessary depth of a focal point can be ensured. However, under the state that such a small aperture diaphragm is arranged, since the position of the aperture diaphragm is changed relative to an ordinary state, an image formation performance is changed. Accordingly, when an optical design that considers only an ordinary fast state is drawn, the image formation performance is liable to be deteriorated (especially, the field curvatures are deteriorated) under the state that the small aperture diaphragm is arranged, so that the lens system is insufficient in its performance. Therefore, a lens is desired to be developed that has a performance meeting high pixels, for instance, 2 mega pixels or higher, and more preferably 5 mega pixels to 10 mega pixels or so.

The present invention is devised by considering the above-described problems, and it is an object of the present invention to provide an imaging lens that maintains a good image formation performance, is compact and fast and can realized a lens system whose performance is hardly deteriorated even when the position of an aperture diaphragm is changed and an image pickup device that can obtain a picked-up image of high resolution by mounting the imaging lens thereon.

SUMMARY

According to an aspect of the invention, an imaging lens includes in order from an object side, a stop; a first lens including a positive lens having a convex surface directed to the object side; a second lens that includes, near an optical axis, a negative meniscus shape with a concave surface directed to an image side; a third lens that includes a positive lens having, near the optical axis, a convex surface directed to the image side; and a fourth lens that includes a negative lens having, near the optical axis, a concave surface directed to the image side. Surfaces of the third lens each has an aspheric shape including at least one inflection point, an inclination of each aspheric shape collapses to the image side at the terminal end part of a periphery thereof within an effective diameter. And conditional expressions are satisfied:

$$0.1 < D3/D4 < 2.0 \quad (1)$$

$$vd1 - vd2 > 25 \quad (2)$$

$$0.4 < f1/f3 < 1.6 \quad (3)$$

$$0.3 < f/f3 < 1.5 \quad (4)$$

where

D3 is an air space on the optical axis between the first lens and the second lens, D4 is a central thickness of the second lens, vd1 is an Abbe number of the first lens at the d-line, vd2 is an Abbe number of the second lens at the d-line, f1 is a focal length of the first lens, f3 is a focal length of the third lens and f is a focal length of a whole system.

The imaging lens according to the present invention may further include: at least another stop that is detachably inserted to the optical axis nearer to the object side than the stop.

In that case, the diameters of the stop and said another stop may be fixed and the diameter of said another stop may be smaller than the diameter of the stop.

Further, in the imaging lens according to the present invention, the first lens is preferably a glass lens. Further, a surface of the second lens located in the object side preferably has an aspheric shape having at least one inflection point. Further, a surface of the fourth lens located on the image side preferably has an aspheric shape having two or more inflection points and a positive power in its periphery part.

According to the imaging lens of the present invention, in a lens system including four lenses as a whole, since the lens elements respectively have proper structures, the lens system is easily realized that maintains a good image formation performance and is compact and fast and whose performance is hardly deteriorated even when the position of an aperture diaphragm is changed. Especially, when the conditional expressions (3) and (4) are satisfied and the power of the third lens is made to be relatively stronger than that of a usual imaging lens composed of four lenses, an entire length is easily decreased to obtain a fast lens system that has few field curvatures. Further, since the aspheric shapes of both the surfaces of the third lens are configured as special shapes, even when a small aperture diaphragm (another stop) is arranged, the occurrence of the field curvatures is suppressed.

An image pickup device according to the present invention includes: the imaging lens according to the present invention and an image pickup element that outputs an image pickup signal corresponding to an optical image formed by the imaging lens.

In the image pickup device according to the present invention, the image pickup signal of a high resolution is obtained in accordance with the bright optical image having a high resolution got by the imaging lens of the present invention.

According to the imaging lens of the present invention, in the lens system including the four lenses as a whole, the structures of the lens elements are respectively optimized, the power of the third lens is especially made to be relatively stronger than that of the usual imaging lens including the four lenses and the aspheric shapes of both the surfaces of the third lens are configured as the special shapes. Accordingly, the lens system can be realized that maintains the good image formation performance and is compact and fast and whose performance is hardly deteriorated even when the position of the aperture diaphragm is changed.

Further, according to the image pickup device of the present invention, since the image pickup signal corresponding to the optical image formed by the imaging lens of the high performance of the present invention is outputted, a bright shot image of a high resolution can be obtained.

BRIEF DESCRIPTION OF THE DRAWINGS

FIGS. 10A and 10B are diagrams showing basic lens data of the imaging lens according to the first example of the present invention.

FIG. 11 is a diagram showing data of aspheric surfaces of the imaging lens according to the first example of the present invention.

FIGS. 12A and 12B are diagrams showing a surface shape of a third lens located in an object side in the imaging lens according to the first example of the present invention.

FIGS. 13A and 13B are diagrams showing a surface shape of the third lens located in an image side in the imaging lens according to the first example of the present invention.

FIGS. 14A and 14B are diagrams showing basic lens data of the imaging lens according to the second example of the present invention.

FIG. 15 is a diagram showing data of aspheric surfaces of the imaging lens according to the second example of the present invention.

FIGS. 16A and 16B are diagrams showing a surface shape of a third lens located in an object side in the imaging lens according to the second example of the present invention.

FIGS. 17A and 17B are diagrams showing a surface shape of the third lens located in an image side in the imaging lens according to the second example of the present invention.

FIGS. 18A and 18B are diagrams showing basic lens data of the imaging lens according to the third example of the present invention.

FIG. 19 is a diagram showing data of aspheric surfaces of the imaging lens according to the third example of the present invention.

FIGS. 20A and 20B are diagrams showing a surface shape of a third lens located in an object side in the imaging lens according to the third example of the present invention.

FIGS. 21A and 21B are diagram showing a surface shape of the third lens located in an image side in the imaging lens according to the third example of the present invention.

FIGS. 22A and 22B are diagrams showing basic lens data of the imaging lens according to the fourth example of the present invention.

FIG. 23 is a diagram showing data of aspheric surfaces of the imaging lens according to the fourth example of the present invention.

FIGS. 24A and 24B are diagrams showing a surface shape of a third lens located in an object side in the imaging lens according to the fourth example of the present invention.

FIGS. 25A and 25B are diagrams showing a surface shape of the third lens located in an image side in the imaging lens according to the fourth example of the present invention.

FIGS. 26A and 26B are diagrams showing basic lens data of the imaging lens according to the fifth example of the present invention.

FIG. 27 is a diagram showing data of aspheric surfaces of the imaging lens according to the fifth example of the present invention.

FIGS. 28A and 28B are diagram showing a surface shape of a third lens located in an object side in the imaging lens according to the fifth example of the present invention.

FIGS. 29A and 29B are diagrams showing a surface shape of the third lens located in an image side in the imaging lens according to the fifth example of the present invention.

FIGS. 30A and 30B are diagrams showing basic lens data of the imaging lens according to the sixth example of the present invention.

FIG. 31 is a diagram showing data of aspheric surfaces of the imaging lens according to the sixth example of the present invention.

FIGS. 32A and 32B are diagrams showing a surface shape of a third lens located in an object side in the imaging lens according to the sixth example of the present invention.

FIGS. 33A and 33B are diagrams showing a surface shape of the third lens located in an image side in the imaging lens according to the sixth example of the present invention.

FIGS. 34A and 34B are diagrams showing basic lens data of the imaging lens according to the seventh example of the present invention.

FIG. 35 is a diagram showing data of aspheric surfaces of the imaging lens according to the seventh example of the present invention.

FIGS. 36A and 36B are diagrams showing a surface shape of a third lens located in an object side in the imaging lens according to the seventh example of the present invention.

FIGS. 37A and 37B are diagrams showing a surface shape of the third lens located in an image side in the imaging lens according to the seventh example of the present invention.

FIGS. 38A and 38B are diagrams showing basic lens data of the imaging lens according to the eighth example of the present invention.

FIG. 39 is a diagram showing data of aspheric surfaces of the imaging lens according to the eighth example of the present invention.

FIGS. 40A and 40B are diagrams showing a surface shape of a third lens located in an object side in the imaging lens according to the eighth example of the present invention.

FIGS. 41A and 41B are diagrams showing a surface shape of the third lens located in an image side in the imaging lens according to the eighth example of the present invention.

FIGS. 42A and 42B are diagrams showing basic lens data of the imaging lens according to the ninth example of the present invention.

FIG. 43 is a diagram showing data of aspheric surfaces of the imaging lens according to the ninth example of the present invention.

FIGS. 44A and 44B are diagrams showing a surface shape of a third lens located in an object side in the imaging lens according to the ninth example of the present invention.

FIGS. 45A and 45B are diagrams showing a surface shape of the third lens located in an image side in the imaging lens according to the ninth example of the present invention.

FIG. 46 is a diagram showing values of conditional expressions respectively arranged for each of the examples.

FIGS. 47A, 47B and 47C show various aberrations in the imaging lens having an F number of 2.4 according to the first example of the present invention. FIG. 47A shows a spherical aberration, FIG. 47B shows astigmatism and FIG. 47C shows a distortion.

FIGS. 48A, 48B and 48C show various aberrations in the imaging lens having an F number of 3.2 according to the first example of the present invention. FIG. 48A shows a spherical aberration, FIG. 48B shows astigmatism and FIG. 48C shows a distortion.

FIGS. 49A, 49B and 49C show various aberrations in the imaging lens having an F number of 4.8 according to the first example of the present invention. FIG. 49A shows a spherical aberration, FIG. 49B shows astigmatism and FIG. 49C shows a distortion.

FIGS. 50A, 50B and 50C show various aberrations in the imaging lens having an F number of 2.4 according to the second example of the present invention. FIG. 50A shows a spherical aberration, FIG. 50B shows astigmatism and FIG. 50C shows a distortion.

FIGS. 51A, 51B and 51C show various aberrations in the imaging lens having an F number of 3.2 according to the second example of the present invention. FIG. 51A shows a spherical aberration, FIG. 51B shows astigmatism and FIG. 51C shows a distortion.

FIGS. 52A, 52B and 52C show various aberrations in the imaging lens having an F number of 4.8 according to the second example of the present invention. FIG. 52A shows a spherical aberration, FIG. 52B shows astigmatism and FIG. 52C shows a distortion.

FIG. 53A shows a spherical aberration, FIG. 53B shows astigmatism and FIG. 53C shows a distortion.

FIG. 54A shows a spherical aberration, FIG. 54B shows astigmatism and FIG. 54C shows a distortion.

FIG. 55A shows a spherical aberration, FIG. 55B shows astigmatism and FIG. 55C shows a distortion.

FIG. 56A shows a spherical aberration, FIG. 5B shows astigmatism and FIG. 56C shows a distortion.

FIG. 57A shows a spherical aberration, FIG. 57B shows astigmatism and FIG. 57C shows a distortion.

FIG. 58A shows a spherical aberration, FIG. 58B shows astigmatism and FIG. 58C shows a distortion.

FIG. 59A shows a spherical aberration, FIG. 59B shows astigmatism and FIG. 59C shows a distortion.

FIG. 60A shows a spherical aberration, FIG. 60B shows astigmatism and FIG. 60C shows a distortion.

FIGS. 61A, 61B and 61C show various aberrations in the imaging lens having an F number of 4.8 according to the fifth example of the present invention. FIG. 61A shows a spherical aberration, FIG. 61B shows astigmatism and FIG. 61C shows a distortion.

FIGS. 62A, 62B and 62C show various aberrations in the imaging lens having an F number of 2.4 according to the sixth example of the present invention. FIG. 62A shows a spherical aberration, FIG. 62B shows astigmatism and FIG. 62C shows a distortion.

FIG. 63A shows a spherical aberration, FIG. 63B shows astigmatism and FIG. 63C shows a distortion.

FIG. 64A shows a spherical aberration, FIG. 64B shows astigmatism and FIG. 64C shows a distortion.

FIG. 65A shows a spherical aberration, FIG. 65B shows astigmatism and FIG. 65C shows a distortion.

FIG. 66A shows a spherical aberration, FIG. 66B shows astigmatism and FIG. 66C shows a distortion.

FIGS. 67A, 67B and 67C show various aberrations in the imaging lens having an F number of 4.8 according to the seventh example of the present invention. FIG. 67A shows a spherical aberration, FIG. 67B shows astigmatism and FIG. 67C shows a distortion.

FIGS. 68A, 68B and 68C show various aberrations in the imaging lens having an F number of 2.4 according to the eighth example of the present invention. FIG. 68A shows a spherical aberration, FIG. 68B shows astigmatism and FIG. 68C shows a distortion.

FIGS. 69A, 69B and 69C show various aberrations in the imaging lens having an F number of 3.2 according to the eighth example of the present invention. FIG. 69A shows a spherical aberration, FIG. 69B shows astigmatism and FIG. 69C shows a distortion.

FIGS. 70A, 70B and 70C show various aberrations in the imaging lens having an F number of 4.8 according to the eighth example of the present invention. FIG. 70A shows a spherical aberration, FIG. 70D shows astigmatism and FIG. 70C shows a distortion.

FIGS. 71A, 71B and 71C show various aberrations in the imaging lens having an F number of 2.4 according to the ninth example of the present invention. FIG. 71A shows a spherical aberration, FIG. 71B shows astigmatism and FIG. 71C shows a distortion.

FIGS. 72A, 72B and 72C show various aberrations in the imaging lens having an F number of 3.2 according to the ninth example of the present invention. FIG. 72A shows a spherical aberration, FIG. 72D shows astigmatism and FIG. 72C shows a distortion.

FIG. 73A shows a spherical aberration, FIG. 73B shows astigmatism and FIG. 73C shows a distortion.

DETAILED DESCRIPTION

Figure 1A:
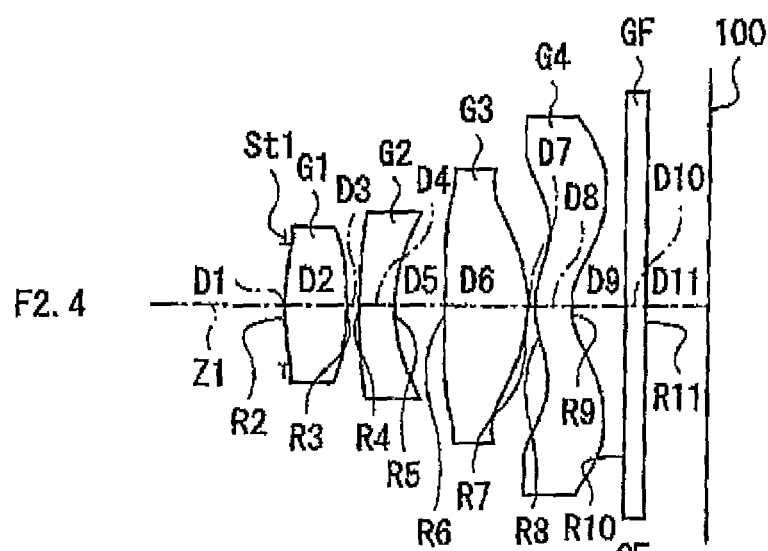
FIGS. 1A, 1B and 1C show a first structural example of an imaging lens according to a first embodiment of the present invention and are sectional views of a lens corresponding to a first example.

Now, an embodiment of the present invention will be described below in detail by referring to the drawings.

FIGS. 1A to C1 show a first structural example of an imaging lens according to the embodiment of the present invention. This structural example corresponds to the structure of a lens of a below-described first numerical example (FIGS. 10A, 10B and 11). FIGS. 2A to 9C show second to ninth structural examples and correspond to the structures of lenses of below-described second to ninth numerical examples. In FIGS. 1A to 9C, a symbol Ri designates a curvature radius of an i th surface by attaching symbols in such a way that a first aperture diaphragm St is set to a first and symbol numbers are sequentially increased toward an image side (an image formation side). A symbol Di designates a surface spacing on an optical axis Z1 between the i th surface and an i+1 th surface. Since the basic structure of the structural examples is respectively the same, an explanation will be given below by referring to the structural example shown in FIGS. 1A to 1C.

The imaging lens according to this embodiment is preferably employed in various kinds of image pickup devices using an image pickup element such as a CCD or a CMOS, and especially relatively compact portable terminal devices such as a digital still camera, a portable cellular phone having a camera and a PDA. The imaging lens includes a first lens G1, a second lens G2, a third lens G3 and a fourth lens G4 in order from an object side along the optical axis Z1.

An image pick-up device according to this embodiment includes the imaging lens according to this embodiment and an image pickup element 100 such as a CCD for outputting an image pickup signal corresponding to an optical image formed by the imaging lens. The image pick-up element 100 is arranged on an image formation surface (an image pickup surface) of the imaging lens. Between the fourth lens G4 and the image pickup element 100, various optical members GF may be arranged depending on the structure of a camera side to which the lens is attached. For instance, a cover glass for protecting the image pickup surface or a flat plate shaped optical member such as an infrared ray cut filter may be arranged. In this case, as the optical member GF, a member may be used in which a coat having a filtering effect such as the infrared ray cut filter or an ND filter is applied to the flat plate shaped cover glass may be used.

Further, in the imaging lens, the coat having the filtering effect such as the infrared ray cut filter or the ND filter or a reflection preventing coat may be applied to all the lenses of the first lens G1 to the fourth lens G4 or at least one lens surface.

The imaging lens further includes an optical aperture diaphragm nearer to the object side than to the first lens G1. In this embodiment, as the aperture diaphragm, are provided an ordinary aperture diaphragm St1, and other aperture diaphragms (small aperture diaphragms) St2 and St3 detachably inserted relative to the optical axis Z1 nearer to the object side from the ordinary aperture diaphragm St1. In the ordinary aperture diaphragm St1 and the small aperture diaphragms St2, and St3, the diameters of the apertures diaphragms are fixed. The diameters of the small aperture diaphragms St2 and St3 are smaller than the diameter of the ordinary aperture diaphragm St1 and function as variable aperture diaphragms to the ordinary aperture diaphragm St1. Further, the diameter of the second small aperture diaphragm St3 is smaller than the diameter of the first small aperture diaphragm St2. That is, the diameters of the aperture diaphragms St1, St2 and St3 are set so as to have a below-described relation.

St1>St2>St3

Further, as for positions on the optical axis, when the first lens G1 is supposed to be a reference, the ordinary aperture diaphragm St1 is arranged at a position nearest to the first lens G1 and the second small aperture diaphragm St3 is arranged at a position remotest (nearest to the object side) from the first lens G1.

Figure 1B:
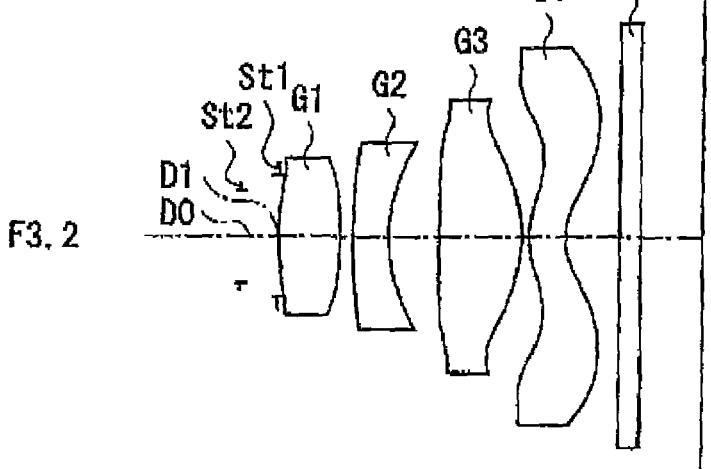
Figure 1C:
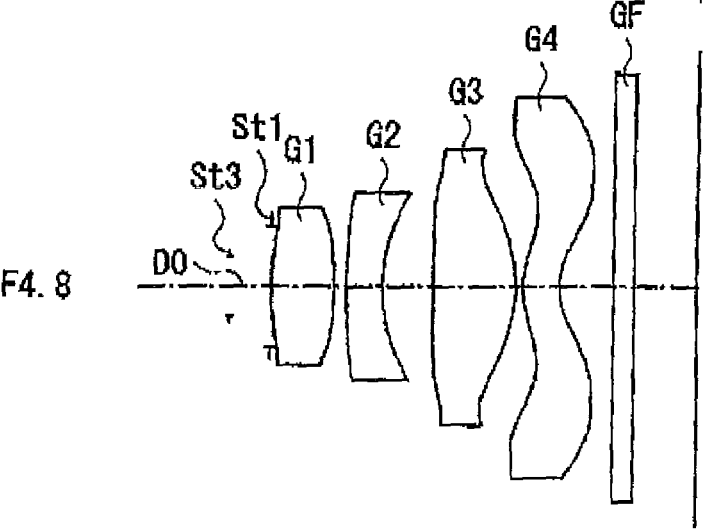

In the imaging lens, under the fastest ordinary state (for instance, an F number is 2.4), the small aperture diaphragms St2 and St3 are detached from an optical path as shown in FIG. 1A to regulate a fastness (the F number) only by the ordinary aperture diaphragm St1. When the fastness is restricted by one stage from this state to lower the fastness (for instance, set the F number to 3.2), the first small diaphragm St2 is arranged on the optical path as shown in FIG. 1B. In this case, the fastness (the F number) is regulated by the first small aperture diaphragm St2. When the fastness is restricted furthermore by one stage to lower the fastness (for instance, the F number is set to 4.8), the second small aperture diaphragm t3 is arranged on the optical path as shown in FIG. 1c. In this case, the fastness (the F number) is regulated by the second small aperture diaphragm St3. In such a way, in this imaging lens, the fastness can be changed to three stages. Further, in the stages of the fastness respectively, the physical positions of the aperture diaphragms that substantially regulate the fastness are changed.

The number of the small aperture diaphragms are not limited to two, and three or more small aperture diaphragms may be used (the fastness may be changed to four or more stages). Further, only one small aperture diaphragm may be provided (the fastness may be changed only to two stages).

Figure 74:
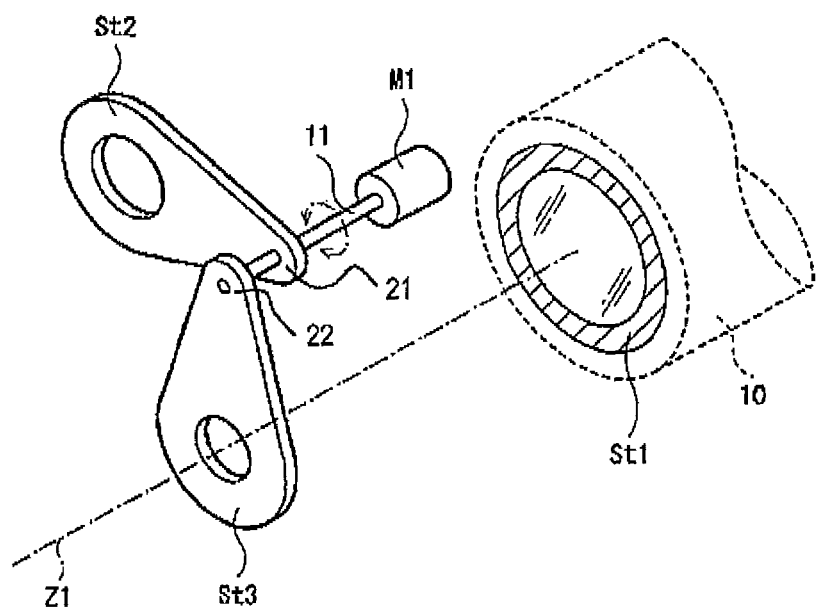
FIG. 74 is an explanatory view of an aperture diaphragm mechanism in the imaging lens according to the first embodiment of the present invention.

FIG. 74 shows one example of an aperture diaphragm mechanism part in this imaging lens. In this structural example, end parts 21 and 22 of the first small aperture diaphragm St2 and the second small aperture diaphragm St3 are respectively connected to a motor M1 through a rotating shaft 11. The first small aperture diaphragm St2 and the second small aperture diaphragm St3 are connected to the rotating shaft 11 in such a way that the aperture diaphragms St2 and St3 are alternately arranged when they are seen from the direction of a front surface and the direction of the optical axis Z1. Thus, the motor M1 is rotated so that a user can arbitrarily select a state that both of the first small aperture diaphragm St2 and the second small aperture diaphragm St3 are shunted relative to the optical axis z1, a state that only the first small aperture diaphragm St2 is arranged on the optical axis Z1 and a state that only the second small aperture diaphragm St3 is arranged on the optical axis Z1. The ordinary aperture diaphragm St1 is a fixed diaphragm and fixed to the object side of a lens part 10. FIG. 74 shows the state that only the second small aperture diaphragm St3 of the first small aperture diaphragm St2 and the second small aperture diaphragm St3 is arranged on the optical axis Z1.

In this imaging lens, the first lens G1 is composed of a positive lens having a convex surface directed to the object side. The first lens G1 is preferably a biconvex lens. Further, the first lens 1 is preferably a glass lens. The second lens G2 is composed of a negative lens having a concave surface directed to the image side. The second lens G2 is preferably a negative meniscus lens with a concave surface directed to the image side. The first lens G1 and the second lens G2 respectively preferably include an aspheric surface at least in one surface. For instance, a surface of the second lens G2 located in the object side is preferably configured as an aspheric shape having at least one inflection point. Thus, a field curvature is advantageously corrected.

The third lens G3 is a positive lens has, near the optical axis, has a convex surface directed to the image side.

In the structural examples respectively shown in FIGS. 1A to 6C, the shape of the third lens G3 is configured as a meniscus shape in which the shape of the third lens G3 near the optical axis has a convex surface directed to the image side. In the structural example shown in FIG. 7A, a shape of the third lens G3 near the optical axis is a flat convex shape having a convex surface directed to the image side. In the structural examples respectively shown in FIGS. 8A to 9C, a shape of the third lens G3 near the optical axis is a biconvex shape.

The third lens G3 has an aspheric shape in which both surfaces have at least one inflection point and an inclination of a surface shape at the terminal end part of a periphery within an effective diameter collapses toward the image side. The inclination of the surface shape of the third lens G3 will be described below by exemplifying specific examples in below-described numerical examples.

The fourth lens G4 is defined as a negative lens having, near the optical axis, a concave surface directed to the image side. Both the surfaces of the fourth lens G4 are made to be aspheric shapes. The surface of the fourth lens G4 located in the image side preferably has an aspheric shape including two or more inflection points and a positive power in a peripheral part. For instance, the surface of the fourth lens G4 located in the image side is preferably made to be the aspheric shape that has a concave shape toward the image side at a position near the optical axis and a convex shape toward the image side in a peripheral part. Further, a surface of the fourth lens located in the object side is preferably made to be an aspheric surface that has a convex shape toward the object side at a position near the optical axis and a concave shape toward the object side at least in an intermediate part. Here, as for the aspheric shape, especially, the fourth lens G4 is changed to different shapes between the central part and the peripheral part of the fourth lens G4, so that the field curvature can be satisfactorily corrected from the central part to the peripheral part of an image surface. In the fourth lens G4, a light flux is more separated for each angle of view than the first lens G1, the second lens G2, and the third lens G3. Therefore, the surface of the fourth lens G4 located in the image side as the last lens surface nearest to the image pickup element 100 is made to have the concave shape to the image side at the position near the optical axis and the convex shape to the image side in the peripheral part, so that an aberration can be properly corrected for each angle of view and an incident angle of the light flux on the image pickup element is controlled to be a prescribed angle or lower. Accordingly, unevenness in the quantity of light in an entire area of an image formation surface can be reduced and the field curvature or a distortion can be advantageously corrected.

The imaging lens according to this embodiment satisfies below-described conditions. Especially, since the imaging lens satisfies conditional expressions (3) and (4), the imaging lens is adapted to relatively more decrease the power of the first lens G1 in a lens system than in a usual imaging lens composed of four lenses and increase the power of the third lens G3.

$$0.1 < D3/D4 < 2.0 \tag{1}$$

$$vd1 - vd2 > 25 \tag{2}$$

$$0.4 < f1/f3 < 1.6 \tag{3}$$

$$0.3 < f/f3 < 1.5 \tag{4}$$

In this case, it is assumed that D3 is an air space on the optical axis between the first lens G1 and the second lens G2, D4 is a central thickness of the second lens G2, vd1 is an Abbe number of the first lens G1 at the d-line, vd2 is an Abbe number of the second lens G2 at the d-line, f1 is a focal length of the first lens G1, f3 is a focal length of the third lens G3 and f is a focal length of an entire system.

Now, an operation and an effect of the imaging lens constructed as described above, especially, an operation and an effect about the conditional expressions will be more specifically described below.

According to the imaging lens of this embodiment, in a lens system composed of four lenses as a whole, since the lens elements respectively have proper structures, the lens system is easily realized that maintains a good image formation performance and is compact and fast and whose performance is hardly deteriorated even when the position of the aperture diaphragm is changed. Especially, when the conditional expressions (3) and (4) are satisfied and the power of the third lens G3 is made to be relatively stronger than that of the usual imaging lens composed of the four lenses, an entire length is easily decreased to obtain a fast lens system that has few field curvatures. Further, since the aspheric shapes of both the surfaces of the third lens G3 are configured as special shapes in which both the surfaces include at least one inflection point and the inclination of a surface shape at the terminal end part of a periphery within an effective diameter collapses toward the image side, even when the small aperture diaphragms (other aperture diaphragms) St2 and St3 are arranged, the occurrence of the field curvatures is suppressed. Further, the first lens G1 is formed with the glass lens, the entire length can be more decreased and the deterioration of the performance can be suppressed during the change of temperature.

The above-described conditional expression (1) prescribes a proper relation of the air space between the first lens G1 and the second lens G2 on the optical axis and the central thickness of the second lens G2. When D3/D4 exceeds an upper limit or D3/D4 falls down a lower limit of the conditional expression (1), the revolt of the field curvatures occur between a state of the fastest aperture diaphragm (a state that the small aperture diaphragm St2 or St3 is not arranged) and a state that the small aperture diaphragms St2 or St3 is arranged, so that it is difficult to make the performances in both the states compatible with each other. As for the conditional expression (1), a numerical range of a below-described conditional expression (1A) may be preferably satisfied.

$$0.2 < D3/D4 < 1.0 \tag{1A}$$

More preferably, a numerical range of a below-described conditional expression (1B) may be satisfied.

$$0.25 < D3/D4 < 0.8 \tag{1B}$$

The conditional expression (2) prescribes a relation of the proper Abbe numbers of the first lens G1 as the positive lens and the second lens G2 as the negative lens. As the difference between the Abbe numbers of the positive lens and the negative lens is larger, a color aberration is the more reduced to improve a performance. When vd1−vd2 falls below a lower limit of the conditional expression (2), the color aberration is insufficiently corrected. To more satisfactorily correct the color aberration, a below-described conditional expression (2A) about the Abbe number is preferably satisfied.

$$vd1-vd2 > 26 \tag{2A}$$

The conditional expression (3) prescribes a relation of the proper power of the first lens G1 and the third lens G3. When f1/f3 falls below a lower limit of the conditional expression (3) and the power of the third lens G3 is too smaller than that of the first lens G1, a correction effect of the field curvature is insufficient. On the contrary, when f1/f3 exceeds an upper limit of the conditional expression (3) and the power of the third lens G3 is too stronger than that of the first lens G1, the color aberration is increased.

For this conditional expression (3), a below-described numerical range of a below-described conditional expression (3A) is preferably satisfied.

$$0.5 < f1/f3 < 1.5 \tag{3A}$$

The conditional expression (4) prescribes the proper power of the third lens G3 occupied in the entire part of the lens system. When f/f3 falls below a lower limit of the conditional expression (4), the field curvature is increased. When f/f3 exceeds an upper limit of the conditional expression (4), the color aberration is too increased. As for the conditional expression (4), a numerical range of a below-described conditional expression (4A) is preferably satisfied.

$$0.4 < f/f3 < 1.4 \tag{4A}$$

Especially, when the shape of the third lens G3 is configured as the meniscus shape, near the optical axis, with a convex surface directed to the image side, or the shape of the third lens G3 near the optical axis is the flat convex shape, the conditional expressions (3) and (4) preferably satisfy below-described numerical ranges.

$$0.8 < f1/f3 < 1.5 \tag{3B}$$

$$0.8 < f/f3 < 1.4 \tag{4B}$$

Further, particularly, when the shape of the third lens G3 near the optical axis is a biconvex shape, the conditional expressions (3) and (4) preferably satisfy below-described numerical ranges.

$$0.4 < f1/f3 < 0.7 \tag{3C}$$

$$0.4 < f/f3 < 0.7 \tag{4C}$$

As described above, according to the imaging lens of this embodiment, in the lens system including the four lenses as a whole, since the structures of the lens elements are respectively optimized, the lens system can be realized that maintains the good image formation performance and is compact and fast and whose performance is hardly deteriorated even when the position of the aperture diaphragm is changed. For instance, the performance can be obtained that meets high pixels such as 2 mega pixels or more, or more preferably 5 mega pixels to 10 megapixels. Further, according to the image pickup device of this embodiment, since the image pickup signal corresponding to the optical image formed by the imaging lens of the high performance according to this embodiment is outputted, a bright shot image of a high resolution can be obtained.

EXAMPLES

Now, specific numerical examples of the imaging lens according to this embodiment will be described below. A plurality of numerical examples will be collectively described below.

FIGS. 10A and 10B and FIG. 11 show specific lens data corresponding to the structure of the imaging lens shown in FIGS. 1A to 1C, Especially, FIG. 10A shows basic lens data thereof and FIG. 11 shows data of the aspheric surface. Further, FIG. 10B shows data of the aperture diaphragm. In a column of a surface number Si in the lens data shown in FIG. 10A, the number of an i th surface to which a symbol is attached in such a way that a surface of a component nearest to the object side in the imaging lens according to a first example is designated as a first surface, and the number of the surface is sequentially increased as the surface comes nearer to the image side. In a column of a curvature radius Ri, a value (mm) of the curvature radius of the i th surface from the object side is shown correspondingly to the symbol Ri shown in FIGS. 1A to 1C. In a column of the surface spacing Di, a spacing (mm) on the optical axis between the i th surface Si and an i+1 th surface Si+1 is similarly shown. In a column of Ndj, a value of a refractive index of a j th optical element from the object side at the d-line (587.6 nm) is shown. In a column of vdj, a value of the Abbe number of the j th optical element from the object side at the d-line is shown.

In the imaging lens according to the first example, as described above, other aperture diaphragms (small aperture diaphragms) St2 and St3 are selectively arranged in addition to the ordinary aperture diaphragm (the fixed aperture diaphragm) St1 depending on the fastness (the F number). FIG. 10B shows the F number, the value of the diameter of the aperture diaphragm corresponding thereto and the value of the position of the aperture diaphragm on the optical axis. In this imaging lens, when the F number is 2.4, only the ordinary aperture diaphragm St1 is arranged (FIG. 1A). When the F number is 3.2, the first small aperture diaphragm St2 is arranged in addition to the ordinary aperture diaphragm St1 (FIG. 1B. When the F number is 4.8, the second small aperture diaphragm St3 is arranged in addition to the ordinary aperture diaphragm St1 (FIG. 1C).

Further, in the imaging lens of the first example, all of both the surfaces of the first lens G1 and G4 have aspheric shapes. In the basic lens data shown in FIG. 10A, as the curvature radii of these aspheric surfaces, values of the radiuses of curvature near the optical axis are shown.

FIG. 11 shows the data of the aspheric surfaces in the imaging lens of the first example. In values shown as the data of the aspheric surfaces, a symbol "E" indicates that a value subsequent thereto is an "exponent" having as a base and a value before "E" is multiplied by the value expressed by an exponential function having 10 as the base. For instance, "1.0E-02" indicates "$1.0 \times 10^{-2}$".

As the data of the aspheric surfaces of the imaging lens of the first example, are designated values of coefficients $B_n$ and K respectively in an expression of the aspheric shape represented by a below-described equation (A). More specifically, Z designates a length (mm) of a perpendicular dropped to a tangential plane (a plane perpendicular to the optical axis) of a vertex of the aspheric surface from a point on the aspheric surface located at the height h from the optical axis.

$$Z = CC \cdot h^2 / \{1 + (1 - K \cdot CC^2 \cdot h^2)^{1/2}\} + \Sigma B_n \cdot h^n \quad (A)$$

(n=an integer of 3 or larger)
where
Z: depth of aspheric surface (mm)
h: distance (height) to lens surface from the optical axis (mm)
K: eccentricity
CC: paraxial curvature=1/R
(R: radius of paraxial curvature)
$B_n$: aspheric coefficient of n th order The imaging lens of the first example is represented by effectively using order numbers of $B_3$ to $B_{20}$ as the aspheric coefficients $B_n$.

Figure 12B:
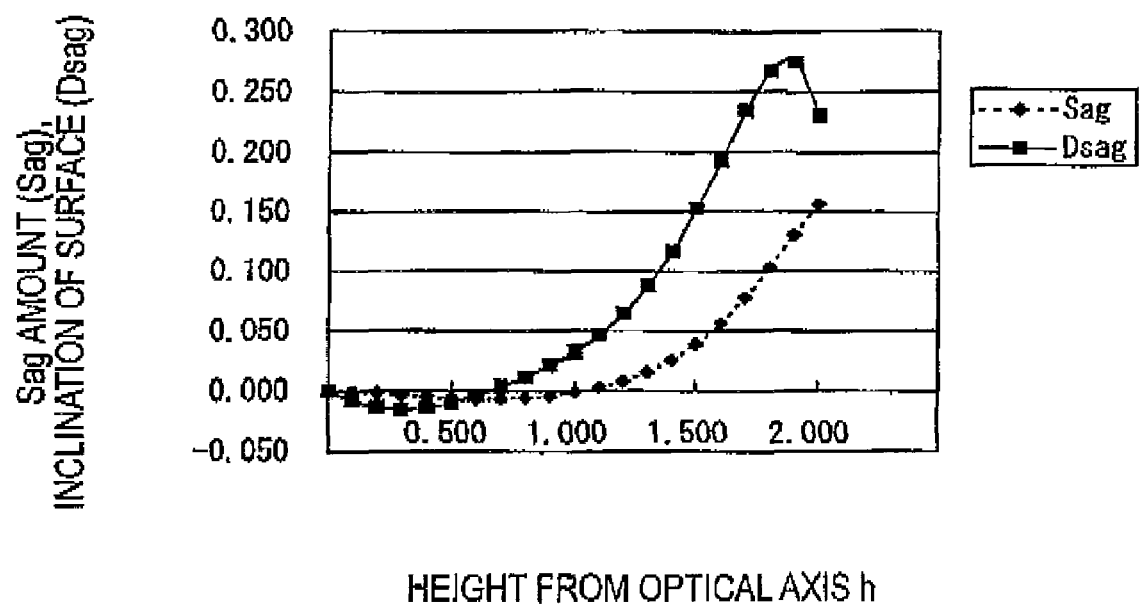

FIGS. 12A and 12B more specifically show the aspheric shape of the surface of the third lens G3 located in the object side.

As advancing along each surface of the third lens from a center of thereof toward an outside of the third lens, said surfaces curves to the image side in neighbor of a position that is distant from the center of the third lens by an effective diameter of the third lens and within the effective diameter of the third lens.

In FIGS. 12A and 12B, "sag" indicates an aspheric sag amount at the position of the surface in the height h from the optical axis and corresponds to Z in the above-described aspheric equation (A). That is, "sag" indicates a sag amount (depth) of the aspheric surface by setting the position of the vertex of the surface of the third lens G3 located in the object side as a reference. "Dsag" corresponds to a single differentiation of the equation expressing the surface shape and indicates an inclination of the surface. When a value of Dsag is minus, this means that the surface shape collapses toward a minus side (the object side) at the position of the surface. On the contrary, when a value of Dsag is plus, this means that the surface shape collapses toward a plus side (the image side) at the position of the surface. As can be understood from FIGS. 12A and 12B, in the surface of the third lens G3 located in the object side, the value of Dsag is minus in a central part, so that the inclination of the surfaced collapses toward the object side. In a terminal end part of a periphery from an intermediate part, the value of Dsag is plus, so that the inclination of the surface collapses toward the image side.

Figure 13B:
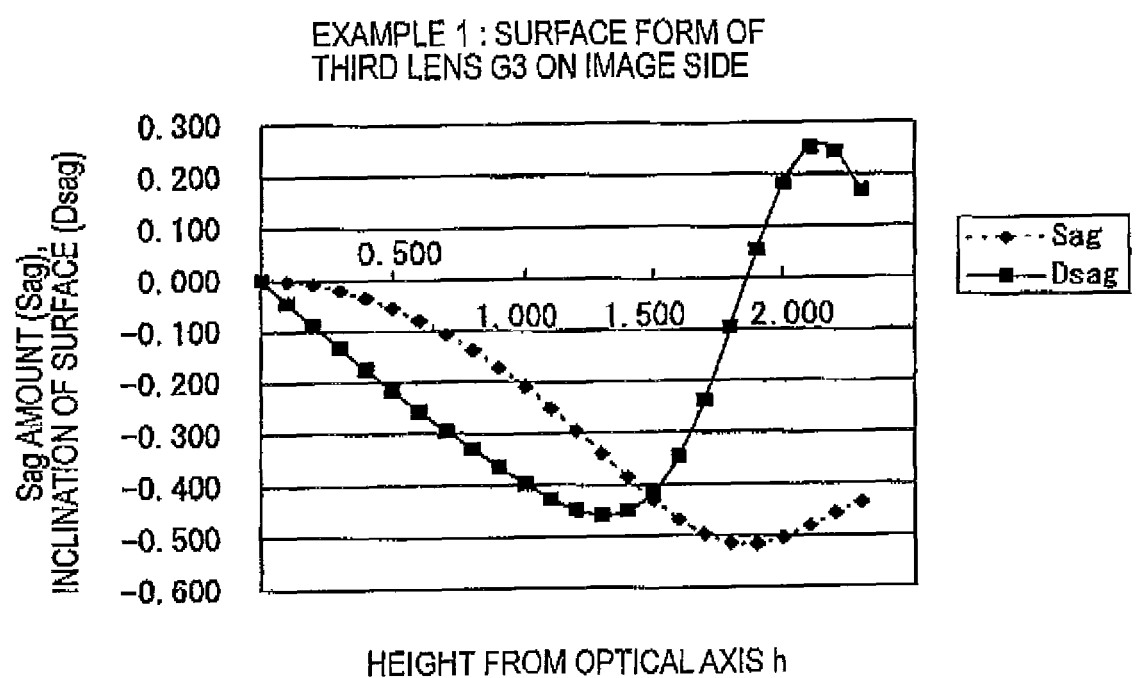
Figure 16B:
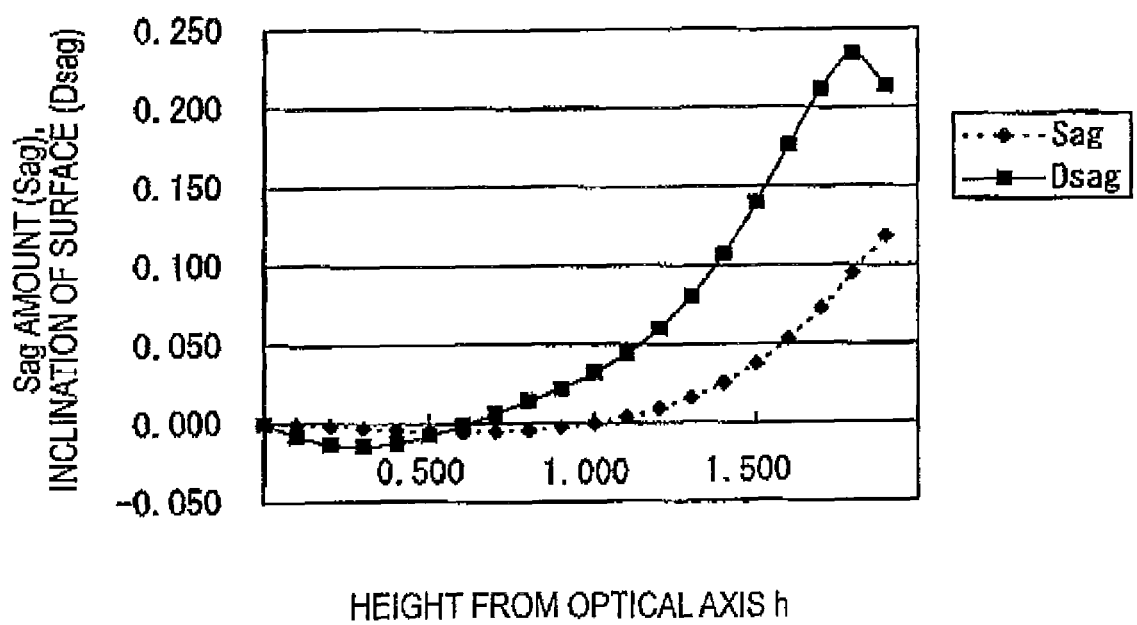
Figure 17B:
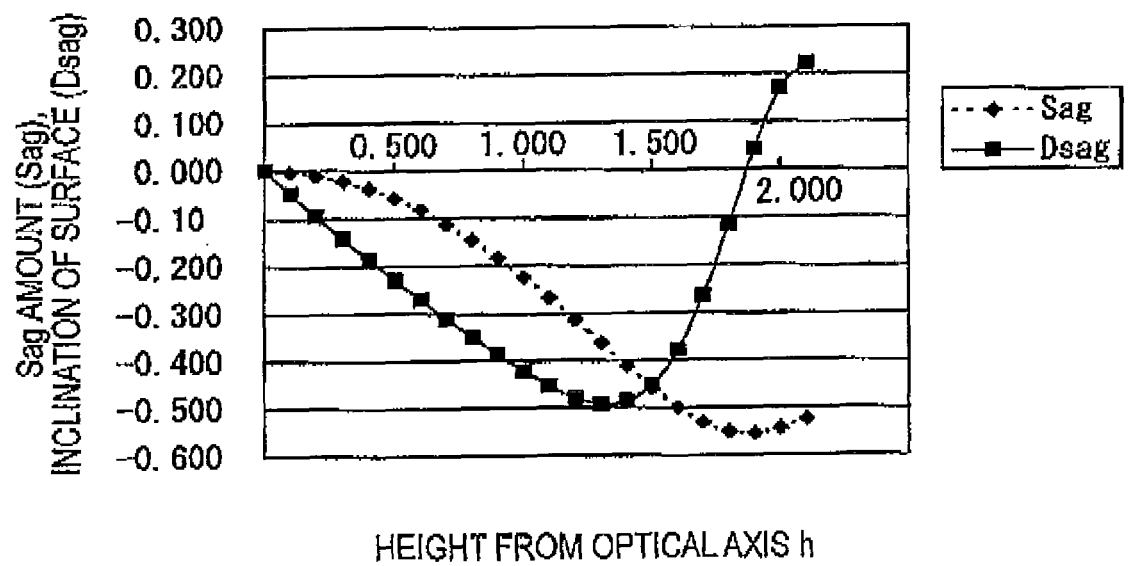
Figure 20B:
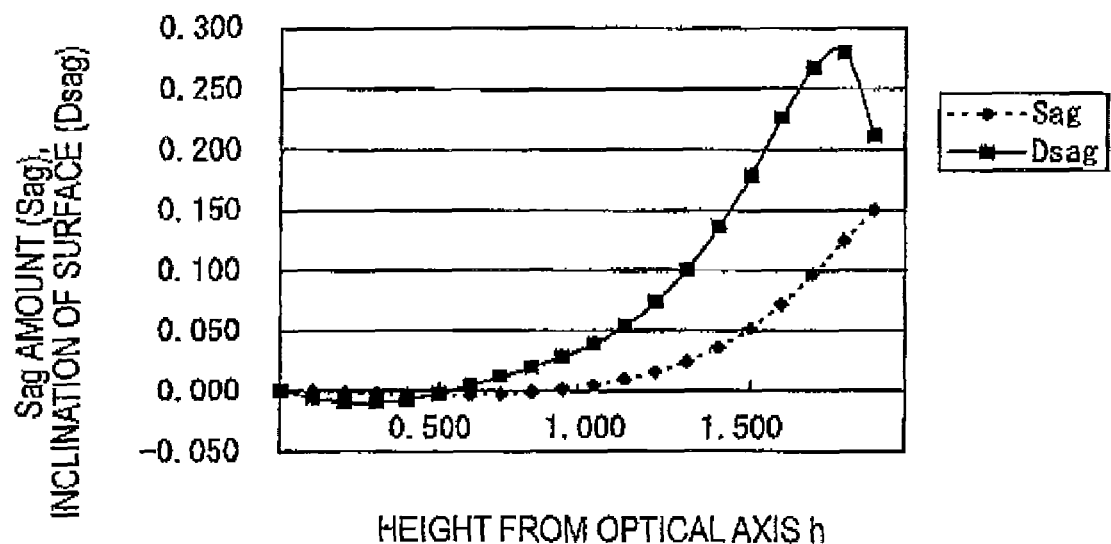
Figure 21B:
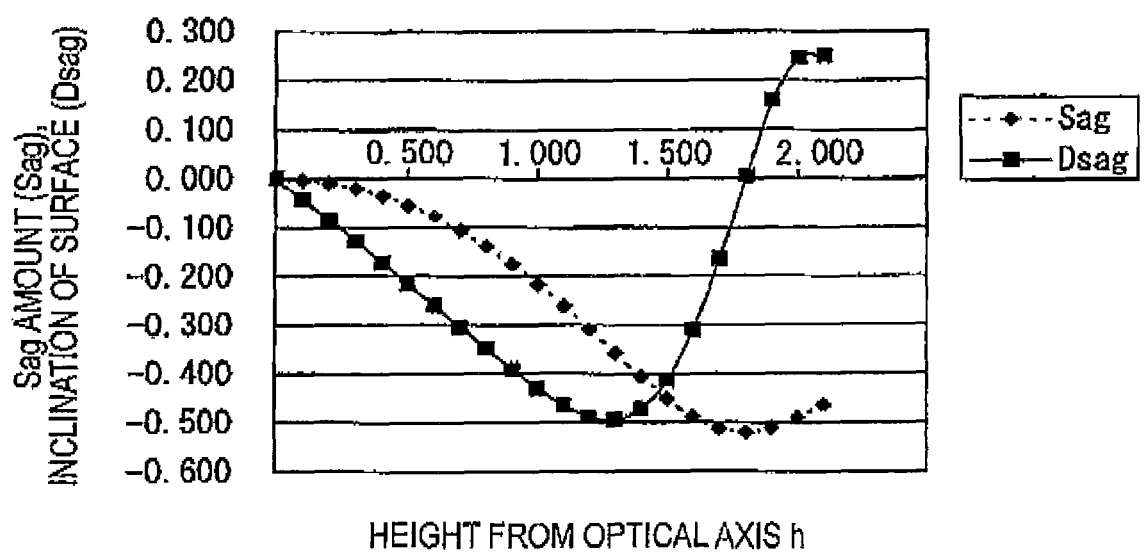
Figure 24B:
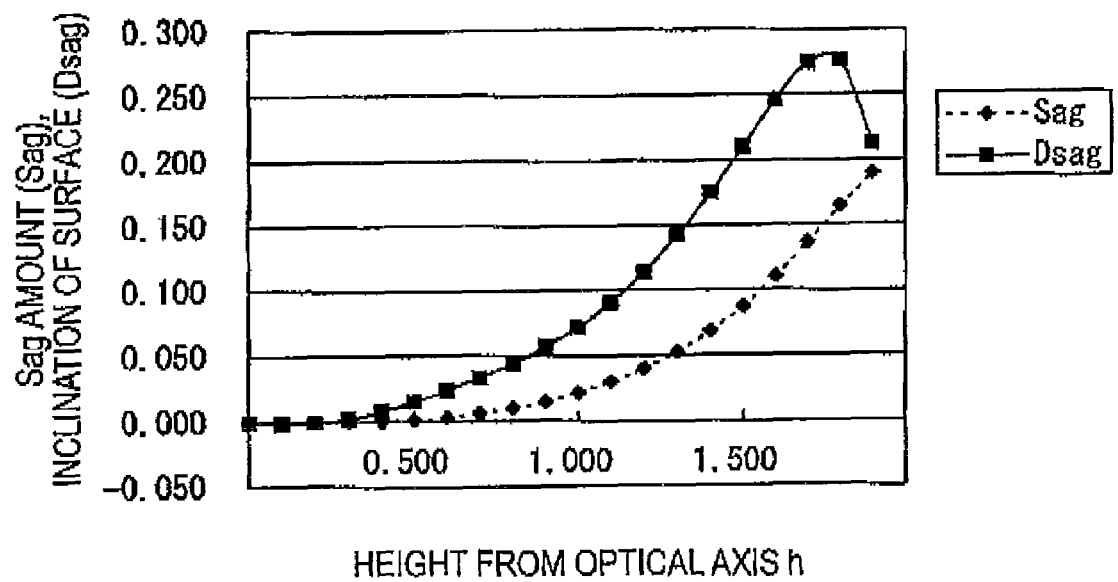
Figure 25B:
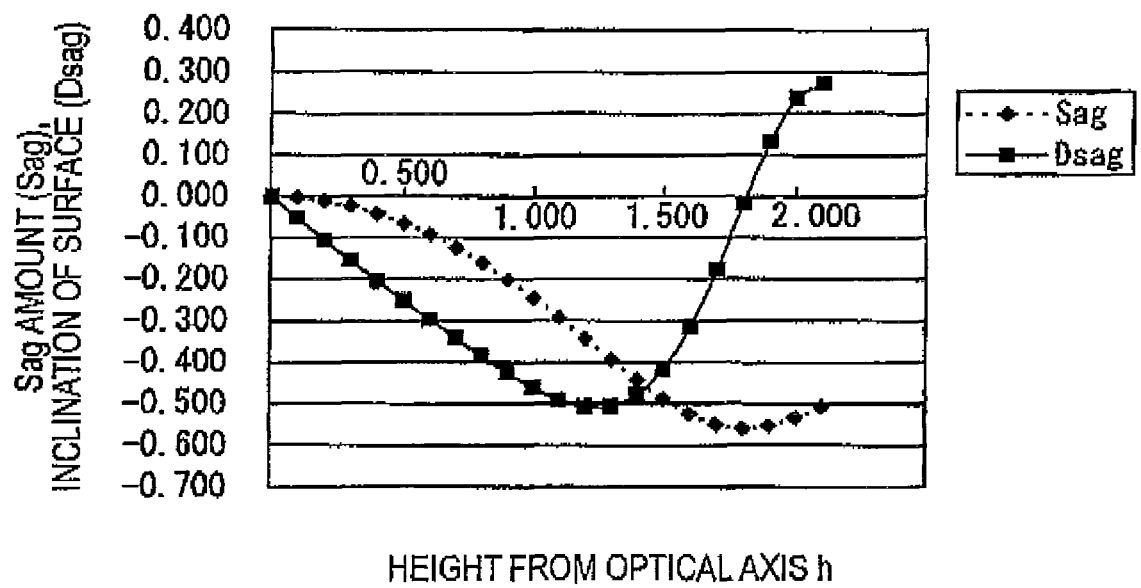
Figure 28B:
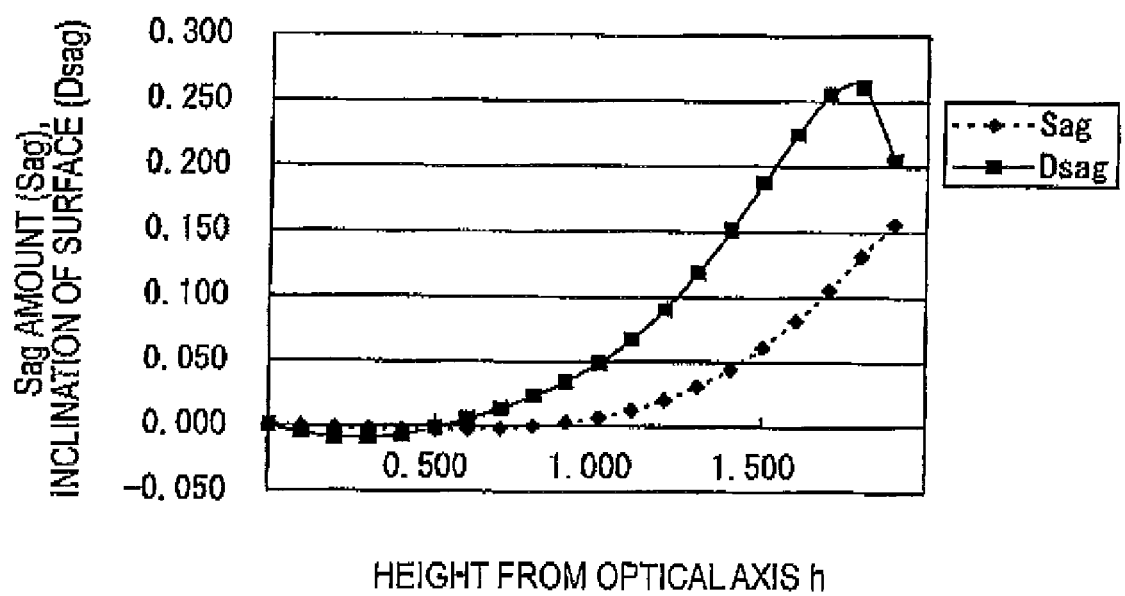
Figure 29B:
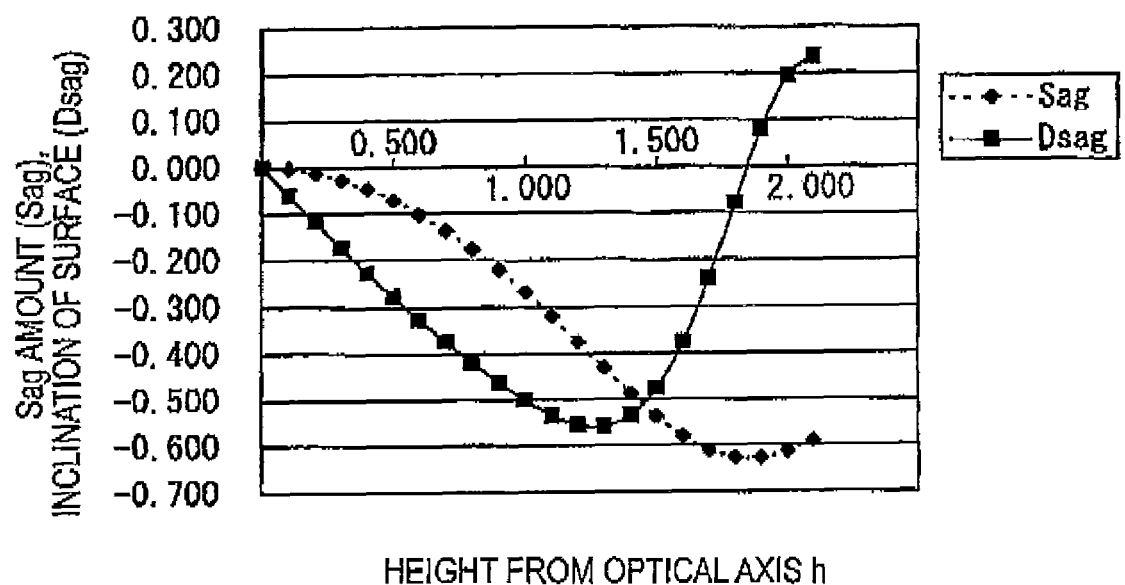
Figure 32B:
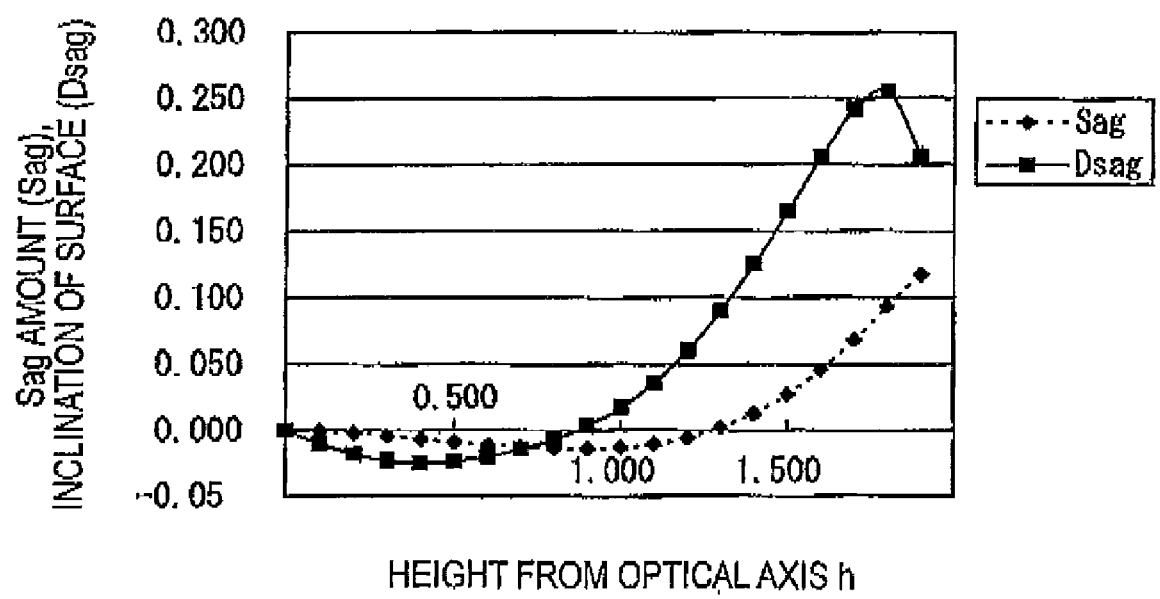
Figure 33B:
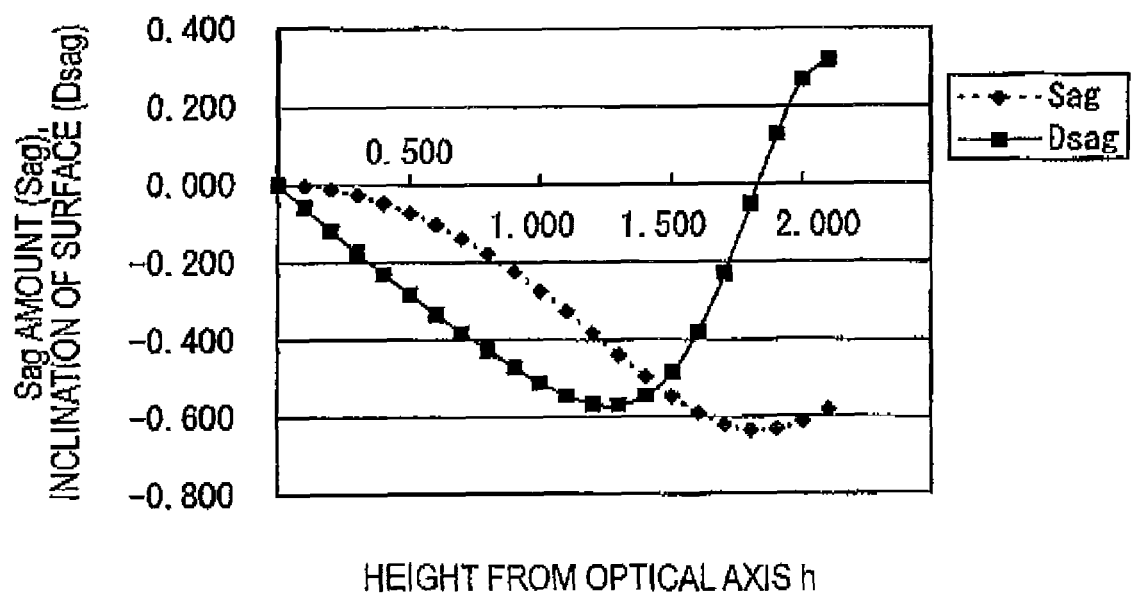
Figure 36B:
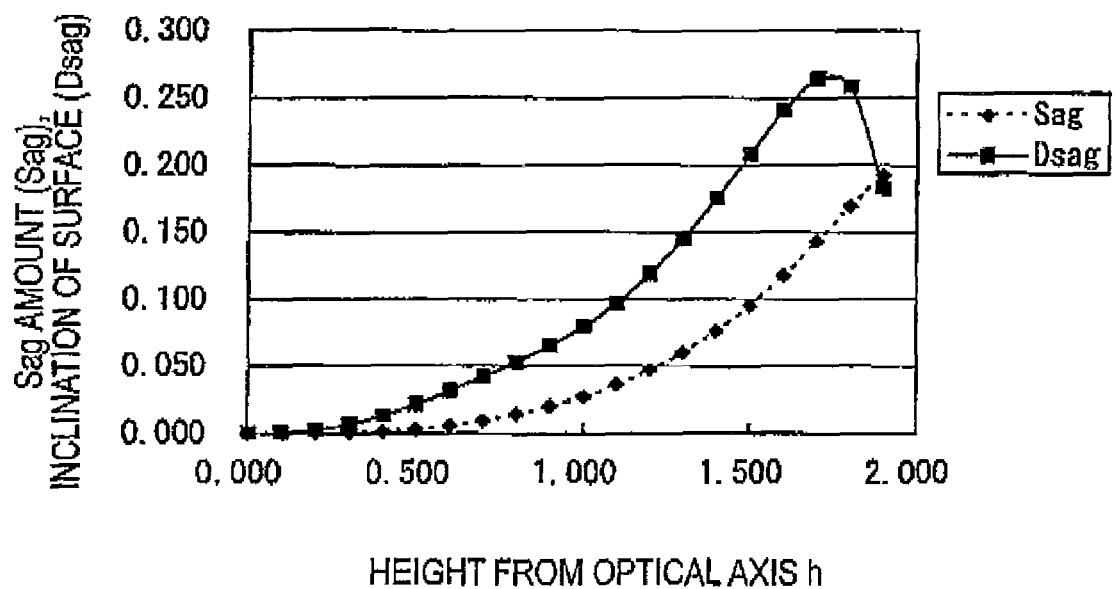
Figure 37B:
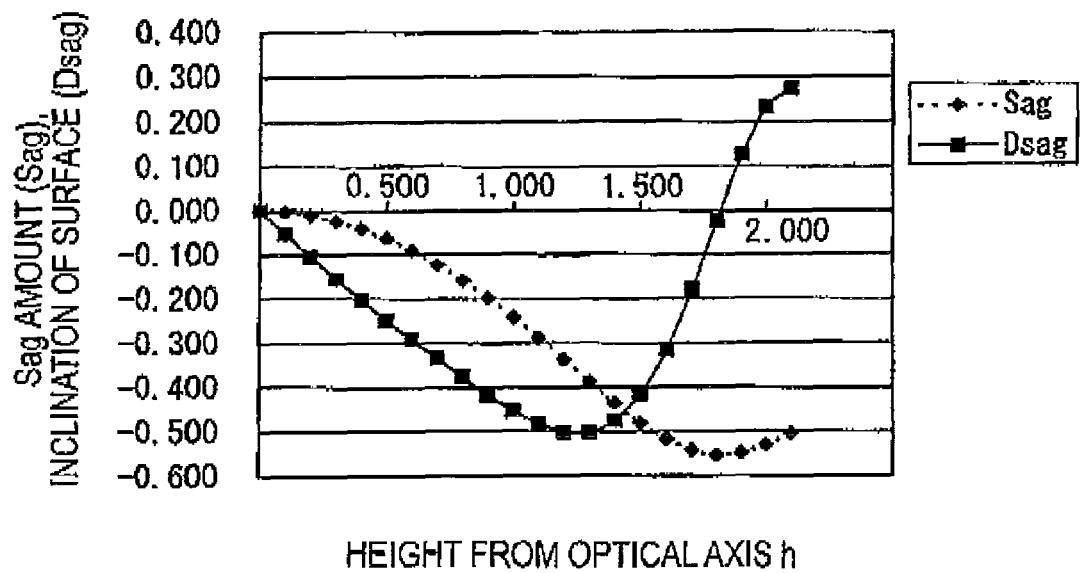
Figure 40B:
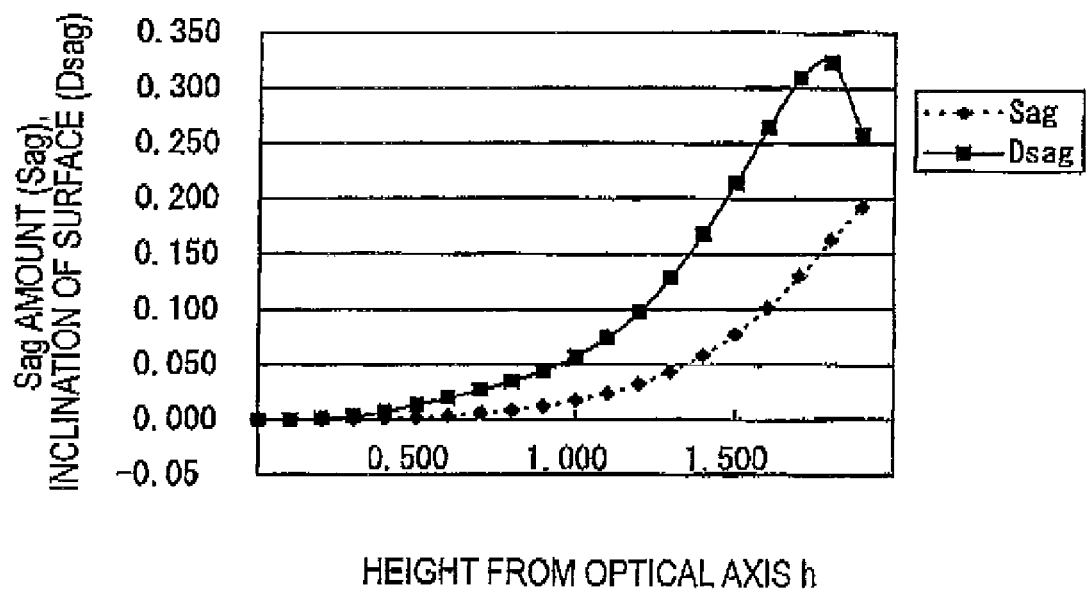
Figure 41B:
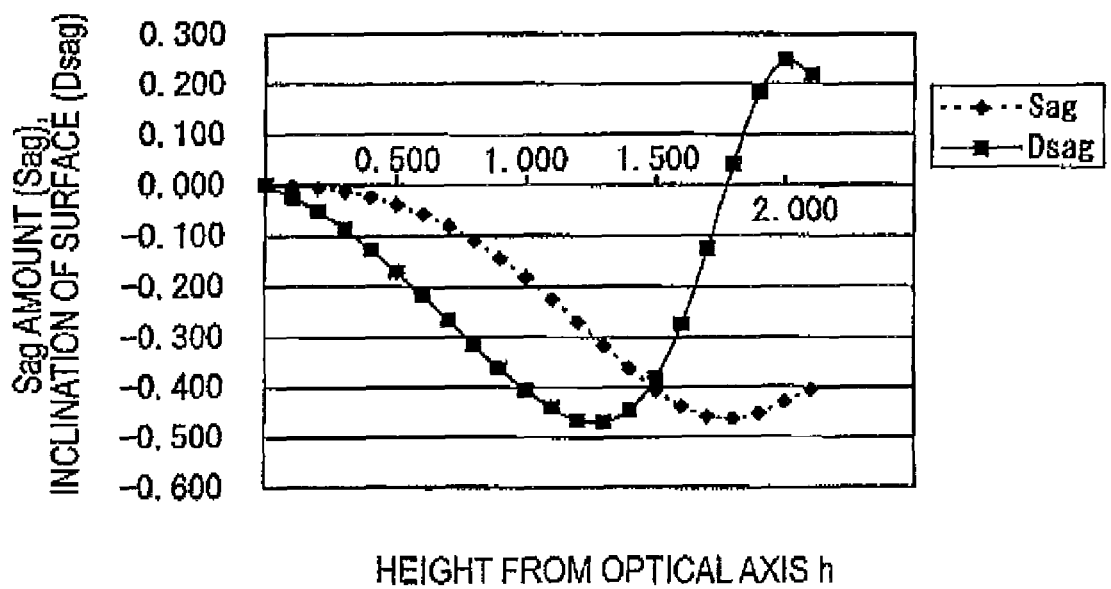
Figure 44B:
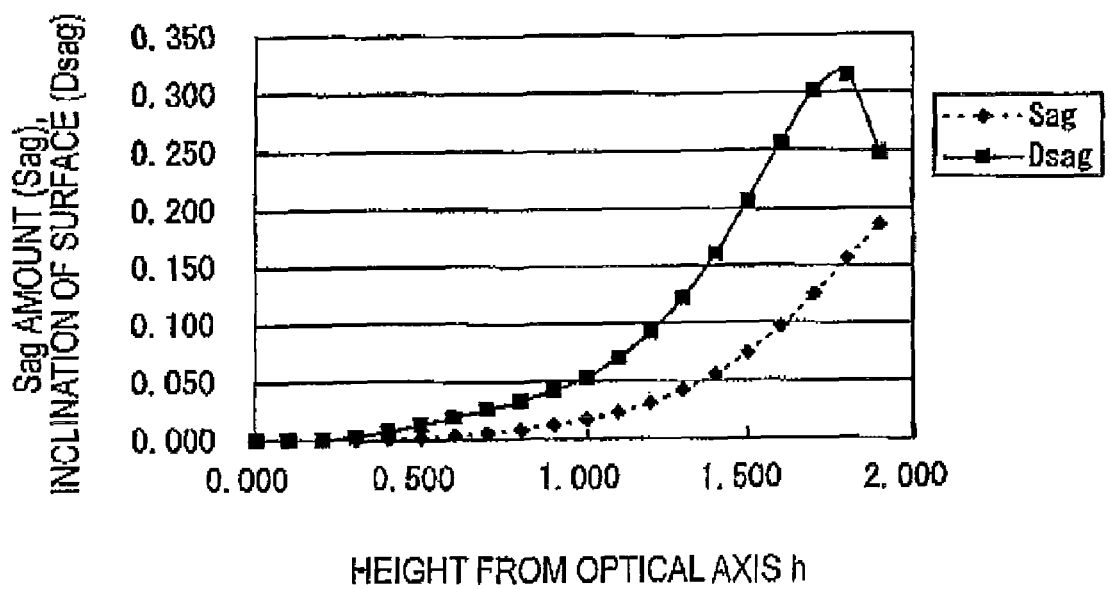
Figure 45B:
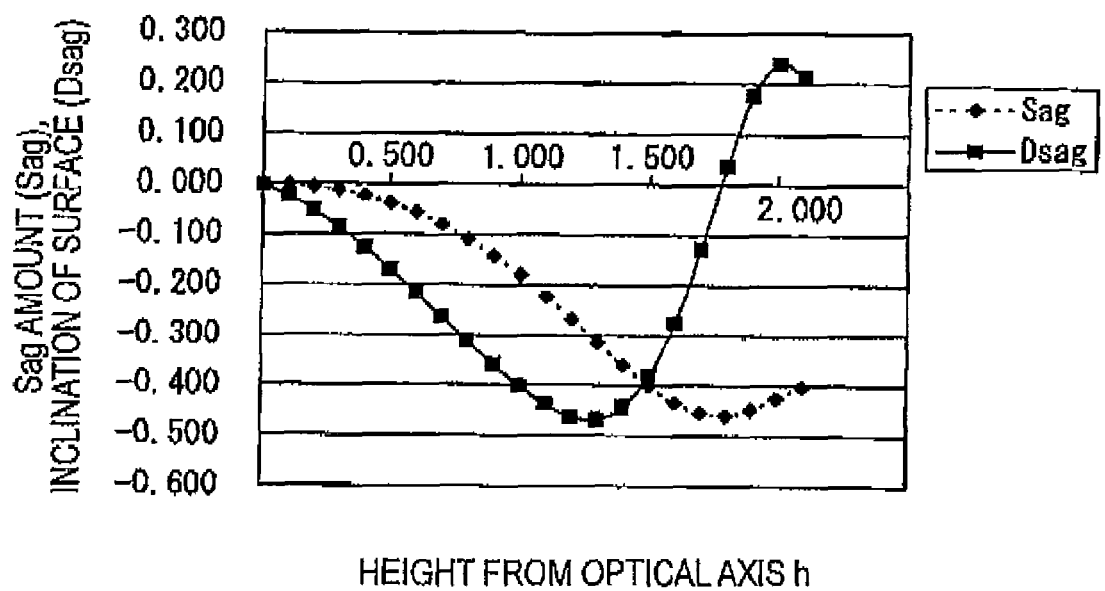
Figure 53A:
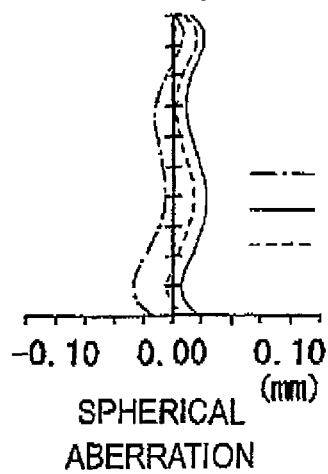
FIGS. 53A, 53B and 53C show various aberrations in the imaging lens having an F number of 2.4 according to the third example of the present invention.
Figure 53B:
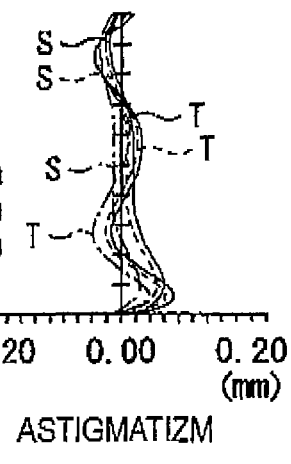
Figure 53C:
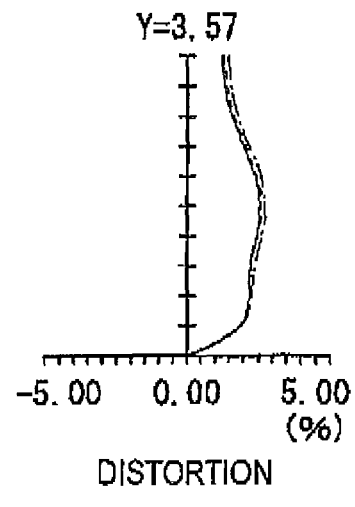
Figure 54A:
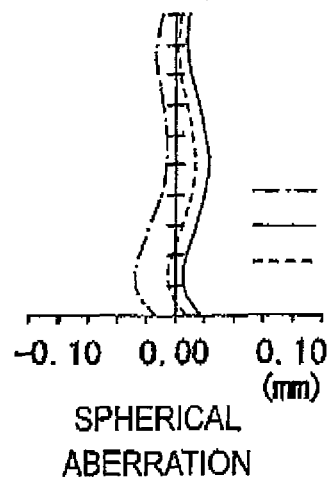
FIGS. 54A, 54B and 54C show various aberrations in the imaging lens having an F number of 3.2 according to the third example of the present invention.
Figure 54B:
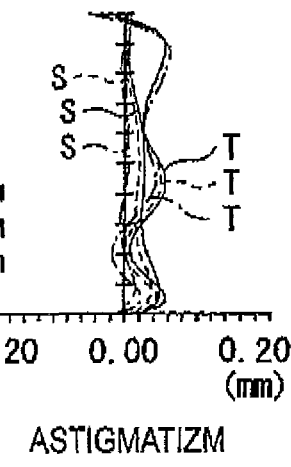
Figure 54C:
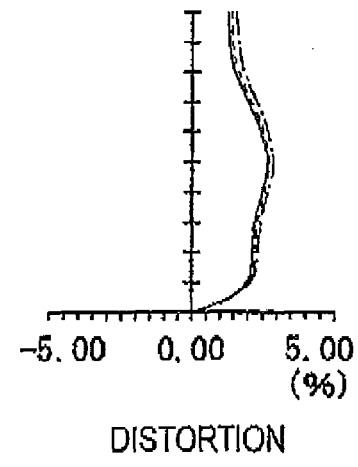
Figure 55A:
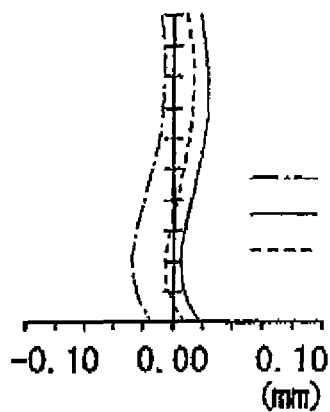
FIGS. 55A, 55B and 55C show various aberrations in the imaging lens having an F number of 4.8 according to the third example of the present invention.
Figure 55B:
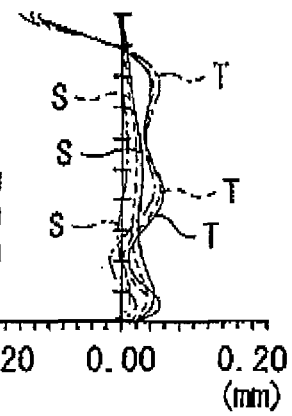
Figure 55C:
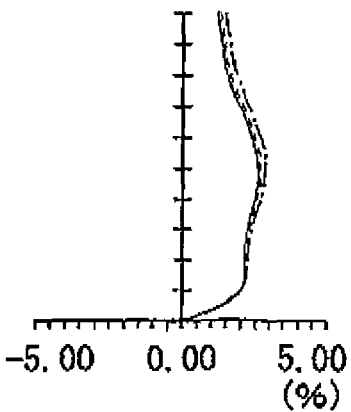
Figure 56A:
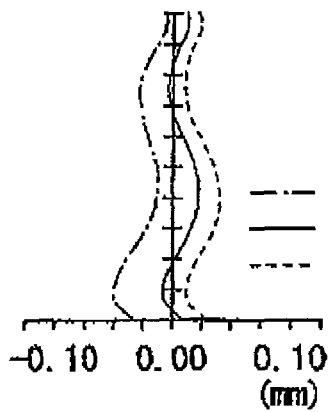
FIGS. 56A, 56B and 56C show various aberrations in the imaging lens having an F number of 2.4 according to the fourth example of the present invention.
Figure 56B:
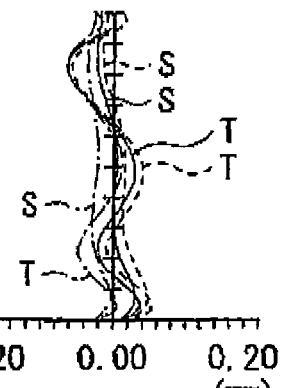
Figure 56C:
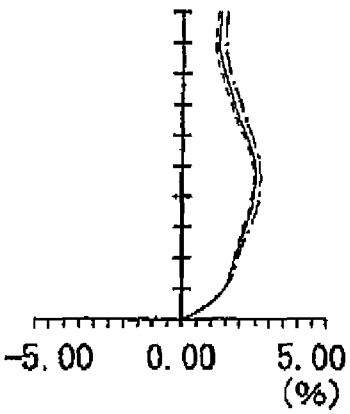
Figure 57A:
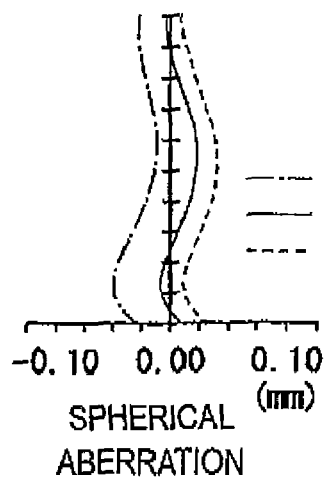
FIGS. 57A, 57B and 57C show various aberrations in the imaging lens having an F number of 3.2 according to the fourth example of the present invention.
Figure 57B:
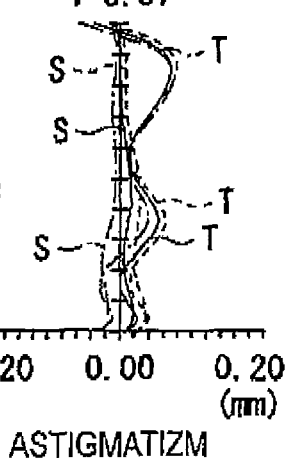
Figure 57C:
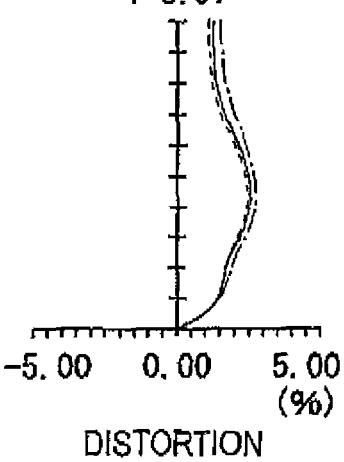
Figure 58A:
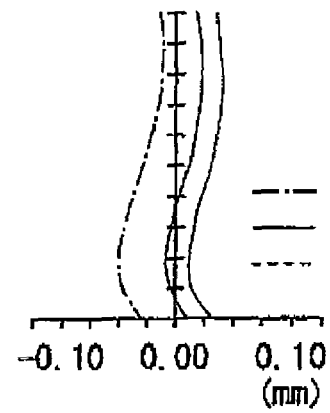
FIGS. 58A, 58B and 58C show various aberrations in the imaging lens having an F number of 4.8 according to the fourth example of the present invention.
Figure 58B:
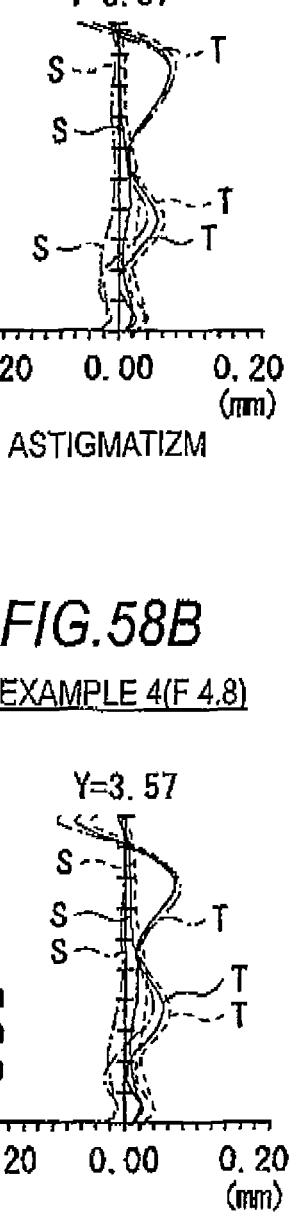
Figure 58C:
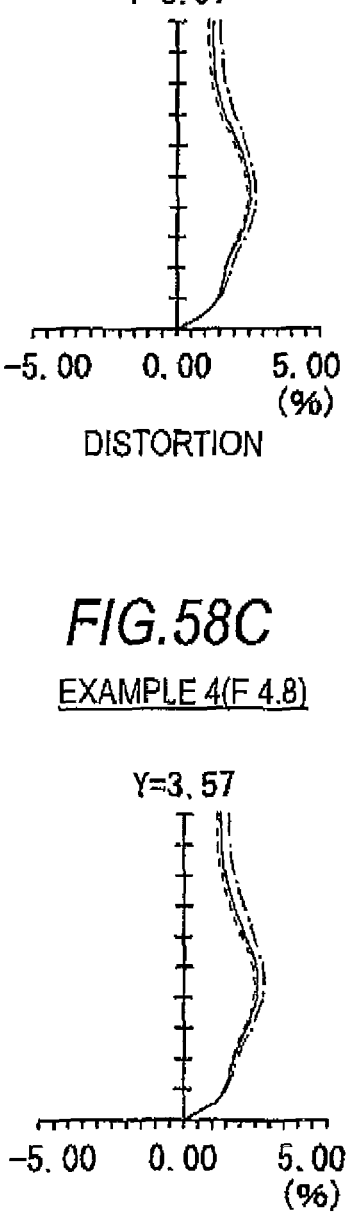
Figure 59A:
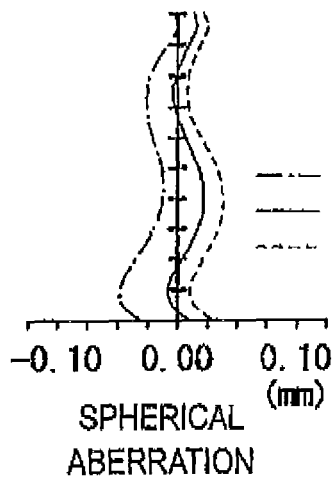
FIGS. 59A, 59B and 59C show various aberrations in the imaging lens having an F number of 2.4 according to the fifth example of the present invention.
Figure 59B:
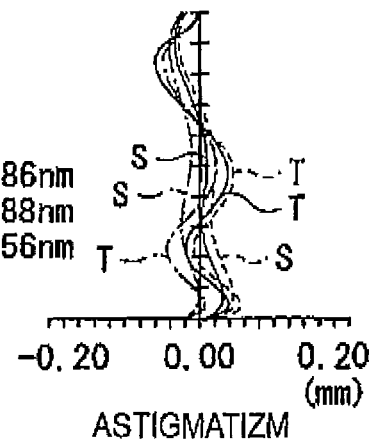
Figure 59C:
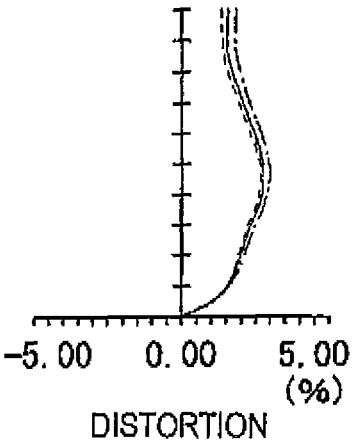
Figure 60A:
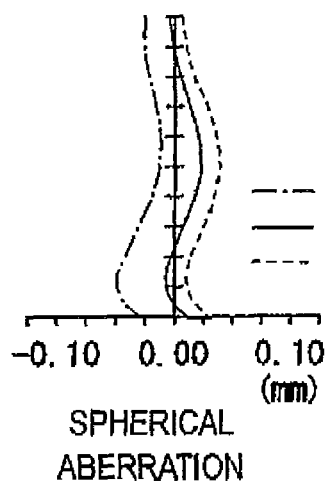
FIGS. 60A, 60B and 60C show various aberrations in the imaging lens having an F number of 3.2 according to the fifth example of the present invention.
Figure 60B:
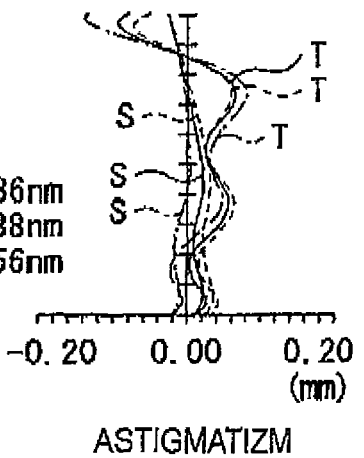
Figure 60C:
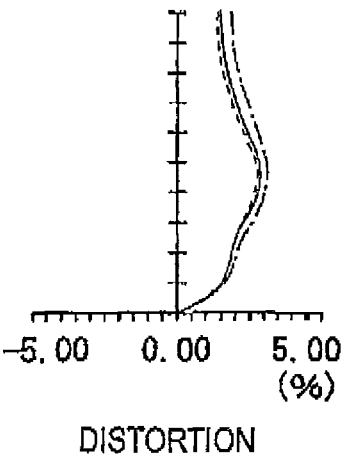
Figure 63A:
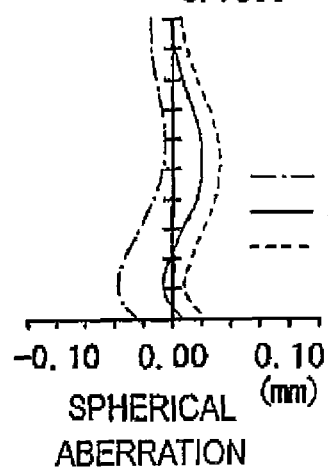
FIGS. 63A, 63B and 63C show various aberrations in the imaging lens having an F number of 3.2 according to the sixth example of the present invention.
Figure 63B:
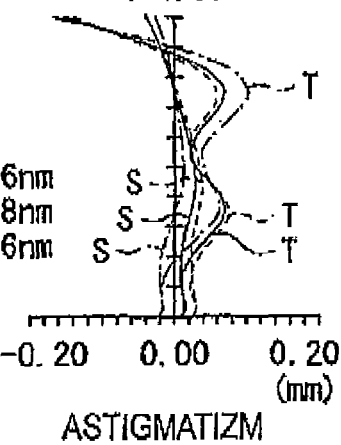
Figure 63C:
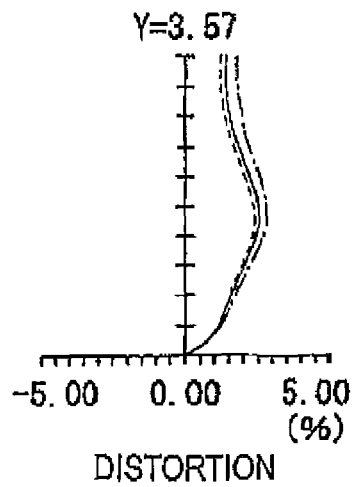
Figure 64A:
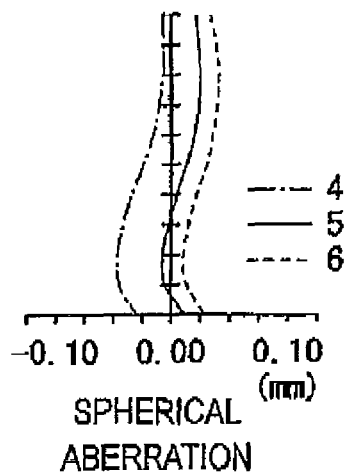
FIGS. 64A, 64B and 64C show various aberrations in the imaging lens having an F number of 4.8 according to the sixth example of the present invention.
Figure 64B:
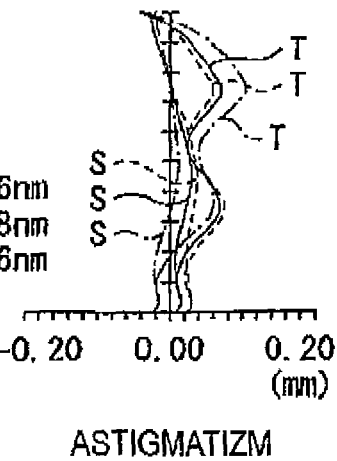
Figure 64C:
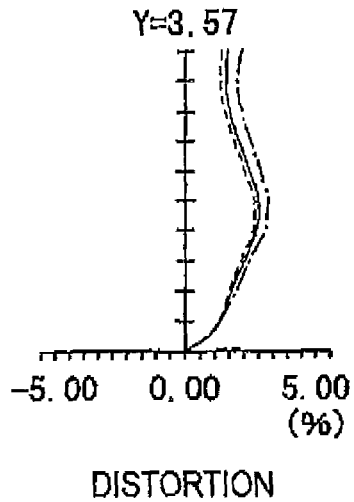
Figure 65A:
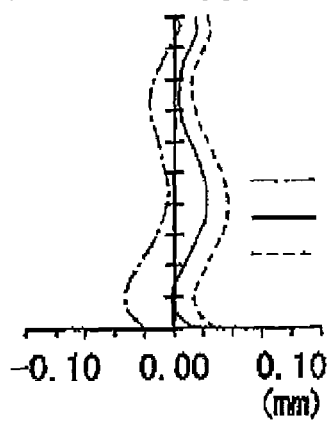
FIGS. 65A, 65B and 65C show various aberrations in the imaging lens having an F number of 2.4 according to the seventh example of the present invention.
Figure 65B:
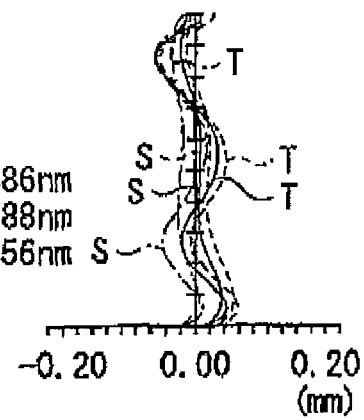
Figure 65C:
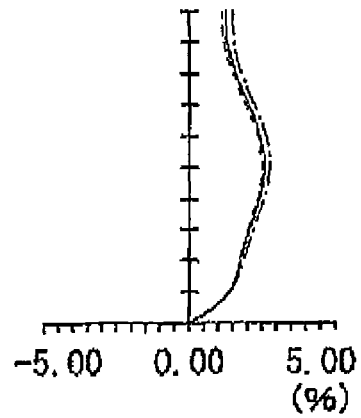
Figure 66A:
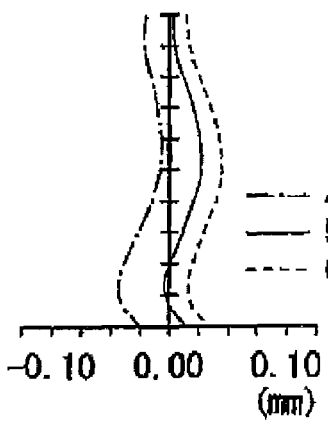
FIGS. 66A, 66B and 66C show various aberrations in the imaging lens having an F number of 3.2 according to the seventh example of the present invention.
Figure 66B:
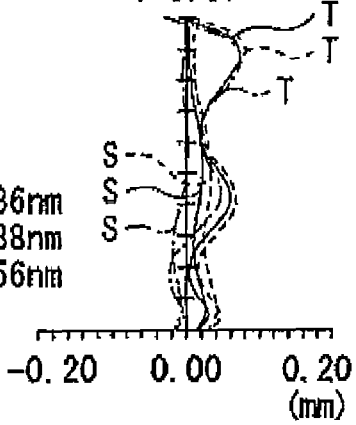
Figure 66C:
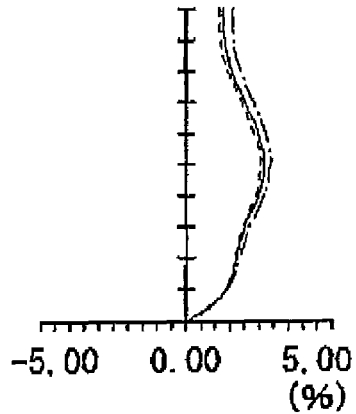
Figure 73A:
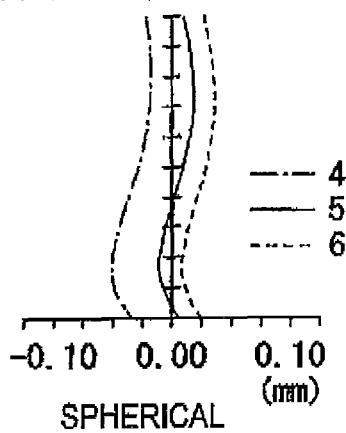
FIGS. 73A, 73B and 73C show various aberrations in the imaging lens having an F number of 4.8 according to the ninth example of the present invention.
Figure 73B:
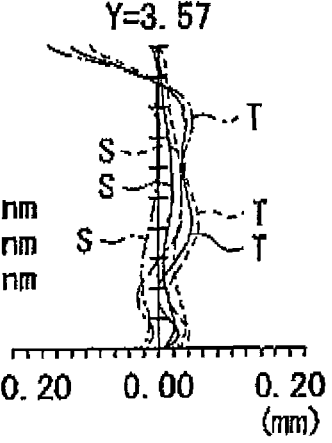
Figure 73C:
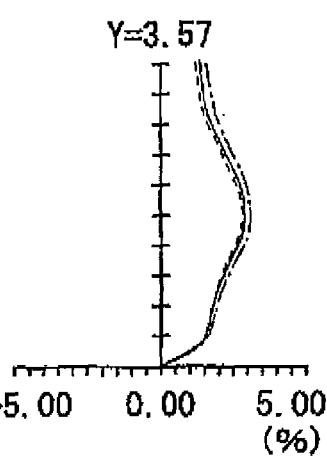

Similarly, FIGS. 13A and 13B more specifically show the aspheric shape of the surface of the third lens G3 located in the image side. As can be understood from FIGS. 13A and 13B, in the surface of the third lens G3 located in the image side, a value of Dsag is minus in the intermediate part from the central part, so that the inclination of the surface collapses toward the object side. In a terminal end part of a periphery, a value of Dsag is plus, so that the inclination of the surface collapses toward the image side. As described above, both the surfaces of the third lens G3 have the aspheric shapes including at least one inflection point in which the inclination of the surface form at the terminal end part of a periphery within an effective diameter collapses toward the image side.

Figure 2A:
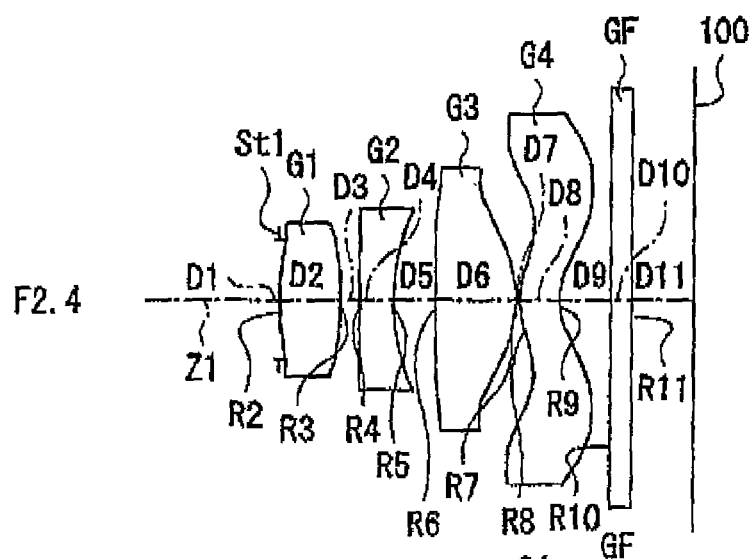
FIGS. 2A, 2B and 2C show a second structural example of the imaging lens according to the first embodiment of the present invention and are sectional views of a lens corresponding to a second example.
Figure 2B:
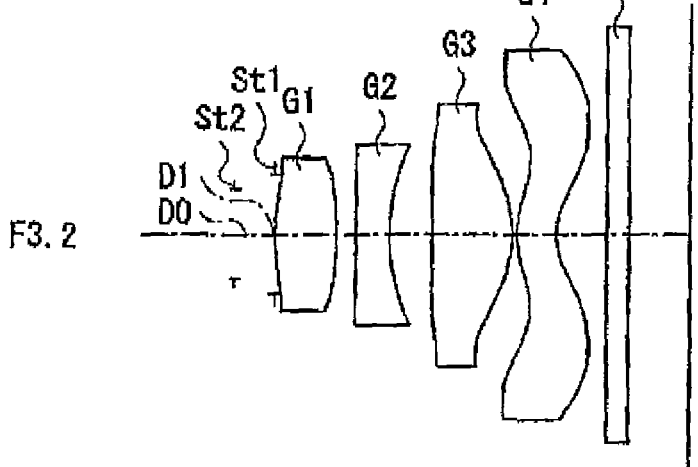
Figure 2C:
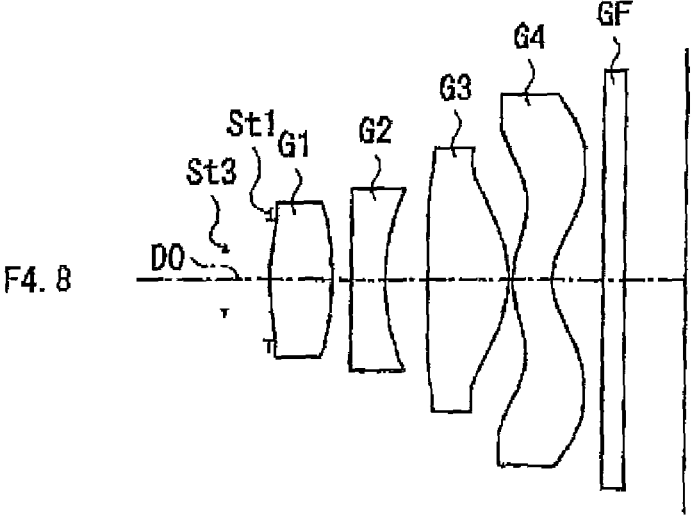
Figure 3A:
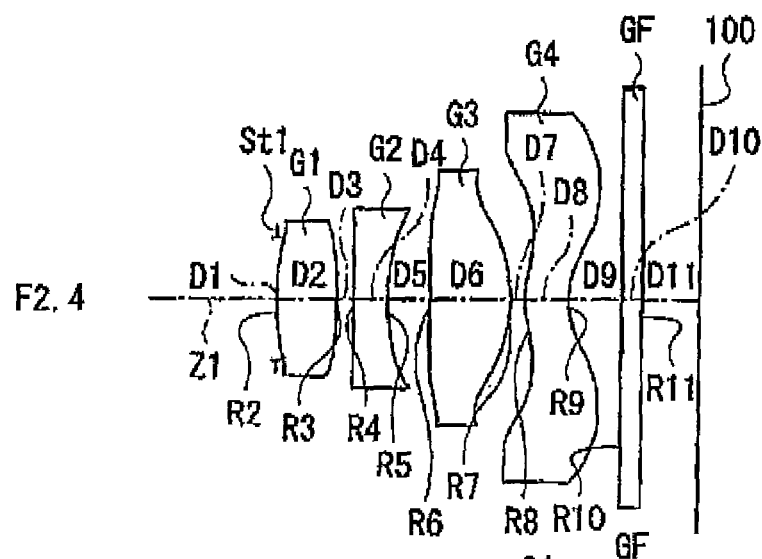
FIGS. 3A, 3B and 3C show a third structural example of the imaging lens according to the first embodiment of the present invention and sectional views of a lens corresponding to a third example.
Figure 3B:
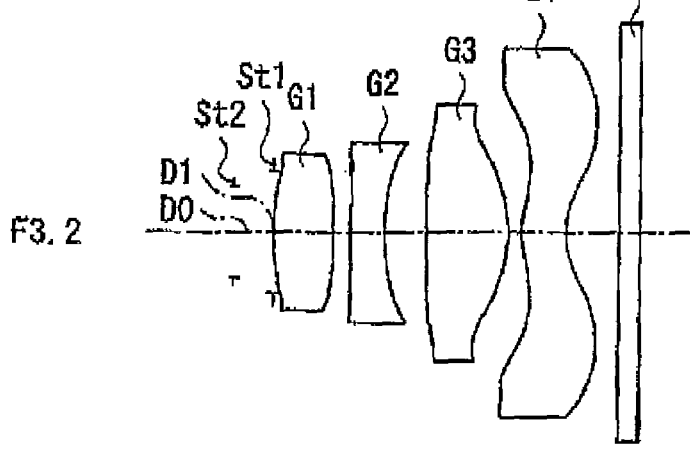
Figure 3C:
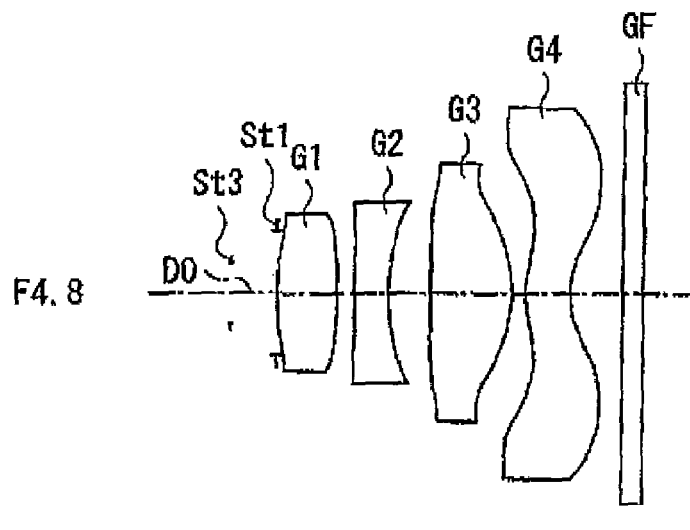
Figure 4A:
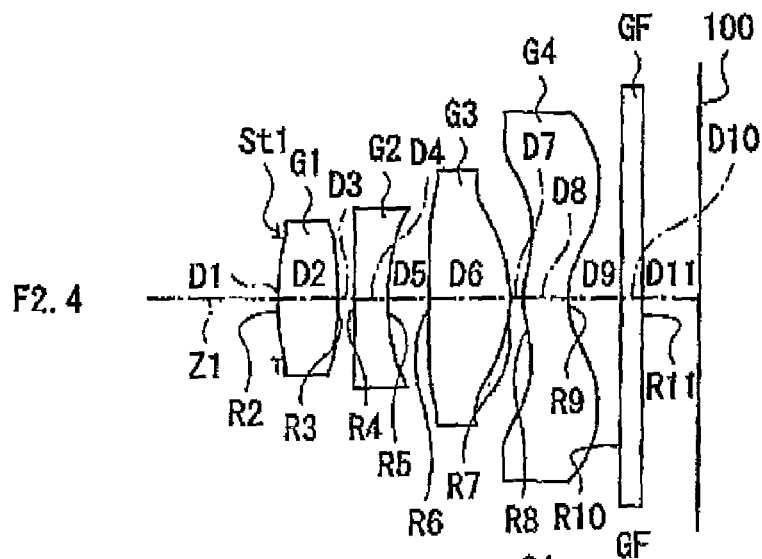
FIGS. 4A, 4B and 4C show a fourth structural example of the imaging lens according to the first embodiment of the present invention and are sectional views of a lens corresponding to a fourth example.
Figure 4B:
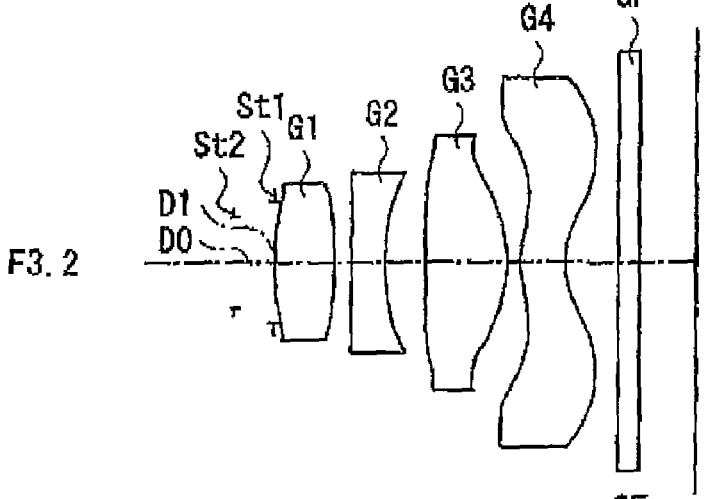
Figure 4C:
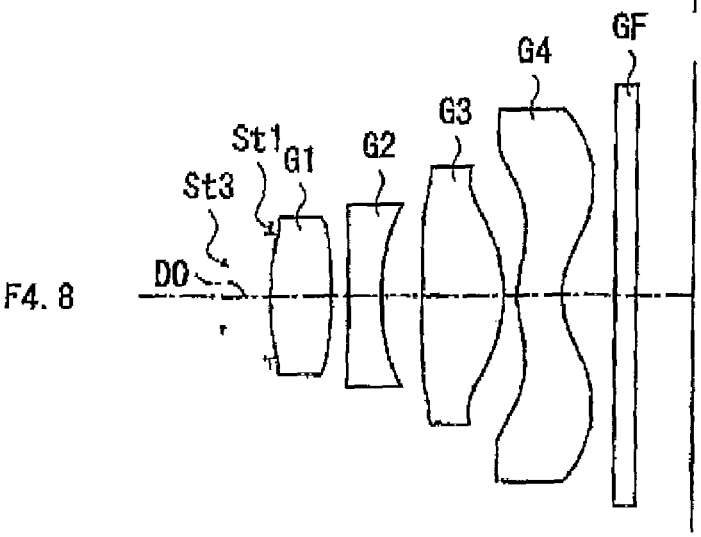
Figure 5A:
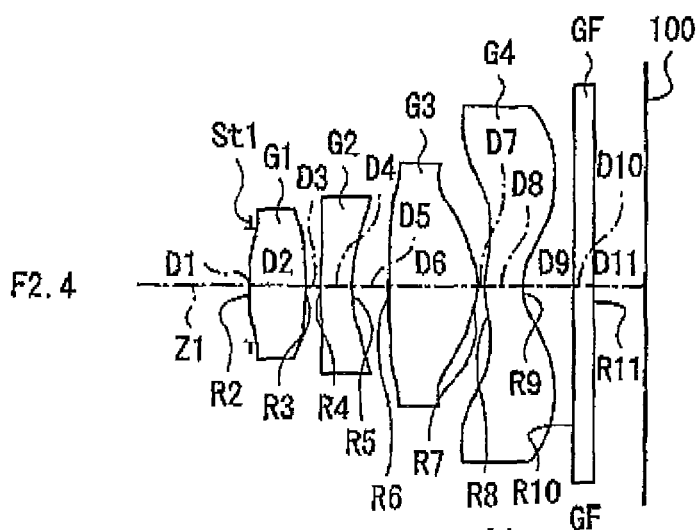
FIGS. 5A, 5B and 5C show a fifth structural example of the imaging lens according to the first embodiment of the present invention and are sectional views of a lens corresponding to a fifth example.
Figure 5B:
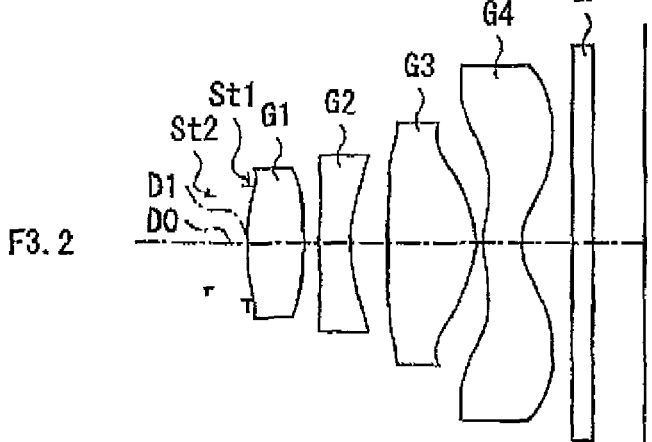
Figure 5C:
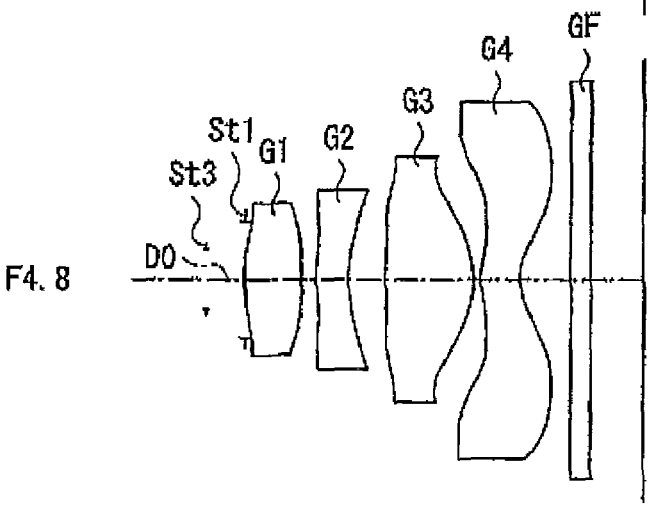
Figure 6A:
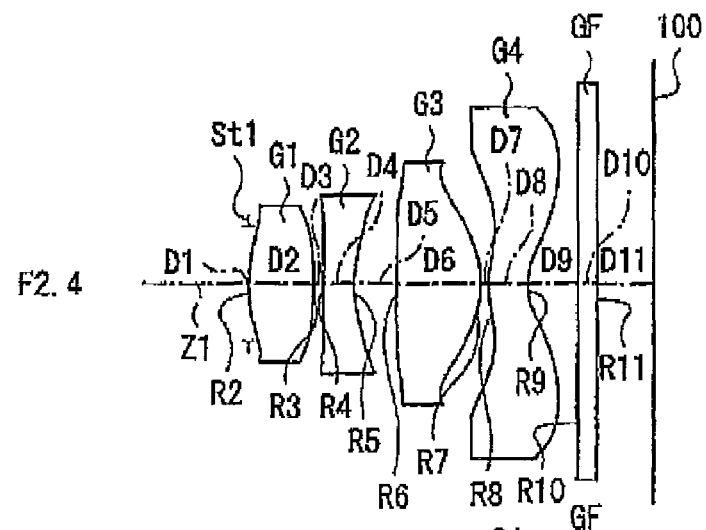
FIGS. 6A, 6B and 6C show a sixth structural example of the imaging lens according to the first embodiment of the present invention and are sectional views of a lens corresponding to a sixth example.
Figure 6B:
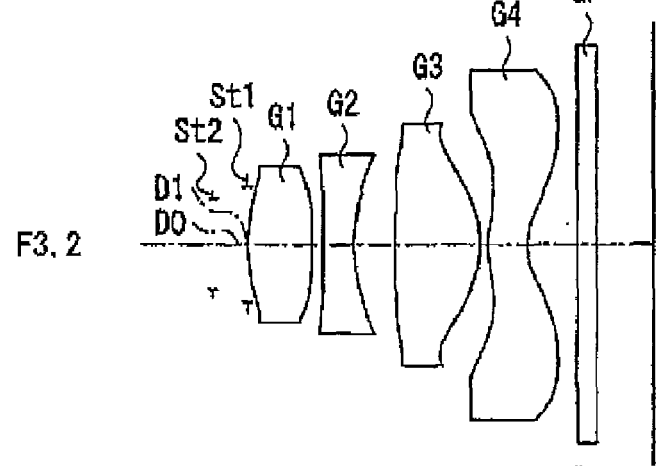
Figure 6C:
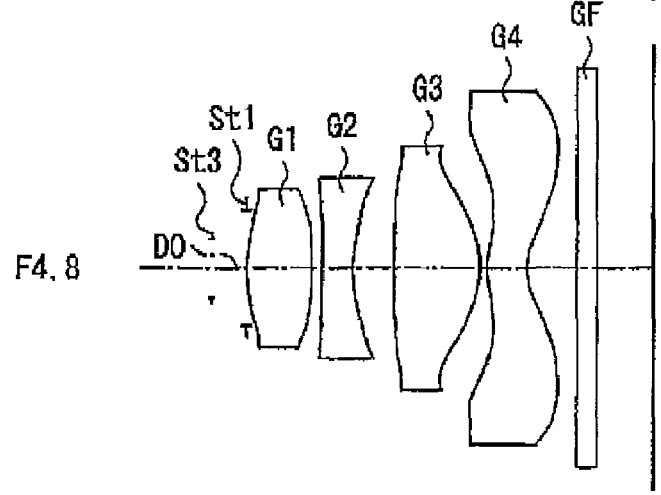
Figure 7A:
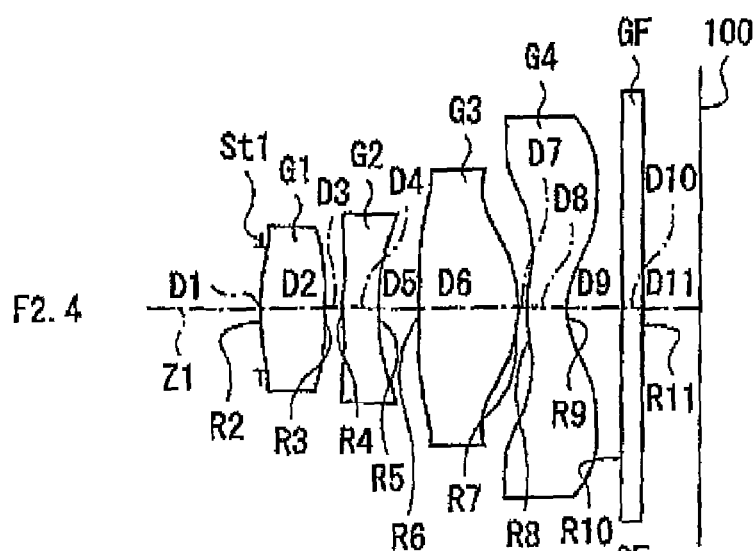
FIGS. 7A, 7B and 7C show a seventh structural example of the imaging lens according to the first embodiment of the present invention and are sectional views of a lens corresponding to a seventh example.
Figure 7B:
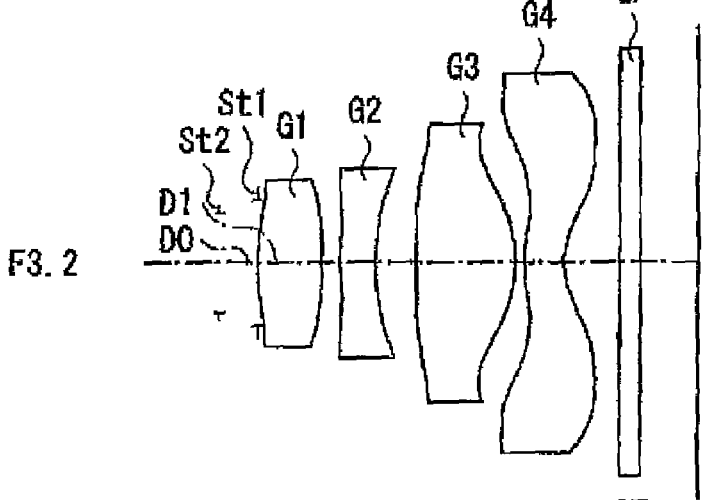
Figure 7C:
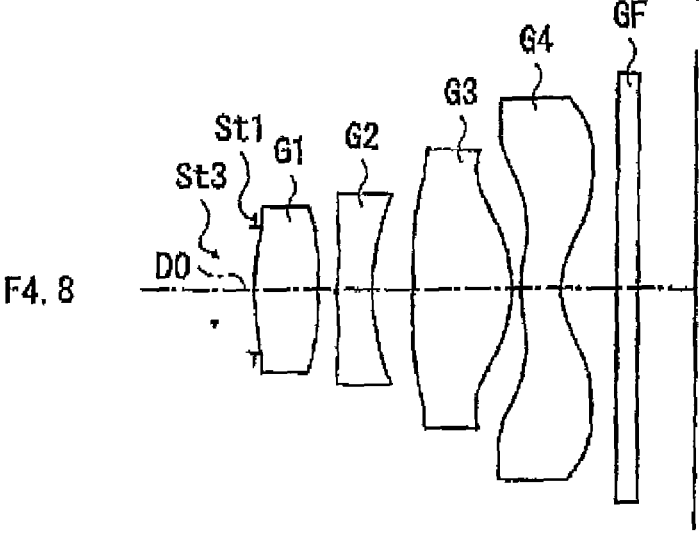
Figure 8A:
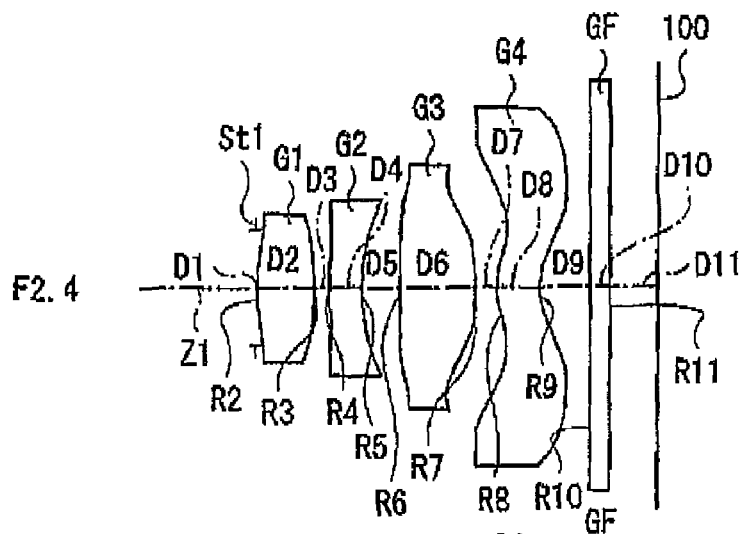
FIGS. 8A, 8B and 8C show an eighth structural example of the imaging lens according to the first embodiment of the present invention and are sectional views of a lens corresponding to an eighth example.
Figure 8B:
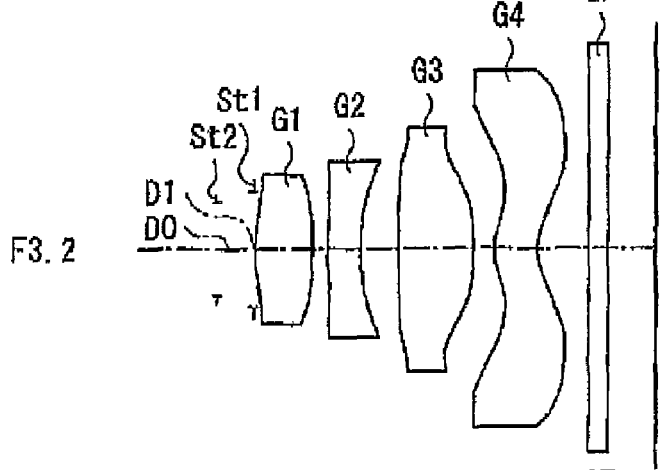
Figure 8C:
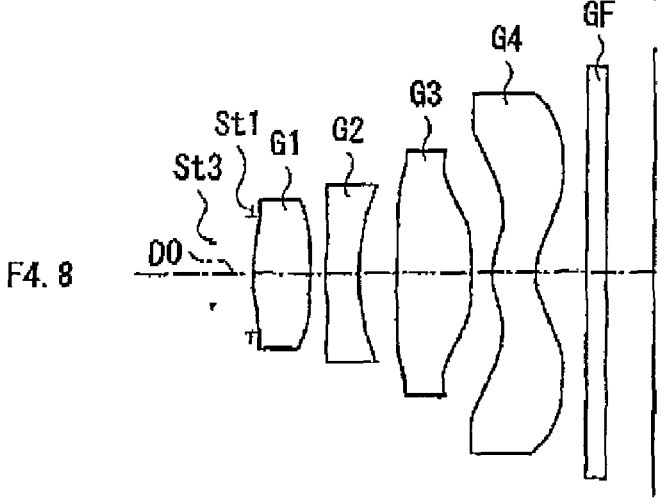
Figure 9A:
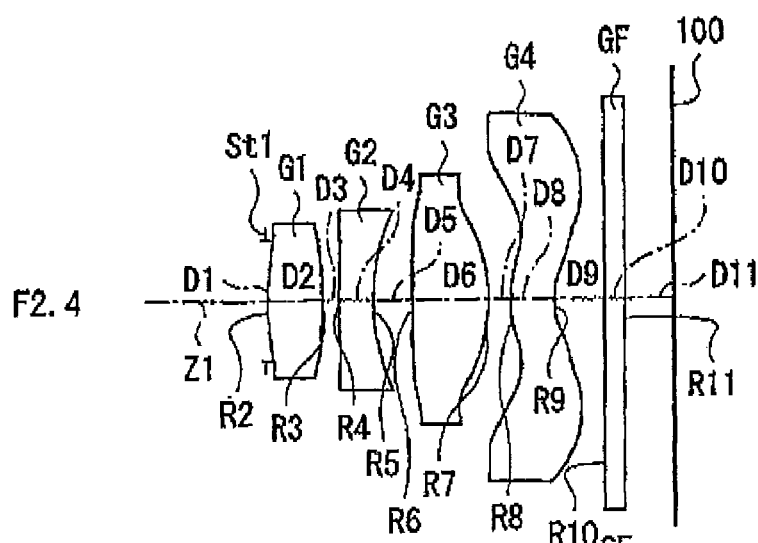
FIGS. 9A, 9B and 9C show a ninth structural example of the imaging lens according to the first embodiment of the present invention and are sectional views of a lens corresponding to a ninth example.
Figure 9B:
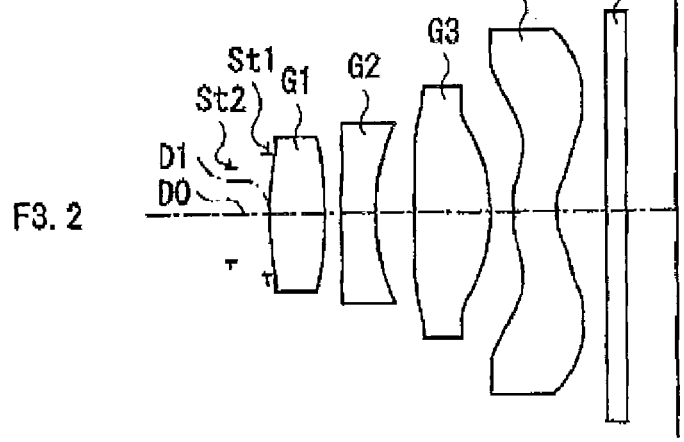
Figure 9C:
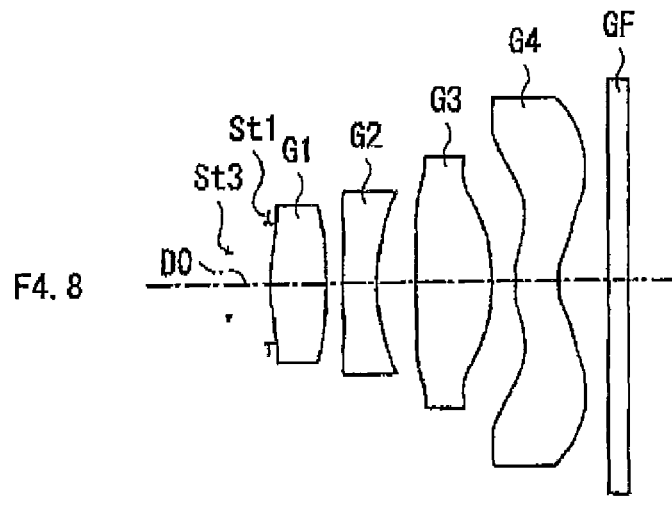

Similarly to the imaging lens of the first example, specific lens data corresponding to the structure of the imaging lens illustrated in FIGS. 2A, 2B and 2C is shown in FIGS. 14A and 14B and FIG. 15 as a second example. Further, data of the aspheric shapes of both the surfaces of the third lens G3 is shown in FIGS. 16A and 16B and FIGS. 17A and 17B. The imaging lens according to the second example also has the same features of the aperture diaphragm and the same features of the aspheric shapes (especially, the third lens G3) as those of the imaging lens according to the first example.

Further, similarly, specific lens data corresponding to the structures of the imaging lenses illustrated in FIGS. 3A to 9C is shown in FIGS. 18A to 45B as third to ninth examples. The imaging lenses according to the examples respectively have the same features of the aperture diaphragms and the same features of the aspheric shapes (especially, the third lens G3) as those of the imaging lens according to the first example.

Further, FIG. 46 shows the values of the above-described conditional expressions coordinated for each of the examples. In FIG. 46, as for the focal length, values f1 to f4 of the first to the fourth lenses are respectively shown as references. As can be understood from FIG. 46, the values of the examples are respectively located within the numerical ranges of the conditional expressions (1), (2), (3) and (4).

Further, especially, the first to the sixth examples in which the shape of the third lens G3 is configured as a meniscus shape that the shape of the third lens G3 near the optical axis has a convex surface directed toward the image side and in the seventh example in which the shape of the third lens G3 near the optical axis is a flat convex shape satisfy the numerical ranges of the above-described conditional expressions (3B)

and (4B). Further, especially, the eighth to the ninth examples in which the shape of the third lens G3 near the optical axis is a biconvex shape satisfy the numerical ranges of the above-described conditional expressions (3C) and (4C).

FIGS. 47A to 47C respectively show a spherical aberration, astigmatism and a distortion in the imaging lens of the first example having the F number of 2.4. In the astigmatism diagram, S designates an aberration of a sagittal direction and T designates an aberration of a tangential direction. Y designates the height of an image. Further, FIGS. 48A to 48C show various aberrations in the imaging lens of the first example having the F number of 3.2. Further, FIGS. 49A to 49C show various aberrations in the imaging lens of the first example having the F number of 4.8.

Similarly, various aberrations of the imaging lenses according to the second to the ninth examples are shown in FIGS. 50A, 50B and 50C to FIGS. 73A, 73B and 73C.

As can be recognized from the above-described numerical data and the aberration diagrams respectively, the structures of the lens elements are respectively optimized in each of the examples, and accordingly, the lens system can be realized that maintains a good optical performance and is compact and fast and whose performance is hardly deteriorated even when the position of the aperture diaphragm is changed. Especially, a performance preferably suitable for the number of pixels such as about 8 mega pixels is obtained.

The present invention is not limited to the above-described embodiment and the examples respectively, and various modifications maybe embodied. For instance, the radiuses of curvature, the surface spacing and the refractive indexes of the lens components or the like are not limited to the values shown in the numerical examples respectively and other values may be used.

Further, in all the examples, the imaging lenses are respectively supposed to use fixed focal points, however, a structure in which a focus can be adjusted may be employed. For instance, the entire part of the lens system may be extended or a part of the lenses may be moved on the optical axis to be automatically focused.

Further, in the above-described examples respectively, a design example preferably suitable for the number of pixels such as about 8 mega pixels is exemplified. However, the imaging lens of the present invention can obtain a good performance even for a higher number of pixels such as 10 mega pixels or more. Further, the imaging lens of the present invention can obtain a good performance for the number of pixels lower than 8 mega pixels.

What is claimed is:

1. An imaging lens comprising, in order from an object side;
    a stop;
    a first lens including a positive lens having a convex surface directed to the object side;
    a second lens that includes, near an optical axis, a negative meniscus shape with a concave surface directed to an image side;
    a third lens that has, near the optical axis, a meniscus shape or a flat convex shape with a convex surface directed to the image side; and
    a fourth lens that includes a negative lens having, near the optical axis, a concave surface directed to the image side,
    wherein a surface of the second lens located on the object side has an aspheric shape having at least one inflection point,
    wherein surfaces of the third lens each has aspheric shape including at least one inflection point,
    wherein a sag amount of each of the surfaces of the third lens at the terminal end part of a periphery within an effective diameter increases with a surface height from the optical axis and,
    conditional expressions are satisfied:

$$0.1 < D3/D4 < 2.0 \quad (1)$$

$$vd1 - vd2 > 25 \quad (2)$$

$$0.4 < f1/f3 < 1.6 \quad (3)$$

$$0.8 < f/f3 < 1.4 \quad (4B)$$

where
    D3 denotes an air space on the optical axis between the first lens and the second lens,
    D4 denotes a central thickness of the second lens,
    vd1 denotes an Abbe number of the first lens at the d-line,
    vd2 denotes an Abbe number of the second lens at the d-line,
    f1 is a focal length of the first lens,
    f3 is a focal length of the third lens, and
    f is a focal length of a whole system.

2. The imaging lens according to claim 1, further comprising:
    at least another stop is detachably inserted to the optical axis nearer to the object side than the stop.

3. The imaging lens according to claim 2, wherein the diameters of the stop and said another stop are fixed and the diameter of said another stop is smaller than the diameter of the stop.

4. The imaging lens according to claim 2, wherein the first lens is a glass lens.

5. The imaging lens according to claim 4, wherein a surface of the fourth lens located on the image side has an aspheric shape having two or more inflection points and a positive power in a periphery part of the fourth lens.

6. The imaging lens according to claim 2, wherein a surface of the fourth lens located on the image side has an aspheric shape having two or more inflection points and a positive power in a periphery part of the fourth lens.

7. An image pickup device comprising:
    the imaging lens according to claim 2 and
    an image pickup element that outputs an image pickup signal corresponding to an optical image formed by the imaging lens.

8. The imaging lens according to claim 1, wherein the first lens is a glass lens.

9. The imaging lens according to claim 1, wherein a surface of the fourth lens located on the image side has an aspheric shape having two or more inflection points and a positive power in a periphery part of the fourth lens.

10. An image pickup device comprising:
    the imaging lens according to claim 1 and
    an image pickup element that outputs an image pickup signal corresponding to an optical image formed by the imaging lens.

11. An imaging lens comprising, in order from an object side;
    a stop;
    a first lens including a positive lens having a convex surface directed to the object side;
    a second lens that includes, near an optical axis, a negative meniscus shape with a concave surface directed to an image side;
    a third lens that has, near the optical axis, a biconvex shape; and a fourth lens that includes a negative lens having, near the optical axis, a concave surface directed to the image side, wherein surfaces of the third lens each has aspheric shape including at least one inflection point, the inclination of each of the surfaces of the third lens at the terminal end part of a periphery within an effective diameter directs toward the image side with respect to the optical axis and, conditional expressions are satisfied:

$$0.1 < D3/D4 < 2.0 \quad (1)$$

$$vd1 - vd2 > 25 \quad (2)$$

$$0.4 < f1/f3 < 1.6 \quad (3)$$

$$0.4 < f/f3 < 0.7 \quad (4C)$$

where

D3 denotes an air space on the optical axis between the first lens and the second lens, D4 denotes a central thickness of the second lens, vd1 denotes an Abbe number of the first lens at the d-line, vd2 denotes an Abbe number of the second lens at the d-line, f1 is a focal length of the first lens, f3 is a focal length of the third lens, and f is a focal length of a whole system.

12. The imaging lens according to claim 11, further comprising:

at least another stop is detachably inserted to the optical axis nearer to the object side than the stop.

13. The imaging leans according to claim 12, wherein diameters of the stop and said another stop are fixed and the diameter of said another stop is smaller than the diameter of the stop.

14. The imaging lens according to claim 12, wherein the first lens is a glass lens.

15. The imaging lens according to claim 12, wherein a surface of the second lens located on the object side has an aspheric shape having at least one inflection point.

16. The imaging lens according to claim 12, wherein a surface of the fourth lens located in the image side has an aspheric shape having two or more inflection points and a positive power in a periphery part of the fourth lens.

17. An image pickup device comprising:

the imaging lens according to claim 11 and an image pickup element that outputs an image pickup signal corresponding to an optical image formed by the imaging lens.

* * * * *